US012480709B2

(12) United States Patent
Gu et al.

(10) Patent No.: US 12,480,709 B2
(45) Date of Patent: Nov. 25, 2025

(54) APPARATUSES AND METHODS FOR DRYING AN OBJECT

(71) Applicant: SZ ZUVI TECHNOLOGY CO., LTD., Shenzhen (CN)

(72) Inventors: Lingdong Gu, Shenzhen (CN); Chufeng Liu, Shenzhen (CN)

(73) Assignee: SZ ZUVI TECHNOLOGY CO., LTD., Shenzhen (CN)

( * ) Notice: Subject to any disclaimer, the term of this patent is extended or adjusted under 35 U.S.C. 154(b) by 800 days.

(21) Appl. No.: 17/806,084

(22) Filed: Jun. 9, 2022

(65) Prior Publication Data
US 2022/0404097 A1 Dec. 22, 2022

Related U.S. Application Data

(63) Continuation of application No. PCT/CN2021/101099, filed on Jun. 18, 2021.

(51) Int. Cl.
*F26B 3/30* (2006.01)
*A45D 20/12* (2006.01)

(52) U.S. Cl.
CPC .......... *F26B 3/30* (2013.01); *A45D 20/12* (2013.01); *A45D 2200/205* (2013.01)

(58) Field of Classification Search
CPC ...... F26B 3/30; A45D 20/12; A45D 2200/205
USPC .......................................... 34/266
See application file for complete search history.

(56) References Cited

U.S. PATENT DOCUMENTS

| 1,720,302 | A | * | 7/1929 | Suter | A45D 20/44 34/283 |
| 4,257,172 | A | * | 3/1981 | Townsend | F26B 3/283 219/400 |
| 4,323,761 | A | * | 4/1982 | Hubner | H05B 3/16 338/237 |

(Continued)

FOREIGN PATENT DOCUMENTS

| CN | 1907171 A | 2/2007 |
| CN | 203897576 U | 10/2014 |

(Continued)

OTHER PUBLICATIONS

International Search Report in PCT/CN2021/101099 mailed on Mar. 9, 2022, 6 pages.

(Continued)

*Primary Examiner* — Stephen M Gravini
(74) *Attorney, Agent, or Firm* — METIS IP LLC

(57) ABSTRACT

Apparatuses and methods for drying an object are provided. An apparatus for drying an object may include a first airflow channel that has an airflow inlet and an airflow outlet. The apparatus may also include one or more radiation energy sources configured to provide thermal radiation toward the object. The apparatus may also include an airflow generating element configured to provide an airflow by effecting the airflow into the first airflow channel through the airflow inlet and direct a first portion of the airflow in the first airflow channel toward the airflow outlet. The apparatus may further include an airflow guide assembly configured to provide a second airflow channel through which a second portion of the airflow in the first airflow channel is guided to a target region. The target region abuts at least one of the one or more radiation energy sources.

20 Claims, 23 Drawing Sheets

(56) References Cited

U.S. PATENT DOCUMENTS

| | | | | |
|---|---|---|---|---|
| 4,382,174 A * | 5/1983 | Barns | ............... | A45D 20/10 |
| | | | | 338/237 |
| 4,854,052 A | 8/1989 | Korpela | | |
| 5,647,144 A * | 7/1997 | Bria | ............... | F26B 13/104 |
| | | | | 34/414 |
| 5,657,555 A * | 8/1997 | Milojevic | ........... | F26B 21/02 |
| | | | | 34/271 |
| 5,901,462 A * | 5/1999 | Rudd | ............... | F26B 13/145 |
| | | | | 34/124 |
| 11,464,313 B2 * | 10/2022 | Wang | ............... | A45D 20/12 |
| 11,832,698 B2 * | 12/2023 | Wang | ............... | H05B 3/0033 |
| 11,896,104 B2 * | 2/2024 | Wojczak | ............ | A61L 2/10 |
| 12,256,881 B2 * | 3/2025 | Lee | ............... | F26B 5/16 |
| 12,281,364 B2 * | 4/2025 | Polato | ............ | C14B 1/58 |
| 2022/0000241 A1 | 1/2022 | Wang et al. | | |
| 2022/0404097 A1 * | 12/2022 | Gu | ............... | F26B 3/04 |

FOREIGN PATENT DOCUMENTS

| | | |
|---|---|---|
| CN | 109198842 A | 1/2019 |
| CN | 208480747 U | 2/2019 |
| CN | 110089831 A | 8/2019 |
| CN | 209463503 U | 10/2019 |
| CN | 110403326 A | 11/2019 |
| CN | 111093421 A | 5/2020 |
| CN | 111134435 A | 5/2020 |
| CN | 111248595 A | 6/2020 |
| CN | 211269029 U | 8/2020 |
| CN | 212590831 U | 2/2021 |
| CN | 216123963 U | 3/2022 |
| JP | H1047781 A | 2/1998 |
| JP | 2001330368 A | 11/2001 |
| JP | 2005177234 A | 7/2005 |
| JP | 2020130718 A | 8/2020 |
| KR | 20200033172 A | 3/2020 |
| WO | 2014129072 A1 | 8/2014 |
| WO | 2018021309 A1 | 2/2018 |
| WO | WO-2022261993 A1 * | 12/2022 ............. A45D 20/12 |

OTHER PUBLICATIONS

Written Opinion in PCT/CN2021/101099 mailed on Mar. 9, 2022, 5 pages.

* cited by examiner

APPARATUSES AND METHODS FOR DRYING AN OBJECT

CROSS-REFERENCE TO RELATED APPLICATIONS

This application is a continuation of International Application No. PCT/CN2021/101099, filed on Jun. 18, 2021, the contents of which are hereby incorporated by reference.

TECHNICAL FIELD

The present disclosure generally relates to an apparatus for drying an object, and more particularly, relates to an airflow guide device used for the apparatus for drying an object.

BACKGROUND

A traditional drying apparatus (e.g., a blow dryer) may blow hot air to dry a wet object (e.g., hair). The drying apparatus may extract room temperature air in and heat the airflow to generate a hot airflow. The hot airflow may increase the temperature of the object, as well as the temperature of the air surrounding the object. The increased temperature may facilitate the drying of the object by, e.g., accelerating the evaporation of water from the object. In heating the airflow, such a traditional drying apparatus may use a resistive heating element (e.g., a nichrome wire) to transform electric energy into convective heat. However, the convective heat transfer of the drying apparatus may be low in heat transfer efficiency because only a portion of the hot airflow arrives at the object and only a portion of heat carried by the hot airflow arriving at the object is transferred to the object and water on the object (e.g., some of the heat is absorbed by the surrounding air). In addition, the convective heat used by such a traditional drying apparatus may over-expose the object to hot airflow to dry it completely. The object is heated on the surface only, which can cause local overheat, thereby causing damage to the object (e.g., frizz and dry, damaged hair). Therefore, it is desirable to develop apparatuses and methods for drying an object with improved efficiency and safety.

SUMMARY

Disclosed herein is an apparatus for drying an object. The apparatus may include a first airflow channel that has an airflow inlet and an airflow outlet. The apparatus may also include one or more radiation energy sources configured to provide thermal radiation toward the object. The apparatus may also include an airflow generating element configured to provide an airflow by effecting the airflow into the first airflow channel through the airflow inlet and direct a first portion of the airflow in the first airflow channel toward the airflow outlet. The apparatus may further include an airflow guide assembly configured to provide a second airflow channel through which a second portion of the airflow in the first airflow channel is guided to a target region. The target region may abut at least one of the one or more radiation energy sources.

Also disclosed herein is a method for drying an object. The method may include providing a first airflow channel that has an airflow inlet and an airflow outlet. The method may also include providing, through one or more radiation energy sources, thermal radiation toward the object. The method may also include providing, through an airflow generating element, an airflow by effecting the airflow into the first airflow channel through the airflow inlet. The method may further include directing, through the airflow generating element, a first portion of the airflow in the first airflow channel toward the airflow outlet, and guiding, through a second airflow channel provided by an airflow guide assembly, a second portion of the airflow in the first airflow channel to a target region. The target region may abut at least one of the one or more radiation energy sources.

Also disclosed herein is an airflow guide device used in an apparatus for drying an object. The apparatus for drying an object may include a first airflow channel and one or more radiation energy sources configured to provide thermal radiation toward the object. The apparatus for drying an object may also include an airflow generating element configured to provide an airflow by effecting the airflow into the first airflow channel and direct a first portion of the airflow in the first airflow channel outside the first airflow channel. The airflow guide device may include an airflow guide assembly configured to provide a second airflow channel through which a second portion of the airflow in the first airflow channel is diverted from the first portion of the airflow and guided to a target region. The target region may abut at least one of the one or more radiation energy sources.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
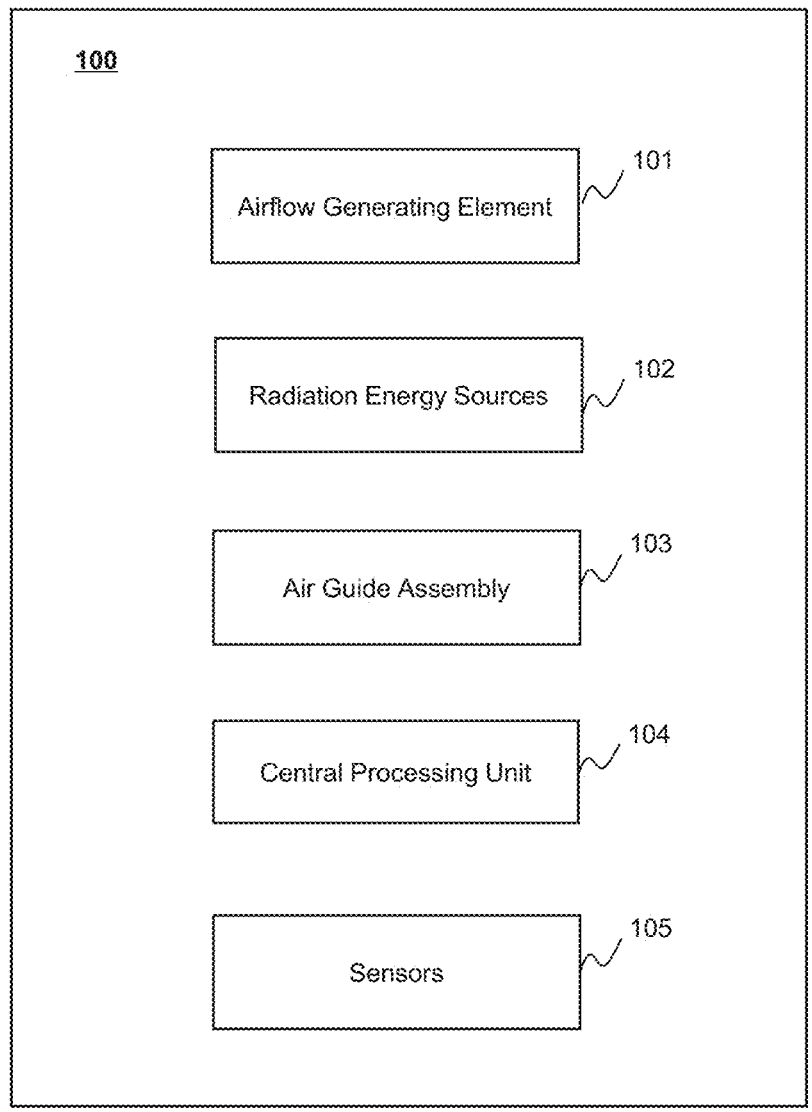
FIG. 1 is a block diagram illustrating an exemplary drying apparatus 100 according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, sections, or assembly of different levels in ascending order. However, the terms may be displaced by another expression if they achieve the same purpose.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

In addition, it should be understood that in the description of the present disclosure, the terms "first," "second," or the like, are only used for the purpose of differentiation, and cannot be interpreted as indicating or implying relative importance, nor can be understood as indicating or implying the order.

Notwithstanding that the numerical ranges and parameters setting forth the broad scope of the invention are approximations, the numerical values set forth in the specific examples are provided as precisely as possible. Any numerical value, however, inherently contains certain errors necessarily resulting from the standard deviation found in their respective testing measurements. Every numerical range given throughout this specification will include every narrower numerical range that falls within such broader numerical range as if such narrower numerical ranges were all expressly written herein.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Apparatuses and methods for drying objects are provided. The drying apparatus of the disclosure may remove water and moisture from objects (e.g., hair, fabrics) by utilizing one or more radiation energy sources as a source of heat energy. The radiation energy sources may emit radiation energy having a predetermined wavelength range and power density to heat the object. The heat carried by the radiation energy may be directly transferred to the object by way of radiation heat transfer such that a heat transfer efficiency is improved as compared with heat transfer by way of convection. For instance, substantially no heat is absorbed by surrounding air in the radiation heat transfer manner, while a big portion of heat is absorbed by the surrounding air and then blown away in the conventional convective heat transfer manner. The radiation energy sources may be used in combination with an airflow generating element (e.g., a motor-driven impeller) for providing an airflow through which evaporation of water from the object is accelerated.

With reference to hair drying as an example, benefits of utilizing the radiation energy sources as a source of heat energy include that the radiation energy may penetrate the hair shaft down to the cortex of the hair cuticle, and therefore it may dry hair faster and also relax and soften the hair. The radiation energy may be also believed to aid scalp health and stimulate hair growth by increasing the blood flow of the scalp. The utilization of radiation energy sources may enable a compact and lightweight drying apparatus because no resistive wire grid is needed to heat the airflow. The improved heat transfer efficiency and energy efficiency of radiation energy sources may also enable a cordless drying apparatus, which is powered by an embedded battery, to operate at an extended operating time.

When one or more radiation energy sources are used as a source of heat energy, a target region may exist in the vicinity of at least one of the radiation energy sources where the radiation intensity is very high. If no or little airflow generated by the airflow generating element traverses the target region, the temperature of an object positioned in or close to the target region may rise rapidly and/or significantly. For instance, the temperature of the object may increase rapidly and reach a high temperature (e.g., 200 degrees Celsius within 20 seconds) if the object is positioned within or close to the target region, thereby damaging the object. The present disclosure provides an improved drying apparatus that employs one or more radiation energy sources in combination with an airflow guide assembly and an airflow generating element. The airflow guide assembly may be configured to guide a portion of the airflow effected by the airflow generating element from a main airflow channel (e.g., the first airflow channel as described elsewhere in the present disclosure) to the target region. The portion of the airflow guided to the target region may decrease the temperature of the object positioned in or close to the target region, thereby avoiding damages caused by a high temperature therein to the object. The remaining portion of the airflow exiting the main airflow channel in combination with the portion of the airflow traversing the target region may maintain the temperature of the object and/or water thereon within an appropriate range to accelerate the evaporation of water from the object while avoiding heat damage to the object. Merely by way of example, for drying hair, an appropriate temperature range may be 50 to 60 degrees Celsius.

FIG. 1 is a block diagram illustrating an exemplary drying apparatus 100 according to some embodiments of the present disclosure. In some embodiments, the drying apparatus may be configured to remove water and moisture from an object (e.g., hair, fabrics) by utilizing a radiation energy source as a source of heat energy. The drying apparatus of the disclosure may be implemented as a fabric dryer, a hand dryer, a hair dryer, or any other dryers used in household, industry, agriculture, etc., as long as one or more radiation energy sources (e.g., one or more infrared lamps) are utilized as the source of heat energy. For example, a fabric dryer may utilize one or more infrared lamps as a heat source in association with an airflow generating element to facilitate evaporation of water from various fabrics such as clothes, bed sheets, curtains, plush toys, etc.

As shown in FIG. 1, the drying apparatus 100 may include an airflow generating element 101, one or more radiation energy sources 102, an airflow guide assembly 103, a central processing unit 104, one or more sensors 105, or the like, or any combination thereof. In some embodiments, the drying apparatus 100 may include other components that are not shown in FIG. 1. For example, the drying apparatus 100 may include a housing, a communication interface, a power element, a storage device, etc. Various electric, mechanical and electromechanical components, such as the airflow generating element 101, the radiation energy sources 102, the central processing unit 104, and/or the sensors 105 may be accommodated in the housing. In some embodiments, the housing may provide one or more airflow channels therein. The airflow effected by the airflow generating element 101 may be directed and/or regulated through an airflow channel. The communication interface may be provided at the housing of the drying apparatus 100 (e.g., at a handle) to facilitate reading out of the data of the drying apparatus 100, e.g., from the storage device of drying apparatus 100. The data may include sensor measurement and system error data. Such data may enable maintenance personnel to locate any malfunctional component, check the operation status and/or history of the drying apparatus 100, etc. For instance, the drying apparatus 100 may be prohibited to operate unless any error code in the storage device is cleared by authorized maintenance personnel. The power element may be configured to energize the one or more radiation energy sources 102 and/or the airflow generating element 101. In some embodiments, the drying apparatus 100 may be powered with an external power source. The power element may include a power adapter that regulates a voltage and/or a current received from the external power source. For instance, the drying apparatus 100 may be energized by electrically connecting to an external battery or a power grid via a power cord. In some embodiments, the drying apparatus 100 may be powered with an embedded power source. The power element may include one or more batteries that are received within the housing. The one or more batteries may be rechargeable (e.g., secondary battery) and/or replaceable. For example, one or more batteries may be received in the housing (e.g., a handle of the housing) of the drying apparatus. The status of the battery (e.g., a battery charge status, a remaining power) may be provided utilizing, for example, a screen or light-emitting diode (LED) indicator on the housing.

The airflow generating element 101 may be configured to provide an airflow that facilitates evaporation of water from an object (e.g., user's hair). In some embodiments, the airflow generating element 101 may provide the airflow by effecting the airflow into a first airflow channel of the drying apparatus 100 through an airflow inlet of the first airflow channel and direct at least a portion of the airflow (e.g., the first portion of the airflow as described elsewhere in the present disclosure) in the first airflow channel toward an airflow outlet of the first airflow channel. At least a portion of the airflow generated by the airflow generating element 101 may be directed and/or regulated through the first airflow channel and toward the object. For instance, the first airflow channel may be shaped to regulate at least a velocity, a throughput, an angle of divergence, or vorticity of the airflow exiting the drying apparatus 100. In some embodiments, the airflow inlet and the airflow outlet may be positioned at opposite ends of the drying apparatus 100 along a longitudinal direction thereof. The airflow inlet and the airflow outlet may each be a vent that allows efficient airflow throughput. The environment air may be extracted into the first airflow channel via the airflow inlet of the first airflow channel to generate the airflow, and the generated airflow may exit the first airflow channel via the airflow outlet of the first airflow channel and/or an airflow outlet of a second airflow channel provided by the airflow guide assembly 103.

The radiation energy sources 102 may be configured to provide thermal radiation and direct the thermal radiation toward an exterior of the drying apparatus 100 (e.g., toward the object). The radiation energy sources 102 may be supported by a radiation energy source holder or housed in a radiation energy source shroud. In some embodiments, at least one of the radiation energy sources 102 may include an infrared lamp that converts electric energy into infrared radiation energy. In some embodiments, the infrared lamp may include an infrared light emitting diode (LED), a laser device such as a carbon dioxide laser, etc.

In some embodiments, at least one of the radiation energy sources 102 may be positioned inside the first airflow channel. As used herein, a radiation energy source being positioned inside an airflow channel may mean that the radiation energy source is within an area of the airflow channel as viewed in a cross-sectional view (e.g., an axial cross-sectional view, a radial cross-sectional view) of a drying apparatus. For a radiation energy source positioned inside an airflow channel (e.g., the first airflow channel), the radiation energy source and the airflow in the airflow channel are not separated by a component (e.g., a wall of the airflow channel, or referred to as an airflow channel wall). For example, at least one of the radiation energy sources 102 may be positioned substantially at a geometrical center of the first airflow channel inside the first airflow channel as illustrated in FIGS. 4A-4F. As another example, at least one of the radiation energy sources 102 may be positioned substantially at a geometrical center of the airflow outlet inside the first airflow channel as illustrated in FIGS. 4A-4F. In some embodiments, the radiation energy sources 102 may be arranged along a ring inside the first airflow channel as illustrated in FIGS. 3 and 5A-5C. In some embodiments, the radiation energy sources 102 may be arranged in an array inside the first airflow channel as illustrated in FIG. 4E, FIG. 5D and FIG. 5E.

Figure 15A:
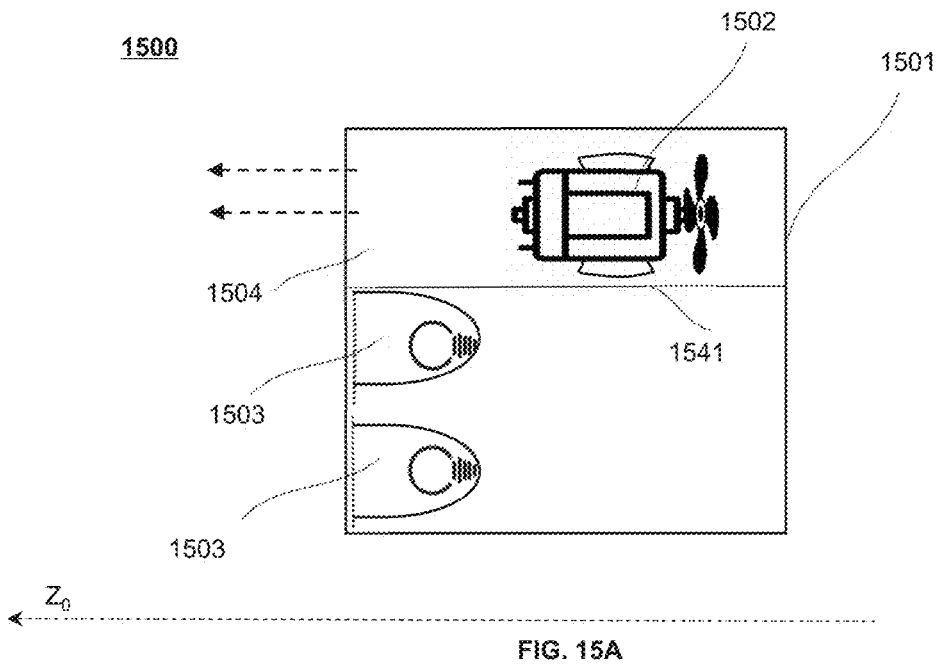
FIGS. 15A and 15B provide views of an exemplary drying apparatus 1500 according to some embodiments of the present disclosure.
Figure 15B:
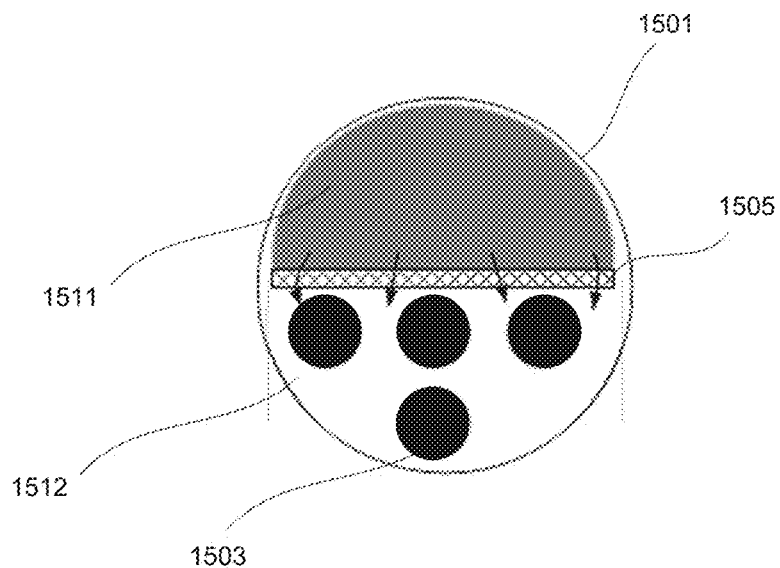
Figure 16A:
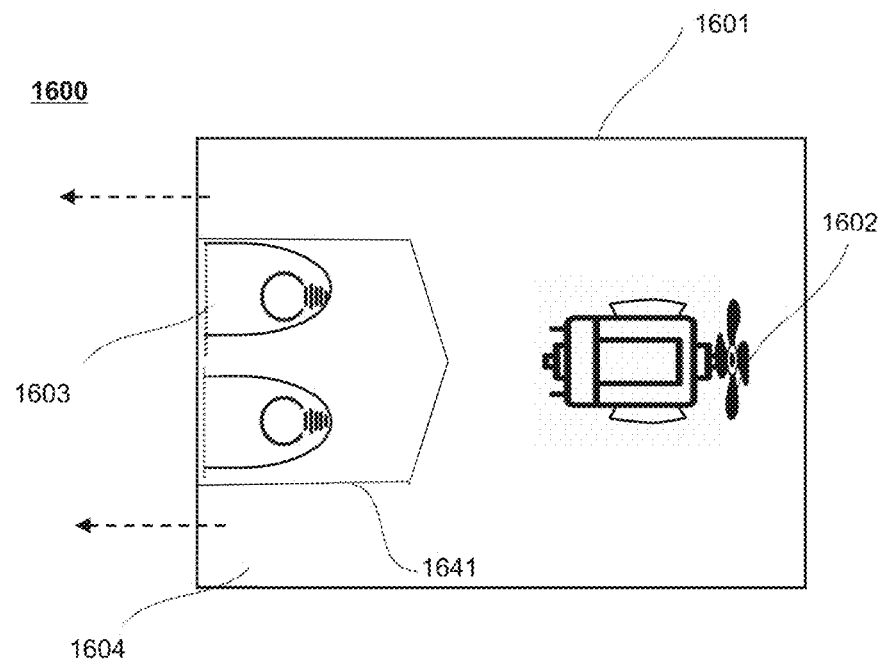
FIGS. 16A and 16B provide views of an exemplary drying apparatus 1600 according to some embodiments of the present disclosure.
Figure 16B:
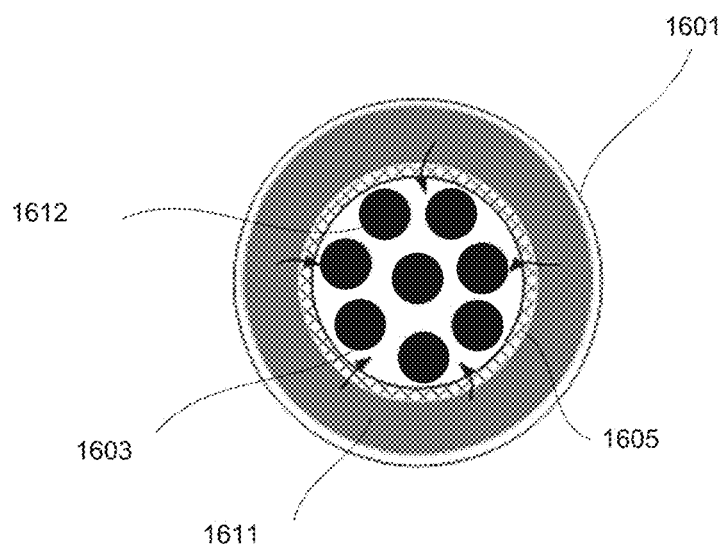

In some embodiments, at least one of the radiation energy sources 102 may be positioned outside the first airflow channel. As used herein, a radiation energy source being positioned outside an airflow channel of a drying apparatus may mean that at least a portion of the radiation energy source is outside or not within an area of the airflow channel as viewed in a cross-sectional view (e.g., an axial cross-sectional view) of the drying apparatus. For a radiation energy source positioned outside an airflow channel (e.g., the first airflow channel), the radiation energy source may be separated from the airflow channel by a component (e.g., a wall of the airflow channel). For example, at least one of the radiation energy sources 102 may be positioned between the first airflow channel and the housing as illustrated in FIGS. 6-8B. As another example, the radiation energy sources 102 may be positioned along a periphery of the first airflow channel as illustrated in FIG. 7B. As still another example, the radiation energy sources 102 may be positioned in juxtaposition to the first airflow channel as illustrated in FIGS. 15A-15B. As still another example, the radiation energy sources 102 may be positioned in a region enclosed by a wall of the first airflow channel as illustrated in FIGS. 16A-16B. In some embodiments, the radiation energy sources 102 may be arranged along a ring outside the first airflow channel as illustrated in FIG. 7B. In some embodiments, the radiation energy sources 102 may be arranged in an array outside the first airflow channel as illustrated in FIGS. 17A to 17D.

Figure 2A:
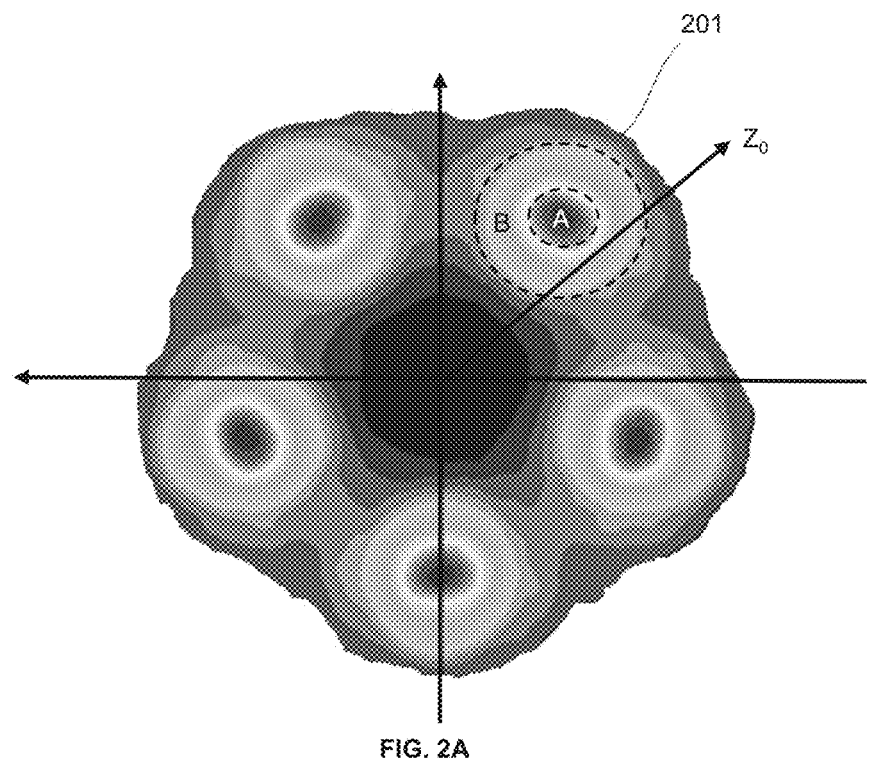
FIGS. 2A and 2B provide a radial view and an axial view of a radiation intensity distribution of radiation generated by radiation energy sources, respectively, according to some embodiments of the present disclosure.
Figure 2B:
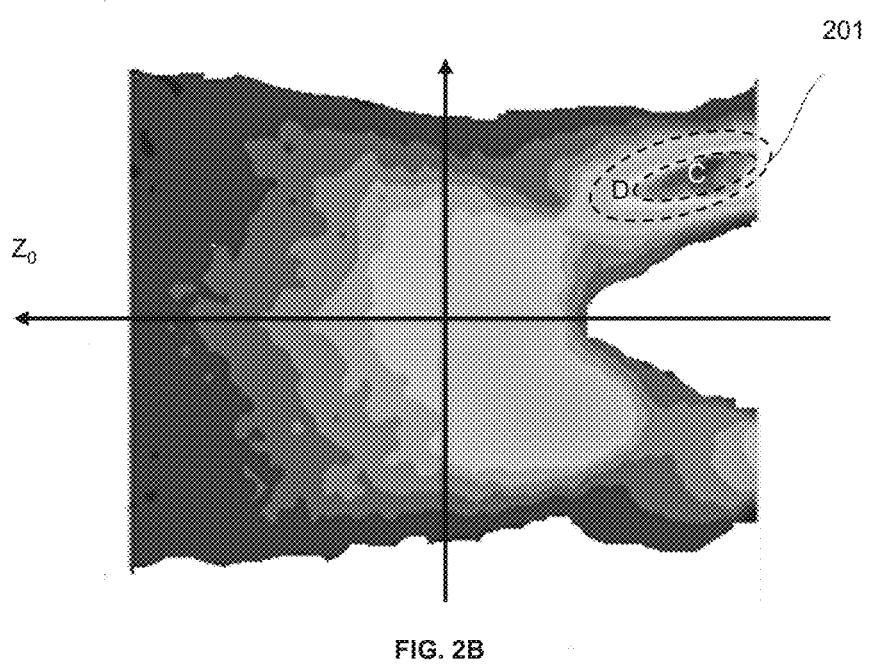

The airflow guide assembly 103 may be configured to provide a second airflow channel through which a second portion of the airflow effected by the airflow generating element 101 is guided to a target region. In some embodiments, there may exist a target region in the vicinity of or close to at least one of the radiation energy sources 102 where the radiation intensity of thermal radiation generated by at least one of the radiation energy sources 102 is high while the velocity and/or amount of airflow is low in the absence of airflow guided to the target region by the airflow guide assembly 103 (i.e., in an absence of the second portion of the airflow). In this case, when an object is positioned in or close to the target region, the temperature of the object may increase rapidly as the thermal radiation in the target region is received by the object in the presence of little or no airflow, which may cause a local overheat and in turn a damage to the object. For example, FIGS. 2A and 2B provide a radial view and an axial view of a radiation intensity distribution of radiation generated by radiation energy sources, respectively, according to some embodiments of the present disclosure. The radial view may be perpendicular to an axis of the first airflow channel denoted by $Z_0$; the axial view may be parallel to the axis $Z_0$ (also referred to as an axial direction $Z_0$) of the first airflow channel. As shown in FIG. 2A, the radiation intensity in a central region (denoted by the dashed circle A) is higher (as indicated by the darker color in the dashed circles in FIG. 2A) than in a peripheral region B of the radiation energy source 201. As shown in FIG. 2B, the radiation intensity in a region (denoted by a dashed circle C) close to the radiation energy source 201 is higher (as indicated by the darker color in the dashed circles in FIG. 2B) than in a region D far away from the radiation energy source 201 along the axial direction $Z_0$.

In some embodiments, the target region may abut at least one of the radiation energy sources 102. In some embodiments, a ratio of a velocity of airflow to a radiation intensity of thermal radiation in at least a portion of the target region may be below a threshold (also referred to as a first threshold) in the absence of the second portion of the airflow being guided to the target region. In some embodiments, a velocity of airflow in at least a portion of the target region of the drying apparatus 100 may be below a velocity threshold (e.g., 1 meter per second, 2 meters per second, 3 meters per second, etc.) in the absence of the second portion of the airflow being guided to the target region. In some embodiments, the velocity of airflow in a region may be determined by, e.g., measuring the velocity of airflow using a device (e.g., a wind speed sensor). For instance, the velocity of airflow in a region may be the velocity at one point within the region (e.g., the maximum velocity within the region), or an average of the velocities of airflow in multiple points in the region.

In some embodiments, a radiation intensity of thermal radiation in at least a portion of the target region of the drying apparatus 100 may be greater than an intensity threshold (e.g., 1 kW/m$^2$, 2 kW/m$^2$, 3 kW/m$^2$, 4 kW/m$^2$, 5 kW/m$^2$, etc.). As used herein, the radiation intensity of a radiation energy source refers to a ratio of a radiation flux radiated on a surface element by the radiation energy source to the area of the surface element. The at least a portion of the target region may include multiple surface elements corresponding to different radiation fluxes. In some embodiments, the radiation intensity of thermal radiation in at least a portion of the target region may include an average radiation intensity of thermal radiation in the at least a portion of the target region. For instance, the ratio of the velocity of airflow to the radiation intensity of thermal radiation in at least a portion of the target region may include a ratio of the average velocity of airflow and the average radiation intensity of thermal radiation in the at least a portion of the target region. In some embodiments, the temperature of an object positioned in the target region may be raised by, e.g., 100 to 200 degrees Celsius (° C.) within a period (e.g., 10 seconds, 20 seconds, etc.) in the absence of the second portion of the airflow in the first airflow channel being guided to the target region.

Figure 14A:
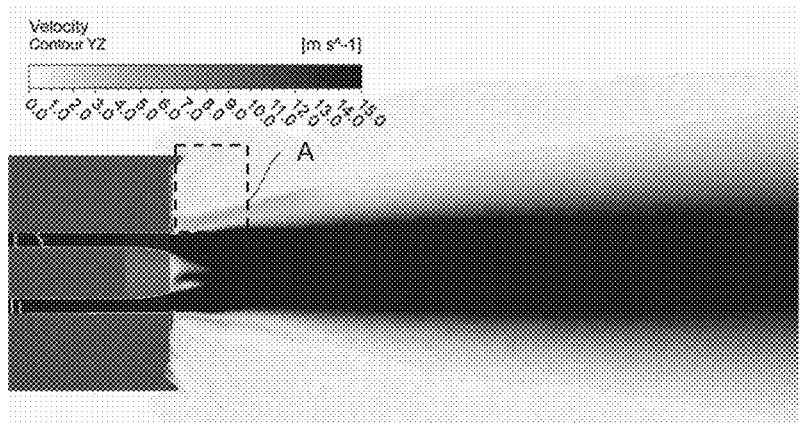
FIGS. 14A and 14B illustrate axial views of velocity distributions of airflow exiting an airflow outlet without and with a second portion of the airflow guided to a target region outside a radiation energy source, respectively, according to some embodiments of the present disclosure.
Figure 14B:
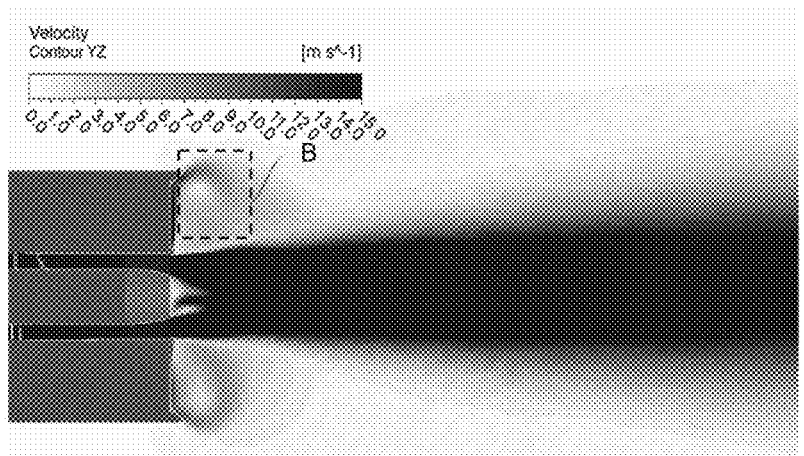

In some embodiments, the velocity of airflow in at least a portion of the target region provided by the drying apparatus 100 may exceed the velocity threshold (e.g., 1 meter per second, 2 meters per second, 3 meters per second, etc.) in the presence of the second portion of the airflow being guided to the target region. For example, FIGS. 14A and 14B illustrate axial views of velocity distributions of airflow exiting an airflow outlet without and with a second portion of the airflow guided to a target region outside a radiation energy source, respectively, according to some embodiments of the present disclosure. As shown in FIG. 14A, in the absence of the second portion of the airflow, the velocity of airflow in the target region denoted by dotted box A is lower than 1 meter per second; as shown in FIG. 14B, in the presence of the second portion of the airflow, the velocity of airflow in the target region denoted by dotted box B exceeds 2-3 meters per second. Specially, the velocity of airflow in a portion of the target region exceeds 10 meters per second. In some embodiments, the ratio of a velocity of airflow to a radiation intensity of thermal radiation in at least a portion of the target region provided by the drying apparatus 100 may exceed a threshold (e.g., the first threshold or a threshold exceeding the first threshold) in the presence of the second portion of the airflow being guided to the target region. In some embodiments, the temperature of an object positioned in the target region may be maintained in a range, e.g., from 60 to 80 degrees Celsius (° C.), or from 40 to 60 degrees Celsius (° C.), etc., within a period (e.g., 5 seconds, 10 seconds, 20 seconds, 1 minute, 2 minutes, 5 minutes, 10 minutes, etc.) in the presence of the second portion of the airflow in the first airflow channel being guided to the target region.

In some embodiments, an angle between the first airflow channel and the second airflow channel may range from 30 degrees to 90 degrees, or from 45 degrees to 90 degrees, or from 60 degrees to 90 degrees, or from 70 degrees to 85 degrees, etc.

In some embodiments, the airflow guide assembly 103 may be arranged at the airflow outlet. The second airflow channel may be formed between a portion of a wall of the first airflow channel and a surface of the airflow guide assembly 103. See, e.g., the airflow guide assembly 705 in FIG. 7A, the first airflow guide member 1051 and the second airflow guide member 1052 in FIG. 10, and the airflow guide assembly 1100 in FIGS. 11 and 13. In some embodiments, the second airflow channel may be formed between a surface of the airflow guide assembly 103 and a surface of at least one of the radiation energy sources 102. See, e.g., the second airflow guide member 4052 and the radiation energy source 403 in FIGS. 4A-4F, the first airflow guide member 5051, the second airflow guide member 5052, and the radiation energy sources 503 in 5A-5E, the airflow guide assembly 705 and the radiation energy sources 703 in 7A, the first airflow guide member 1051, the second airflow guide member 1052, and the radiation energy sources 1030 in FIG. 10.

In some embodiments, at least one end of the wall of the first airflow channel may include a chamfer. See, e.g., the chamfer 7042 in FIG. 7A, the chamfer 1045 in FIG. 10, and the chamfer 1342 in FIG. 13. In some embodiments, an end of the wall of the first airflow channel facing the second airflow channel may include the chamfer. Exemplary chamfers may include a 30° chamfer, a 45° chamfer, a 60° chamfer, an arc chamfer, or the like, or any combination thereof. The chamfer arranged at the least one end of the wall of the first airflow channel may be used to reduce airflow noise, or a resistance to airflow, etc.

Figure 11:
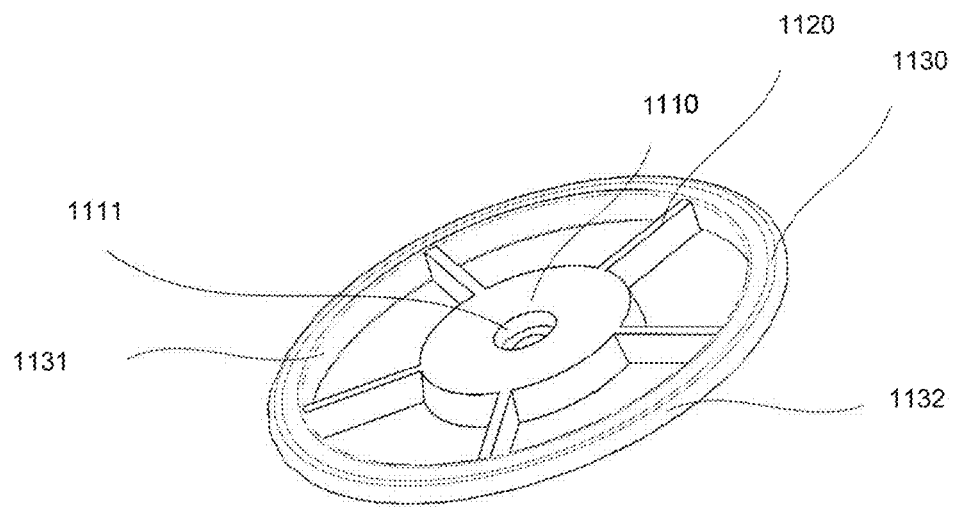
FIG. 11 is a schematic illustrating an exemplary airflow guide assembly 1100 according to some embodiments of the present disclosure.
Figure 12:
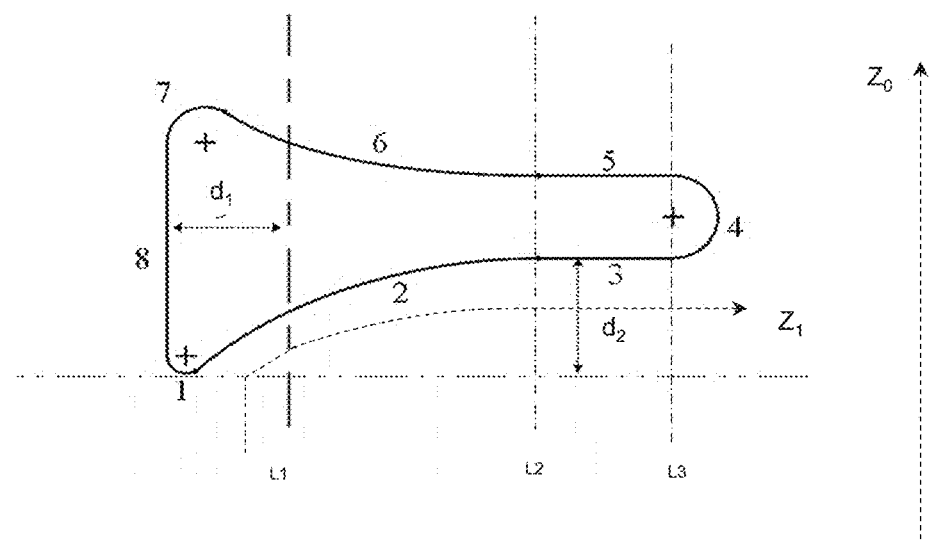
FIG. 12 is a schematic illustrating an axial cross-sectional view of a rim 1130 of the airflow guide assembly 1100 according to some embodiments of the present disclosure.
Figure 13:
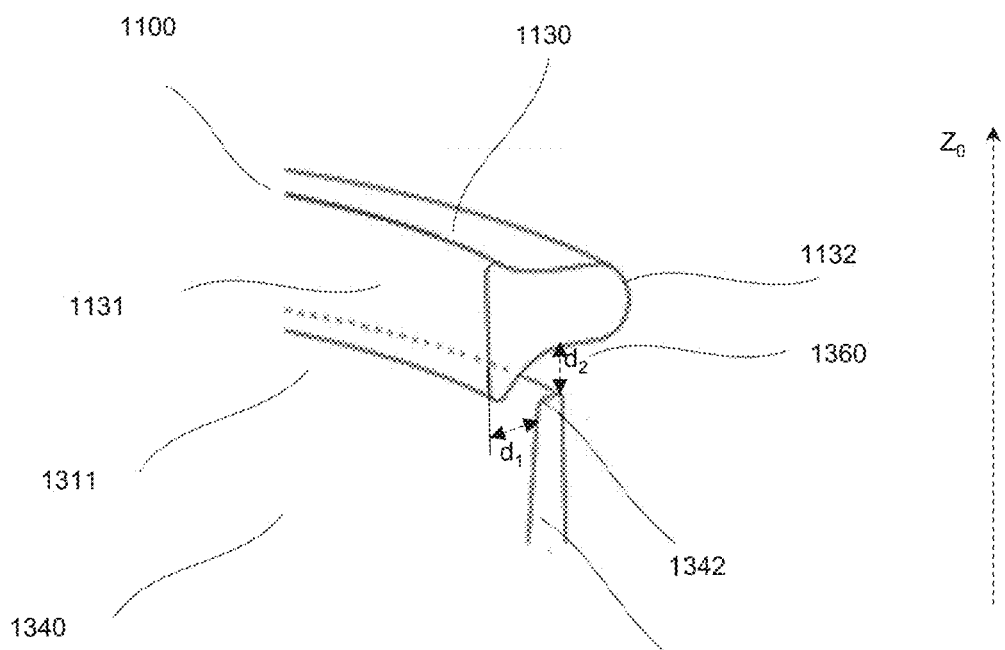
FIG. 13 is a schematic illustrating a relationship between a rim of the airflow guide assembly 1100 and an airflow outlet of a drying apparatus according to some embodiments of the present disclosure.

In some embodiments, a shape of a portion of the surface of the airflow guide assembly 103 facing the second airflow channel may conform to a shape of an end of the wall of the first airflow channel facing the second airflow channel, which may reduce a resistance to the second portion of the airflow being guided to the target region. See, e.g., FIGS. 11-13 illustrating that the shape of a portion of the surface of the airflow guide assembly facing the second airflow channel may be the same as or similar to the shape of an end of the wall of the first airflow channel facing the second airflow channel. In some embodiments, a shape of a radial cross-section of the airflow guide assembly 103 may conform to a shape of the airflow outlet. See, e.g., FIGS. 5B, 7B, 9B, and 16B illustrating that the shape of the radial cross-section of the airflow guide assembly (including the inner wall and the outer wall) may conform to the shape of the airflow outlet. The radial cross-section may be perpendicular to the axis of the first airflow channel. In some embodiments, the shape of the radial cross-section of the airflow guide assembly 103 may conform to a shape of the arrangement of the one or more radiation energy sources. See, e.g., the airflow guide assembly in FIGS. 4E, 5B, 5D, 5E, 15B, 16B, 17B, and 17D. In some embodiments, the shape of the radial cross-section of the airflow guide assembly 103 may conform to a shape of the radial cross-section of a radiation energy source. See, e.g., the airflow guide assembly in FIGS. 4C and 5C.

In some embodiments, the airflow guide assembly 103 may include a first segment and a second segment. The first segment of the airflow guide assembly 103 may be configured to divert the second portion of the airflow from the first portion of the airflow. The second segment of the airflow guide assembly 103 may be configured to guide the second portion of the airflow to the target region. In some embodiments, the first segment of the airflow guide assembly 103 may extend into the first airflow channel and be positioned inside the first airflow channel, while the second segment of the airflow guide assembly 103 may extend toward the target region and be positioned outside the first airflow channel. In some embodiments, an end surface of the first segment of the airflow guide assembly 103 facing the first airflow channel may have a curvature less than a threshold (also referred to as a second threshold). For example, the end surface of the first segment may have an arc-shaped structure, a water drop-shaped structure, etc., thereby reducing airflow noise and/or resistance to airflow in the first airflow channel. See, e.g., FIGS. 11-13.

The second airflow channel may include an inflow section and an outflow section. The second portion of the airflow may enter the second airflow channel through the inflow section. The second portion of the airflow may exit the second airflow channel through the outflow section. In some embodiments, the inflow section of the second airflow channel may be defined by the first segment of the airflow guide assembly 103. See, e.g., FIGS. 8A and 8B, and the description thereof. In some embodiments, the inflow section of the second airflow channel may be defined by the first segment of the airflow guide assembly 103 and a first surface. The first surface may include, e.g., a first portion of at least one of the radiation energy sources 102, a first portion of the wall of the first airflow channel, or the like, or a combination thereof. See, e.g., FIGS. 4A, 5A, 7A, 10, and 13, and the description thereof. Merely by way of example, the first surface may include a portion of an exterior wall (e.g., the side surface) of at least one radiation energy source. In some embodiments, the outflow section of the second airflow channel may be defined by the second segment of the airflow guide assembly 103. See, e.g., FIGS. 8A and 8B, and the description thereof. In some embodiments, the outflow section of the second airflow channel may be defined by the second segment of the airflow guide assembly 103 and a second surface. The second surface may include, e.g., a second portion of at least one of the radiation energy sources 102, a second portion of the wall of the first airflow channel, or the like, or a combination thereof. See, e.g., FIGS. 4A, 5A, 7A, 10, and 13, and the description thereof. Merely by way of example, the second surface may include at least a portion of the upper surface (e.g., an optical element) of the at least one radiation energy source, in which the upper surface faces the target region and/or the exterior of the first airflow channel. In some embodiments, the first surface of the inflow section and the second surface of the outflow section of the second airflow channel may partially overlap or not overlap.

Figure 8A:
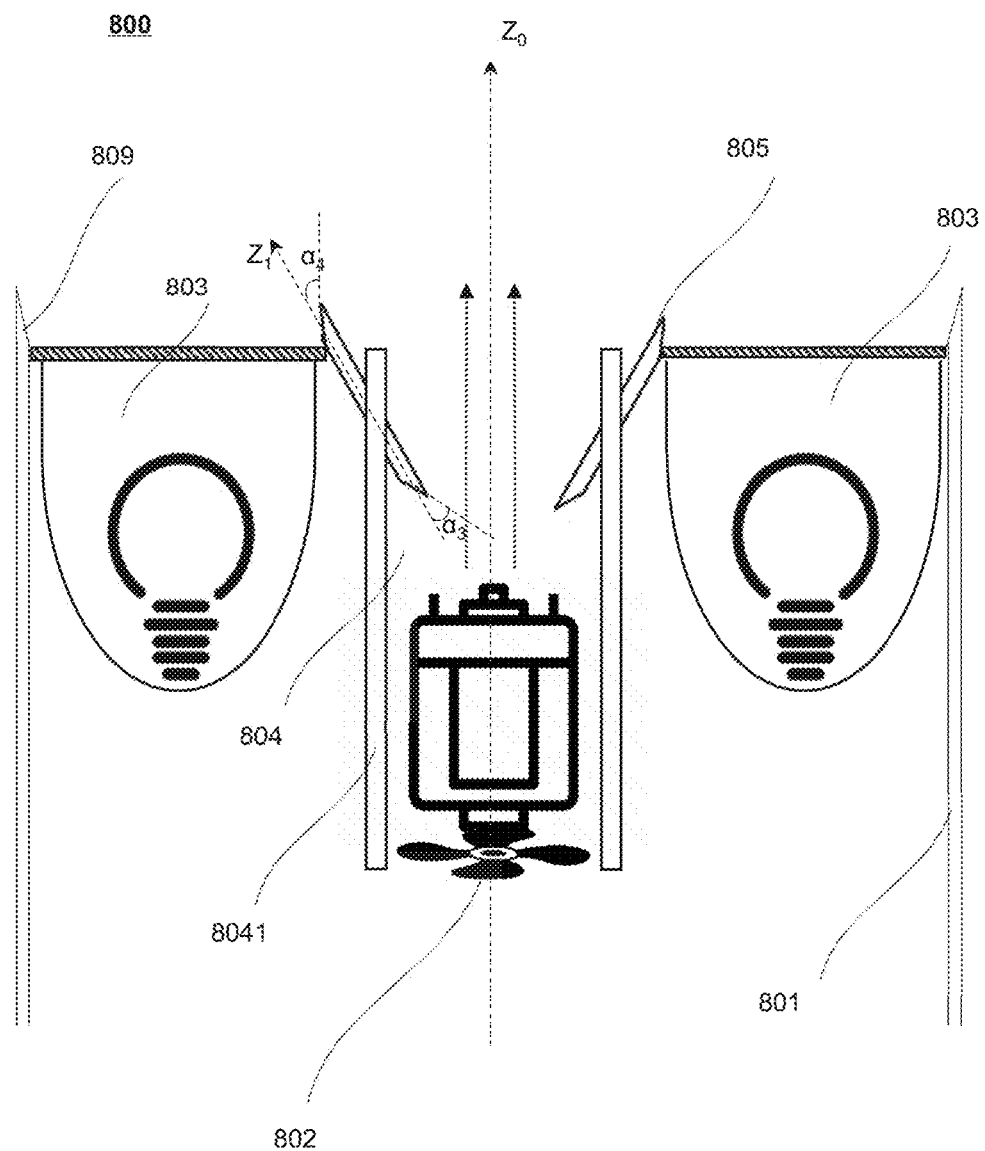
FIGS. 8A and 8B are schematics illustrating an exemplary drying apparatus 800 according to some embodiments of the present disclosure.
Figure 8B:
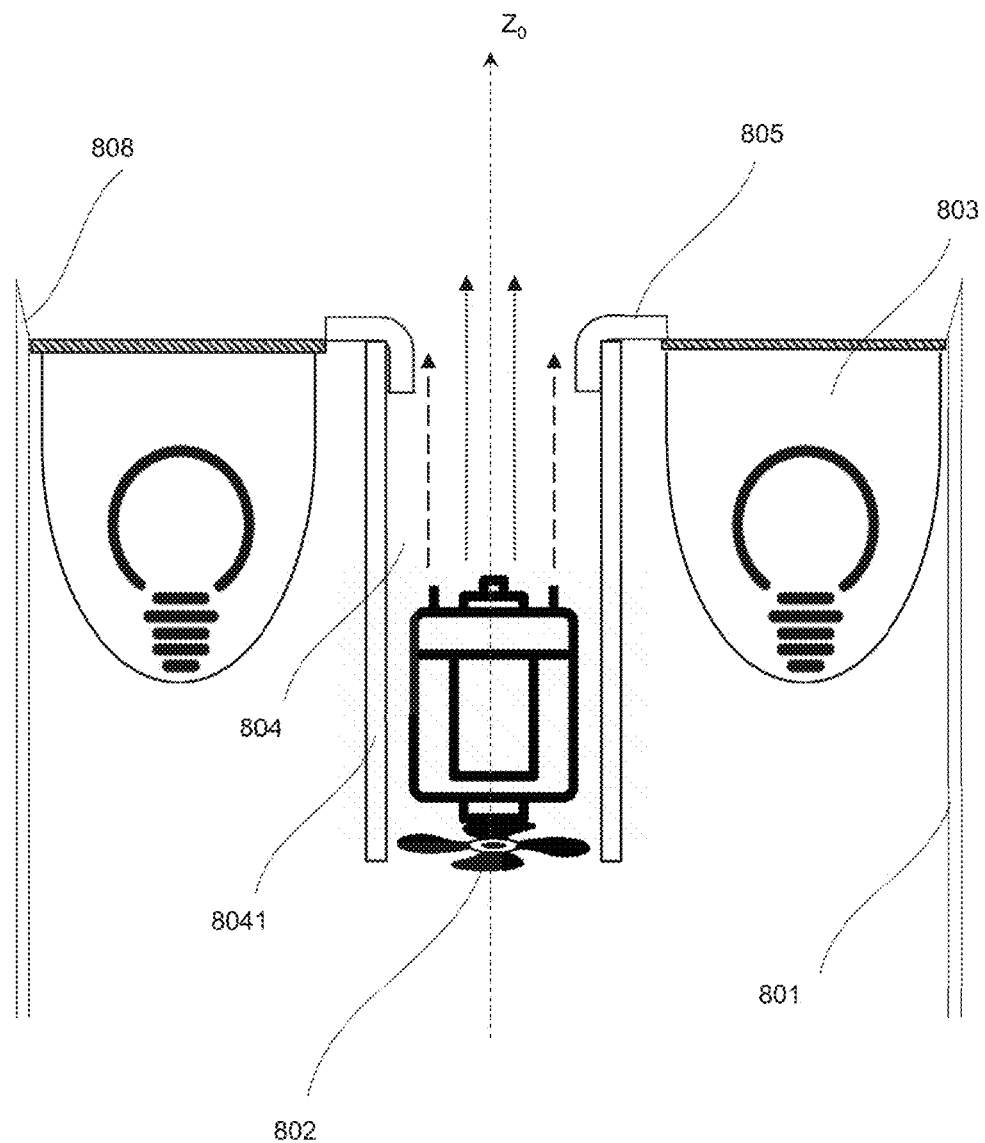

In some embodiments, the airflow guide assembly 103 may include a tube connecting the first airflow channel and the target region. A wall of the first airflow channel may be configured with an opening. The second airflow channel may be formed by the tube that is arranged between the opening and the target region. See, e.g., FIGS. 8A and 8B illustrating that the airflow guide assembly 103 may include a tube configured to provide the second airflow channel.

In some embodiments, the drying apparatus 100 may include a third airflow channel. The radiation energy sources 102 may be distributed in a space between the first airflow channel and the third airflow channel. The airflow guide assembly 103 may include one or more airflow guide members. Each of the one or more airflow guide members may be configured to form an airflow channel through which a portion of airflow in another airflow channel is guided to the target region. For example, the airflow guide assembly 103 may include a first airflow guide member and a second airflow guide member. The first airflow guide member may be configured to form the second airflow channel through which the second portion of the airflow in the first airflow channel is guided to the target region. The second airflow guide member may be configured to form a fourth airflow channel through which a portion of airflow in the third airflow channel is guided to the target region. See, e.g., FIGS. 9A, 9B, 10, and 17A-17D illustrating that the drying apparatus may include the third airflow channel.

In some embodiments, the airflow guide assembly 103 may be configured to guide the second portion of the airflow in the second airflow channel to a region outside the first airflow channel to mix with the first portion of the airflow.

Figure 7A:
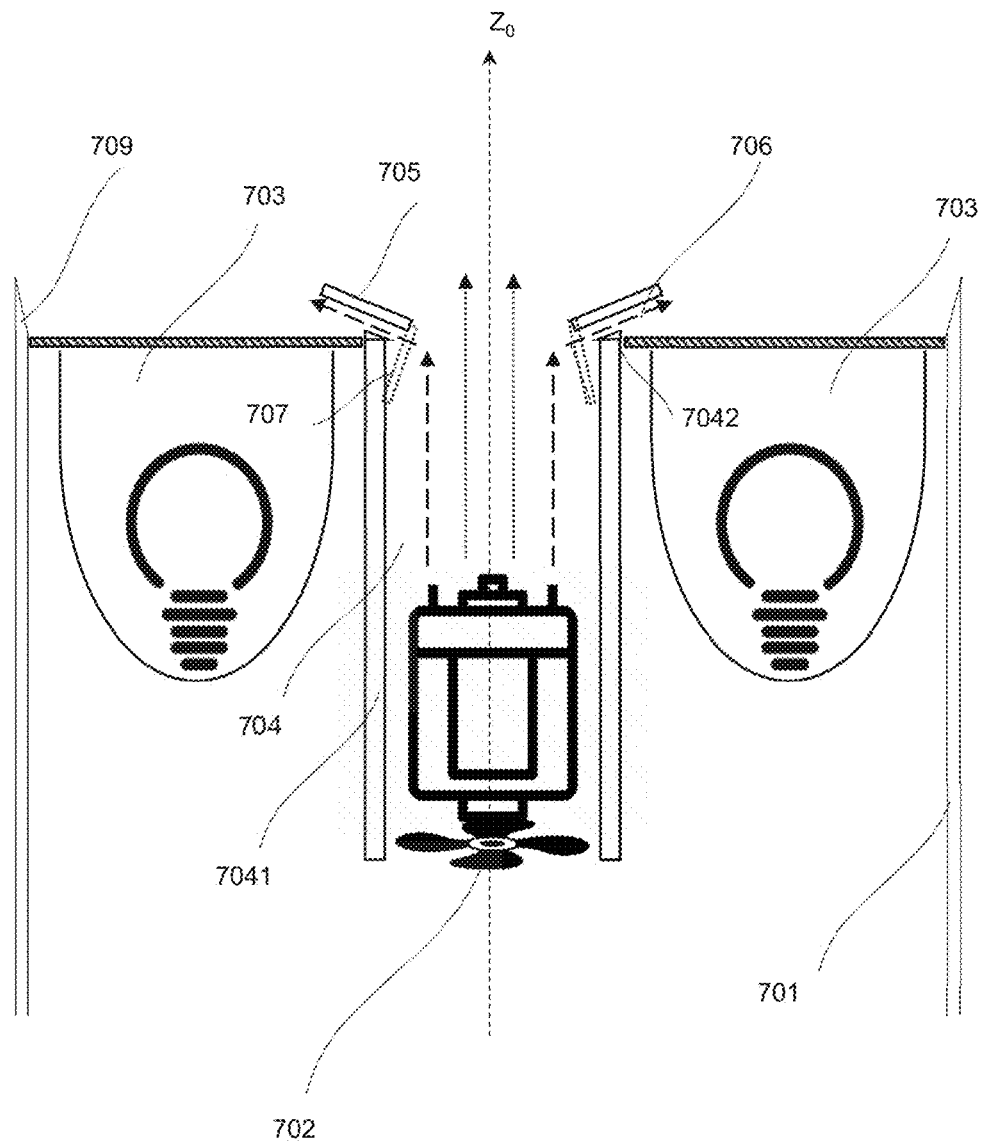
FIGS. 7A and 7B provide views of an exemplary drying apparatus 700 according to some embodiments of the present disclosure.

In some embodiments, a blocking member may be arranged in a path of the second portion of the airflow. The blocking member may be configured to change the path of the second portion of the airflow, so that the second portion of the airflow may form a vortex in the target region. The presence of a vortex in the target region may enhance the movement of air and therefore the heat exchange through the air movement in the target region, thereby achieving a more even temperature distribution in the target region. For example, an end of the housing where the airflow outlet is located may include a convex part. The convex part may serve as the blocking member that changes the path of the second portion of the airflow. See, e.g., FIGS. 7A, 8A, and 8B illustrating that an end of the housing where the airflow outlet is located may include a convex part.

The central processing unit 104 may be configured to regulate the operation of the drying apparatus 100 based on data received from the sensors 105. The central processing unit 104 may be provided either onboard the drying apparatus 100 or offboard the drying apparatus 100 (e.g., remote device, on the cloud) to regulate the operation of the drying apparatus 100 (e.g., a hair dryer). For example, the central processing unit 104 may be integrated into a user terminal. In some embodiments, the central processing unit 104 may be in communication with a user terminal associated with the object. A user of the user terminal may set or adjust parameters of the drying apparatus 100 via the user terminal. The central processing unit 104 may regulate the operation of the drying apparatus 100 through the parameters. The parameters may include a temperature of the airflow, a volume of the airflow, a velocity of the airflow, a velocity distribution of the airflow, a field area of the airflow, a pressure of the airflow, a direction of the airflow, etc.

The one or more sensors 105 configured to measure at least one of a parameter of the object, an operation of the drying apparatus 100, and/or a surrounding environment in which the drying apparatus 100 operates. Examples of regulating an operation of the drying apparatus 100 may include regulating an operation of one or more of the airflow generating element 101, the radiation energy sources 102, and the airflow guide assembly 103 based on a measurement received from the one or more sensors 105. In some embodiments, the one or more sensors 105 may include a proximity sensor, a temperature sensor, an inertial measurement unit (IMU), a humidity sensor, or the like, or any combination thereof. The proximity sensor may be configured to measure a proximity of the drying apparatus 100 to the object being radiated with the infrared radiation. The temperature sensor may be configured to measure an operating temperature of a component of the drying apparatus 100, a temperature of the object, a temperature of the surrounding environment where the drying apparatus 100 is located, or the like, or a combination thereof. The inertial measurement unit (IMU) may be configured to measure a movement and/or an attitude/orientation of the drying apparatus 100. The humidity sensor may be configured to measure a humidity of a surrounding environment in which the drying apparatus 100 is operated. In some embodiments, the one or more sensors 105 may be employed individually or collectively. The data from two or more sensors may be combined or fused. Data from one or more sensors may be processed within the context of one another. Data from one or more sensors may be weighted based on precision and/or reliability, etc.

Sensor data, which may include individual sensor data or combined sensor data, may be provided to the central processing unit 104 which regulates an operation of the drying apparatus 100. For instance, the drying apparatus 100 is a hair dryer; the central processing unit 104 may be configured to determine a total output power of the radiation energy source and/or a velocity of the airflow from the airflow generating element 10 based on at least one of the proximity of the hair dryer to the hair, the temperature of the hair being radiated with the infrared radiation, and the humidity of the surrounding environment. The central processing unit 104 may determine a parameter of at least one of the radiation energy sources 102 by searching a predetermined lookup table. In an example, sensor measurement from the proximity sensor indicates the user is holding the hair dryer too close to the hair and sensor measurement from the hair temperature sensor indicates the hair temperature is greater than a predetermined healthy temperature, then the central processing unit 104 may determine to decrease an output power of the radiation energy source and increase a velocity of the airflow from the airflow generating element, such that the hair temperature may be lowered to a value which is safe and healthy to hair. Further, the central processing unit 104 may determine to increase the radial lengths of the second airflow channel to increase a velocity of airflow in the target region. In another example, sensor measurement from the hair temperature sensor indicates the hair temperature is greater than a predetermined temperature and sensor measurement from the IMU indicates the hair dryer is stationery for a time longer than a predetermined time duration, then the central processing unit can determine to first send an alert to the user, and switch off the radiation energy source if the user does not move the hair dryer in a predetermined time duration.

In some embodiments, a plurality of components of the drying apparatus 100 may be connected to or communicate with each other via a wired connection or a wireless connection. The wired connection may include a metal cable, a fiber optic cable, a hybrid cable, or the like, or any combination thereof. The wireless connection may include a Local Area Network (LAN), a Wide Area Network (WAN), Bluetooth, a ZigBee, a Near Field Communication (NFC), or the like, or any combination thereof. For example, the central processing unit 104 may be in communication with the airflow generating element 101, the radiation energy sources 102, the airflow guide assembly 103, or the one or more sensors 105, etc., so that the central processing unit 104 manages these components based on the data measured by the one or more sensors 105.

It should be noted that the above description is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, the drying apparatus 100 may further include a feedback element. The feedback element may be configured to provide tactile feedback based on data received from sensors 105 of the drying apparatus 100. The tactile feedback may include at least one of visual, auditory, and haptic feedback. In an example, the feedback element may include a light indicator, for example, one or more light emitting diodes (LED). The LEDs may be arranged along a ring at the housing (e.g., the handle or the body) of the hair dryer. The LEDs may provide various lighting patterns to indicate the different status of the drying apparatus 100. The lighting pattern may include at least one of a lighting frequency, a color, and a number (or count) of LEDs being switched on.

Figure 3:
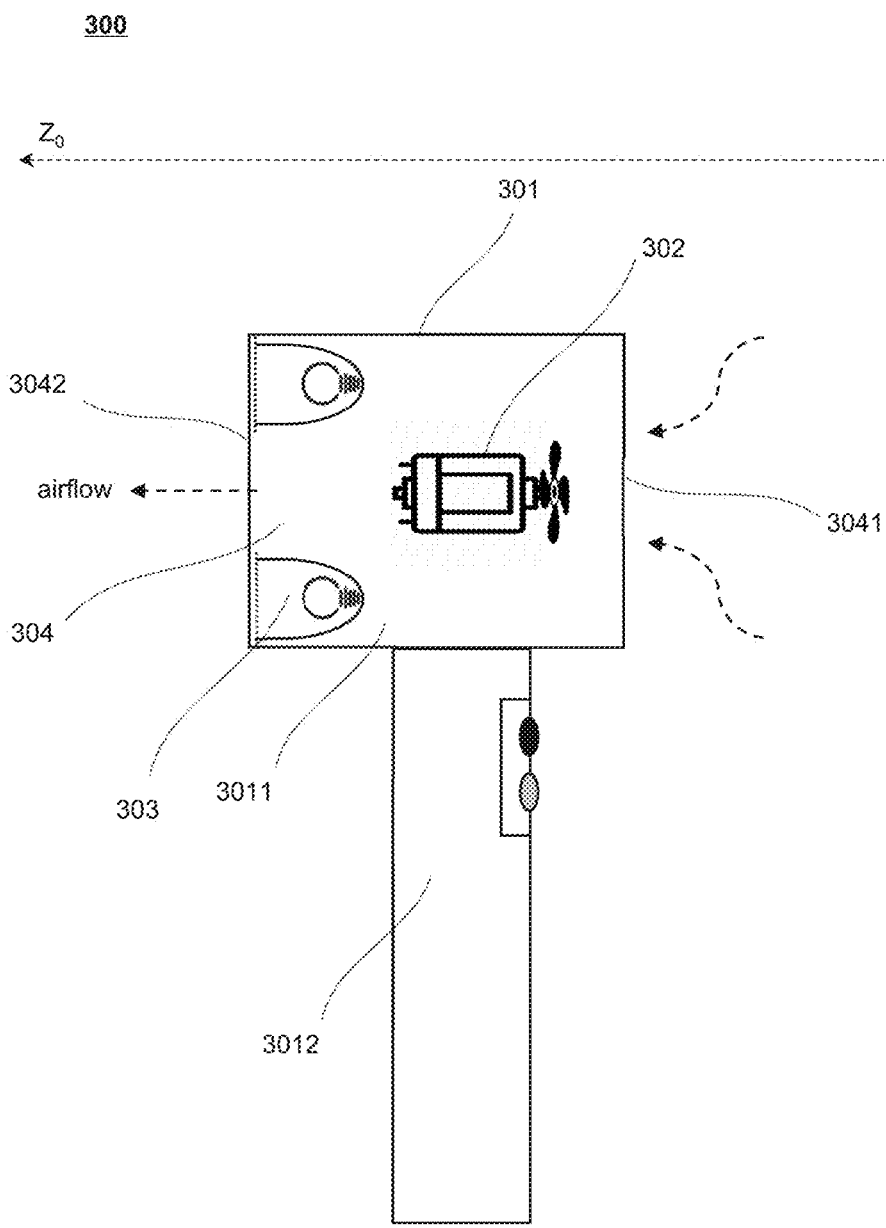
FIG. 3 is a schematic illustrating an exemplary drying apparatus 300 according to some embodiments of the present disclosure.

FIG. 3 is a schematic illustrating an exemplary drying apparatus 300 according to some embodiments of the present disclosure. In some embodiments, the drying apparatus 300 may be an exemplary embodiment of the drying apparatus 100 described in FIG. 1. The drying apparatus 300 (e.g., a hair dryer) may include a housing 301, an airflow generating element 302, one or more radiation energy sources 303, an airflow guide assembly (not shown), etc. Various electric, mechanical, and electromechanical components, such as the airflow generating element 302, the one or more one or more radiation energy sources 303, a control circuit (not shown), a power adaptor (not shown), and/or a central processing unit, may be arranged in the housing 301.

In some embodiments, the housing 301 may include a body 3011 and a handle 3012, each of which can receive therein at least a portion of the electric, mechanical, and electromechanical components. For example, the handle 3012 may contain therein one or more batteries which are used to power the drying apparatus 300 and the control circuit (not shown), a central processing unit (not shown), etc. The body 3011 may contain therein the airflow generating element 302, the one or more radiation energy sources 303, etc. In some embodiments, the body 3011 and the handle 3012 may be integral. In some instances, the body 3011 and the handle 3012 may be separate components. For instance, the handle 3012 may be detachable from the body 3011. In some embodiments, the body 3011 and the handle 3012 may be movably connected such that the handle 3012 may move relative to the body 3011. For instance, the handle 3012 may fold relative to the body 3011.

In some embodiments, the housing 301 may be made from an electrically insulating material having a high resistance to electrical flow. Exemplary electrically insulating materials may include polyvinyl chloride (PVC), a polyethylene terephthalate (PET), an acrylonitrile-butadiene-styrene copolymer (ABS), a polyester, a polyolefin, polystyrene, a polyurethane, a thermoplastic, silicone, a glass, fiberglass, a resin, a rubber, a ceramic, nylon, a wood, or the like. In some embodiments, the housing 301 may be made from a metallic material coated with an electrically insulating material, or a combination of an electrically insulation material and a metallic material coated or not coated with an electrically insulation material. For example, the electrically insulating material may form an inner layer of the housing 301, while the metallic material may form an outer layer of the housing 301.

In some embodiments, the housing 301 may provide a first airflow channel 304. For example, the housing 301 may serve as a wall of the first airflow channel 304 (e.g., the boundary of the first airflow channel 304). The airflow generated by the airflow generating element 302 may be directed and/or regulated through the first airflow channel 304 and toward the object. For instance, the first airflow channel 304 may be shaped to regulate a velocity, a throughput, an angle of divergence, and/or a vorticity of an airflow generated by the airflow generating element 302. As a further example, a cross-sectional shape of the wall of the first airflow channel 304 (e.g., an axial cross section or an axial view parallel to an axis of the first airflow channel 304) may vary along an axial direction $Z_0$ thereof to generate a desired velocity distribution and/or angle of divergence of the airflow exiting the drying apparatus 300. Unless otherwise stated, the dashed arrows in FIG. 3 illustrate the airflow in an airflow channel (e.g., the first airflow channel 304).

The first airflow channel 304 may have an airflow inlet 3041 and an airflow outlet 3042. In some embodiments, the airflow inlet 3041 and the airflow outlet 3042 may be positioned at opposite ends of the drying apparatus 300 along the axis of the first airflow channel 304. The airflow inlet 3041 and the airflow outlet 3042 may be vents that allow efficient airflow throughput. In some embodiments, the axial direction $Z_0$ may also be referred to as the longitudinal direction of the drying apparatus 300. The axial direction $Z_0$ may be the same as the direction of the airflow in the first airflow channel 304.

In some embodiments, one or more air filters may be provided at the airflow inlet 3041 to prevent dust or other undesired matters (e.g., hair) from entering the first airflow channel 304. For example, an air filter may be a mesh having an appropriate mesh size. The air filter may be detachable or replaceable for cleaning and maintenance. In some embodiments, an airflow regulator may be provided at the airflow outlet 3042. The airflow regulator may be a detachable nozzle, a comb, or a curler, etc. The airflow regulator may be configured to modulate the velocity, throughput, angle of divergence, or vorticity of an airflow blowing out from the airflow outlet 3042. For example, the airflow regulator may be shaped to converge (e.g., concentrate) the airflow at a predetermined distance in front of the airflow outlet 3042. As another example, the airflow regulator may be shaped to diffuse the airflow exiting the airflow outlet 3042.

Though the first airflow channel is illustrated in FIG. 3 as extending from the airflow inlet at one longitudinal end of the body of the housing to the airflow outlet at the other longitudinal end of the body of the housing, those skilled in the art can appreciate that the airflow inlet and/or airflow outlet may be distributed over the housing of the drying apparatus of the present disclosure, and more than one airflow channel and/or branches of the airflow channel may be provided within the housing of the drying apparatus. As an example, at least a portion of the airflow inlet may be positioned at the handle of the housing. As another example, at least a portion of the airflow outlet may be positioned at the handle of the housing, such that a portion of the airflow may be introduced to and flow through the one or more batteries received in the handle, thereby cooling down the one or more batteries.

The airflow generating element 302 may be configured to provide an airflow by effecting the airflow into the first airflow channel 304 through the airflow inlet 3041 and direct a first portion of the airflow in the first airflow channel 304 toward the airflow outlet 3042. In some embodiments, the airflow generating element 302 may include an impeller driven by a motor. The impeller may comprise a plurality of blades. When actuated by the motor, a rotation of the impeller may extract air into the first airflow channel 304 via the airflow inlet 3041 to generate the airflow, push the generated airflow through the first airflow channel 304 and eject the airflow out of the airflow outlet 3042. The motor may be supported by a motor holder or housed in a motor shroud. The motor may be a brushless motor of which a speed of rotation may be regulated under the control of a controller. For instance, a speed of rotation of the motor may be controlled by a preset program, a user's input, sensor data, or the like, or a combination thereof. In some embodiments, a dimension of the motor, measured in any direction, may be in a range from 14 mm (millimeter) to 21 mm. A power output of the motor may be in a range from 35 to 80 watts (W). A maximum velocity of the airflow exiting from the airflow outlet 3042 may be at least 8 meters/second (m/s). In some embodiments, the airflow generating element 302 may include a blower.

Though the airflow generating element 302 is illustrated in FIG. 3 as being received in the body of the housing, those skilled in the art can appreciate that it can also be positioned in the handle. For instance, a rotation of the impeller may extract air into a vent (e.g., the airflow inlet) provided at the handle and push the air through the first airflow channel to the airflow outlet provided at an end of the body of the housing. The first airflow channel may accordingly extend through the handle and body of the housing.

The one or more radiation energy sources 303 may be configured to provide thermal radiation toward an object. In some embodiments, at least one of the radiation energy sources 303 may include a reflector having an opening directed to the airflow outlet 3042 of the first airflow channel 304 and a radiation emitter positioned within an interior of the reflector. The radiation emitter may be configured to emit radiation within a predetermined wavelength range. The radiation emitted from the radiation emitter may be reflected by a reflecting surface (e.g., inner surface) of the reflector toward an exterior of the drying apparatus 300 through the opening. For example, at least one of the radiation energy sources 303 may include an infrared lamp and the infrared lamp may include a radiation emitter configured to emit radiation having a predetermined wavelength and a reflector configured to reflect the radiation toward the airflow outlet of the first airflow channel. In some embodiments, at least one of the radiation energy sources 303 may include a radiation emitter enclosure and a radiation emitter positioned within an interior of the radiation emitter enclosure. In another example where a laser device is utilized as the radiation emitter, a reflector may be unnecessary.

In some embodiments, the radiation emitter may be a conductive heater (e.g., a heater operated on a metal resistor or a carbon fiber) or a ceramic heater. Exemplary metal resistors may include a tungsten filament and a chrome filament (e.g., an alloy of nickel and chrome, also known as nichrome). Exemplary ceramic heaters may include a positive temperature coefficient (PTC) heater, a metal-ceramic heater (MCH), etc. A ceramic heater may include metal heating elements buried inside the ceramics, for example, tungsten inside silicon nitride or silicon carbide. The radiation emitter may be provided in a form of wire (e.g., filament). The wire may be patterned (e.g., spiral filament) to increase the length and/or surface thereof. The radiation emitter may also be provided in a form of a rod. For example, the radiation emitter may be a silicon nitride rod, a silicon carbide rod, or a carbon fiber rod having a predetermined diameter and a length.

In some embodiments, an optical element may be provided at the opening of the reflector. The optical element may abut against the opening of the reflector in an air-tight manner. The optical element may include a lens, a reflector, a prism, a grating, a beam splitter, a filter, or a combination thereof that modifies or redirects light. In some embodiments, the radiation energy sources 303 may share the same optical element. In some embodiments, the optical element may be made from a material having a high infrared transmissivity. Exemplary materials for the optical element may include an oxide (e.g., silicon dioxide), a metal fluoride (e.g., a calcium fluoride, a barium fluoride), a metal sulfide, a metal selenide (e.g., a zinc sulfide, a zinc selenide), or a crystal (e.g., crystalline silicon, crystalline germanium). Additionally or either or both sides of the optical element may be coated with a material absorbing visible spectrum and ultraviolet spectrum, such that the only wavelength in the infrared range may pass through the optical element and the radiation not in the infrared spectrum may be filtered out (e.g., absorbed) by the optical element. In some embodiments, the optical element may be shaped to converge or diverge the arriving radiation in a predetermined direction or to reduce or increase a divergence angle of the arriving radiation beam. For example, the optical element may be provided to diverge the radiation from the radiation emitter to increase a divergence angle of the arriving radiation beam, thereby increasing an area that is radiated by the infrared radiation. As another example, the optical element may be provided to converge the radiation from the radiation emitter to reduce a divergence angle of the arriving radiation beam, thereby decreasing an area that is radiated by the infrared radiation, which increases the heat transfer efficiency of the drying apparatus 300.

In some embodiments, a thermally insulating material (e.g., fiberglass, mineral wool, cellulose, polyurethane foam, or polystyrene) may be interposed between the radiation emitter and the reflector, such that the radiation emitter is thermally insulated from the reflector. The thermal insulation may keep a temperature of the reflector from increasing even if a temperature of the radiation emitter is high. A thermally insulating material may also be interposed between a periphery of the optical element and the reflector, such that the optical element is thermally insulated from the reflector.

The radiation energy sources 303 may be positioned within the first airflow channel 304 and occupy a portion of the volume of the first airflow channel 304. In other words, the radiation energy sources 303 may be within an area of the first airflow channel 304 as viewed in a cross-sectional view (e.g., an axial cross-sectional view (or an axial view for brevity)) of the drying apparatus 300 and are not separated from the first airflow channel 304 by, e.g., a wall of the first airflow channel 304. The airflow in the first airflow channel 304 may traverse at least a portion of the radiation energy sources 303 (e.g., a surface of a radiation energy source 303 that faces the airflow). In some embodiments, the body 3011 may include a cavity defined by the housing 301. The radiation energy sources 303 may be in the cavity, and the housing 301 may serve as a wall of the first airflow channel 304 (e.g., as the boundary of the first airflow channel 304).

In the example shown in FIG. 3, the radiation energy sources 303 may be arranged inside the first airflow channel 304 along a ring. In some embodiments, the one or more radiation energy sources 303 may be arranged along a contour of any shape, such as a triangle, a square, a sector, etc., inside the first airflow channel 304. In some embodiments, the radiation energy sources 303 may be arranged in an array inside the first airflow channel 304. In some embodiments, the radiation energy sources 303 may be positioned substantially at a geometrical center of the first airflow channel 304. In some embodiments, the radiation energy sources 303 may be positioned substantially at a geometrical center of the airflow outlet 3042.

In some embodiments, the airflow generating element 302 and the radiation energy sources 303 may be the same as or similar to the airflow generating element 101 and the radiation energy sources 102 described in FIG. 1, respectively, the descriptions of which are not repeated here.

In some embodiments, the drying apparatus 300 may include an airflow guide assembly (not shown in FIG. 3). The airflow guide assembly may be configured to provide a second airflow channel through which a second portion of the airflow in the first airflow channel 304 is guided to a target region. The target region may abut the at least one of the radiation energy sources 303. For example, the target region may be located outside and abut the optical element of the at least one of the radiation energy sources 303. More descriptions for the airflow guide assembly may be found elsewhere in the present disclosure. See, e.g., FIGS. 1, 4A-5E, and the descriptions thereof. More descriptions for the target region may be found elsewhere in the present disclosure (e.g., FIG. 1 and the descriptions thereof). In some embodiments, a target region may exist outside each of the radiation energy sources 303. In some embodiments, a target region may exist outside each of a portion of the radiation energy sources 303.

It should be noted that the above description is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, the housing 301 may lack the handle 3012. In some embodiments, the drying apparatus 300 may include a power element configured to energize the one or more radiation energy sources 303 and the airflow generating element 302. In some embodiments, the drying apparatus 300 may be powered with an external power source. The power element may include a power adapter that regulates a voltage and/or a current received from the external power source. For example, the drying apparatus 300 may be energized by being electrically connected to an external battery or a power grid via a power cord. Additionally or alternatively, the drying apparatus 300 may be powered with an embedded power source. The power element may include one or more batteries arranged in the housing 301. The batteries may be rechargeable (e.g., secondary batteries) and/or replaceable. For example, the batteries may be arranged in a handle of the housing 301 of the drying apparatus 300. A status of the batteries (e.g., a battery charge status, the level of remaining power) may be provided by means of, for example, a screen or light-emitting diode (LED) indicator on the housing 301.

Figure 4A:
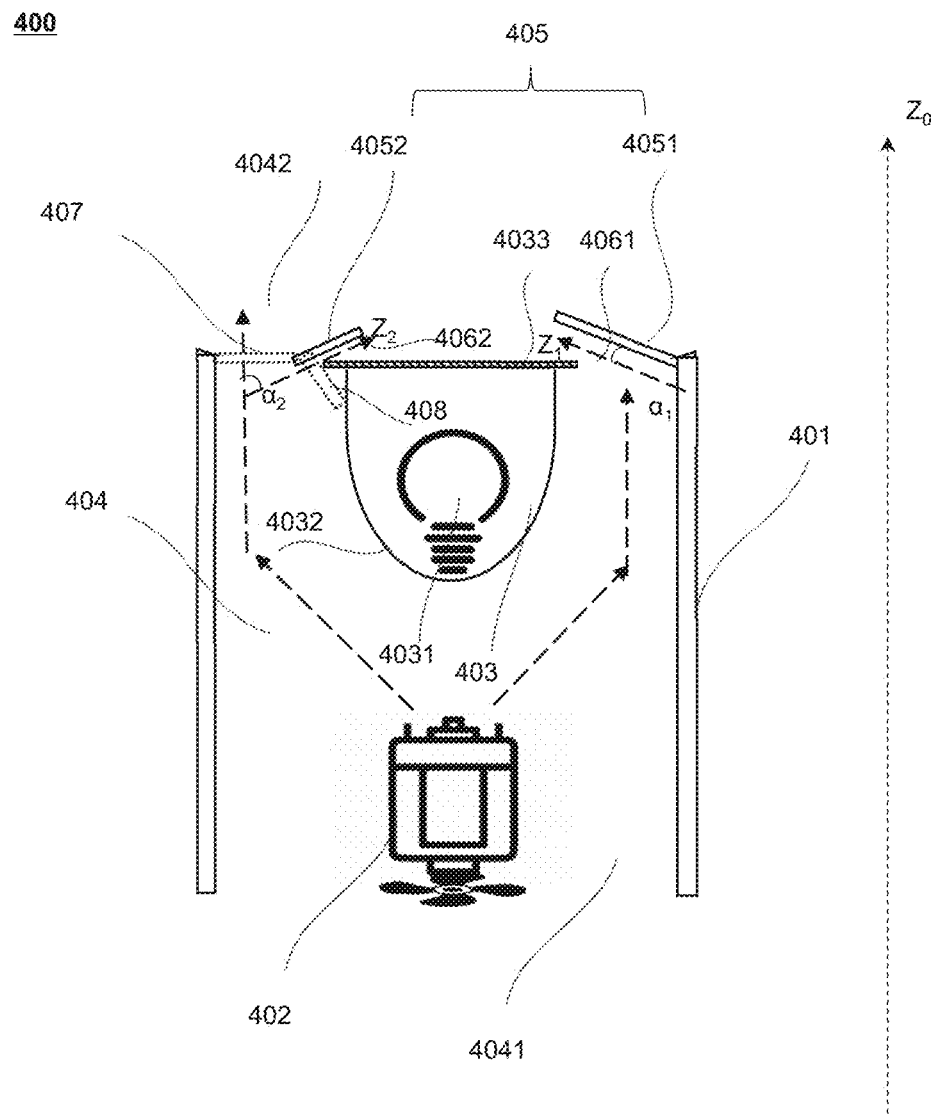
FIGS. 4A-4F provide views of an exemplary drying apparatus 400 according to some embodiments of the present disclosure.
Figure 4B:
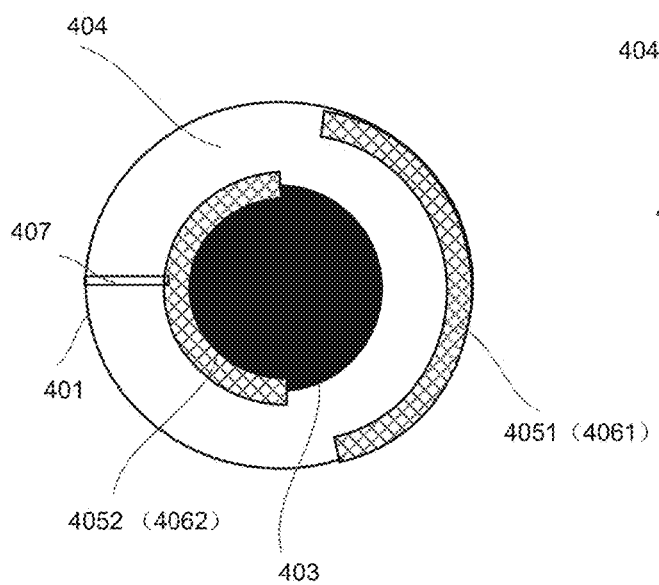
Figure 4C:
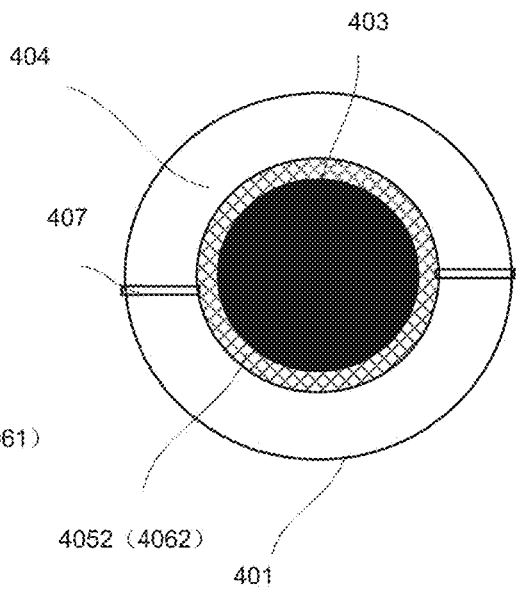
Figure 4D:
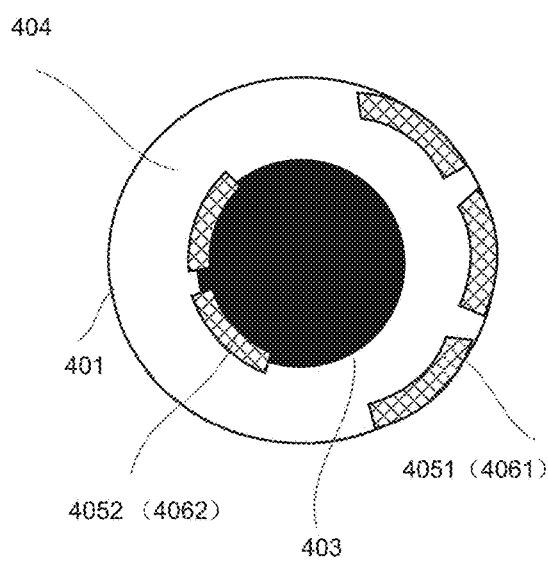
Figure 4E:
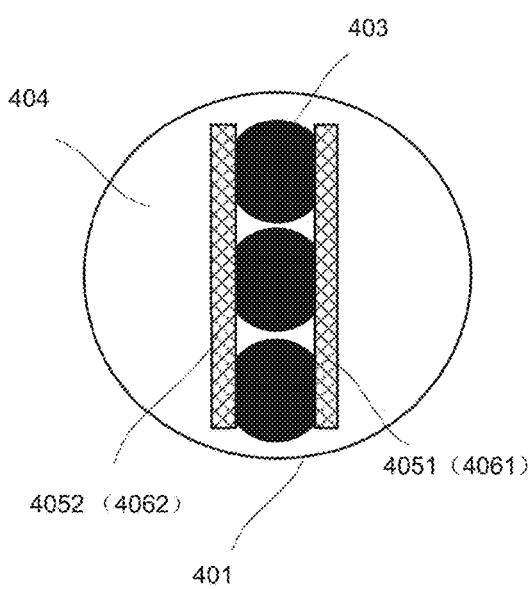

FIGS. 4A-4F provide views of an exemplary drying apparatus 400 according to some embodiments of the present disclosure. In some embodiments, the drying apparatus 400 may be an exemplary embodiment of the drying apparatus 100 described in FIG. 1 or an exemplary embodiment of the body of the drying apparatus 300. As shown in FIGS. 4A-4F, the drying apparatus 400 may include a housing 401, an airflow generating element 402, a radiation energy source 403, a first airflow channel 404, and an airflow guide assembly 405. Unless otherwise stated, the dashed arrows in FIG. 4A illustrate the airflow in an airflow channel (e.g., the first airflow channel 404, the second airflow channel).

The first airflow channel 404 may have an airflow inlet 4041 and an airflow outlet 4042. The airflow generating element 402 may be configured to effect an airflow into the first airflow channel 404 through the airflow inlet 4041 and direct at least a portion (e.g., a first portion) of the airflow in the first airflow channel 404 toward the airflow outlet 4042. The radiation energy source 403 may be configured to provide thermal radiation toward an object.

In some embodiments, the radiation energy source 403 may include a lamp (e.g., an infrared lamp). The infrared lamp may include a reflector 4032 having an opening directed to the airflow outlet 4042 of the airflow channel and a radiation emitter 4031 positioned within an interior of the reflector 4032. The radiation emitter 4031 may be configured to emit radiation within a predetermined wavelength range. The radiation emitted from the radiation emitter 4031 may be reflected by a reflecting surface (e.g., inner surface) of the reflector 4032 toward an exterior of the drying apparatus 400. In some instances, the radiation emitted by the radiation emitter 4031 may substantially cover the visible spectrum from 0.4 to 0.7 microns and infrared spectrum above 0.7 microns. In some instances, the radiation emitted by the radiation emitter 4031 may substantially cover the infrared spectrum only. In an exemplary example, the radiation emitter 4031, when energized, may emit radiation having a wavelength from 0.7 to 20 microns. In some embodiments, a power density of radiation emitted by the radiation emitter 4031 may exceed 1 $kW/m^2$. In some embodiments, the power density of radiation emitted by the radiation emitter 4031 may exceed 10 $kW/m^2$. In some embodiments, the power density of radiation emitted by the radiation emitter 4031 may exceed 100 $kW/m^2$. In some embodiments, the power density of radiation emitted by the radiation emitter 4031 may exceed 500 $kW/m^2$. The power density of radiation emitted from the radiation emitter 4031 may be adjustable under different operation modes of the drying apparatus 400, e.g., a hair drier (e.g., a rapid-dry mode, a hair-health mode, etc.), for example, by changing an electric voltage and/or current supplied thereto.

The reflector 4032 may be configured to regulate the radiation emitted from the radiation emitter 4031. For instance, the reflector 4032 may be shaped to reduce a divergence angle of the reflected beam of radiation. In an embodiment, the reflector 4032 may substantially have a cone shape as shown in FIG. 4. For instance, an axial view of a reflecting surface of the reflector may be parabolic. The radiation emitter 4031 may be positioned at a focal point of the parabola, such that the reflected beam of radiation may be a substantially parallel beam of radiation. In some embodiments, the radiation emitter 4031 may be positioned to offset the focal point of the parabola, such that the reflected beam of radiation can be convergent or divergent at a distance in front of the drying apparatus 400. A position of the radiation emitter 4031 in the reflector 4032 may be adjustable, and therefore a degree of convergence and/or a direction of the output beam of radiation may be changed. The shape of the reflector 4032 and the shape of the radiation emitter 4031 may be optimized and varied with respect to each other for desired heating power output at a desired position exterior to the drying apparatus 400.

In some embodiments, the reflecting surface of the reflector 4032 may be coated with a coating material having a high reflectivity to a wavelength or a range of wavelength of the radiation emitted by the radiation emitter. For instance, the coating material may have a high reflectivity to a wavelength in both visible spectrum and infrared light spectrum. A material having high reflectivity may have a high effectiveness in reflecting radiant energy. Examples of the coating material may include metallic material and dielectric material. The metallic material may include, for example, gold, silver, and aluminum. The dielectric coating may have layers of alternating dielectric materials such as magnesium fluoride and calcium fluoride. The reflectivity of the coated reflecting surface of the reflector may be at least 90% (e.g., 90% of the incident radiation is reflected by the reflecting surface of the reflector), 90.5%, 91%, 91.5%, 92%, 92.5%, 93%, 93.5%, 94%, 94.5%, 95%, 95.5%, 96%, 96.5%, 97%, 97.5%, 98%, 98.5%, 99%, 99.5%, 99.6%, 99.7%, 99.8%, 99.9% or higher. In some instances, the reflectivity of the coated reflecting surface of the reflector 4032 may be substantially 100%, meaning that substantially all the radiation emitted by the radiation emitter can be reflected toward an exterior of the hair dryer. As a result, the temperature on a surface of the reflector is substantially not increased by the radiation emitted from the radiation emitter, even if the temperature of the radiation emitter is high.

An optical element 4033 may be provided at the opening of the reflector 4032. The optical element 4033 may abut against the opening of the reflector 4032 in an air-tight manner. The optical element may include a lens, a reflector, a prism, a grating, a beam splitter, a filter, or a combination thereof that modifies or redirects light. In some embodiments, the optical element 4033 may include a lens. In some embodiments, the optical element 4033 may include a Fresnel lens.

The reflector 4032 and the optical element 4033 may serve as one or more surfaces of the radiation energy source 403. For example, the reflector 4032 may constitute a first surface (also referred to as a side surface) of the radiation energy source 403; the optical element 4033 may constitute a second surface (also referred to as an upper surface) of the radiation energy source 403. In some embodiments, the reflector 4032 of the radiation energy source 403 may be air impermeable so that air does not penetrate into the inside of the radiation energy source 403 by passing through the reflector 4032. For instance, no holes are present on the reflector 4032 to allow air to pass through. In some embodiments, the optical element 4033 may be configured with holes. In some embodiments, the optical element 4033 may be omitted. In some embodiments, the optical element 4033 may be air impermeable.

The radiation energy source 403 may be positioned inside the first airflow channel 404. The first surface of the radiation energy source 403 may face the airflow in the first airflow channel 404. The radiation energy source 403 may be not separated from the first airflow channel 404 by, e.g., an airflow channel wall such that the airflow in the first airflow channel 404 may traverse the first surface of the radiation energy source 403. More descriptions for the housing, the airflow generating element, and the radiation energy source may be found elsewhere in the present disclosure (e.g., FIGS. 1-3 and the descriptions thereof).

In some embodiments, the airflow guide assembly 405 may be configured to provide a second airflow channel through which a second portion of the airflow in the first airflow channel 404 is guided to a target region. In some embodiments, the target region may abut at least one of the radiation energy source 403. For example, the target region may be close to the optical element 4033. As a further example, radiation emitted by the radiation energy source 403 may traverse the target region before impinging on an object to be dried. More descriptions for the target region may be found elsewhere in the present disclosure (e.g., FIG. 1 and the descriptions thereof).

In the exemplary drying apparatus 400 shown in FIGS. 4A and 4B, the airflow guide assembly 405 may be arranged at the airflow outlet 4042. In some embodiments, the airflow guide assembly 405 may include a first airflow guide member 4051 and/or a second airflow guide member 4052. The first airflow guide member 4051 and/or the second airflow guide member 4052 may be positioned along a periphery of the radiation energy source 403. The first airflow guide member 4051 may be arranged along half of the periphery of the radiation energy source 403. The second airflow guide member 4052 may be arranged along another half of the periphery of the radiation energy source 403. The first airflow guide member 4051 may be positioned on the housing 401. The second airflow guide member 4052 may be positioned on the radiation energy source 403 and/or physically connected with the housing 401. The first airflow guide member 4051 and the second airflow guide member 4052 may be separate pieces as illustrated in FIG. 4B. Each of the first airflow guide member 4051 and the second airflow guide member 4052 may have the shape of an arc.

Figure 4F:
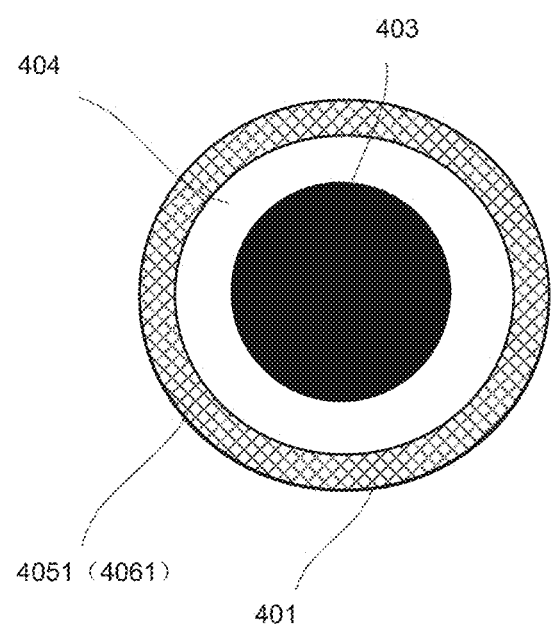

In some embodiments, the first airflow guide member 4051 and the second airflow guide member 4052 may both be positioned at one location. For example, the first airflow guide member 4051 and the second airflow guide member 4052 may both be positioned on the radiation energy source 403 as illustrated in FIG. 4C. As another example, the first airflow guide member 4051 and the second airflow guide member 4052 may both be positioned on the housing 401 as illustrated in FIG. 4F. The first airflow guide member 4051 and the second airflow guide member 4052 may be an integral piece or composed of multiple pieces. In some embodiments, the airflow guide assembly 405 may include airflow guide members positioned at different locations. For instance, the airflow guide assembly 405 may include three first airflow guide members 4051 mounted on or physically connected with the housing 401 and two second airflow guide members 4052 arranged along the periphery of the radiation energy source 403 as illustrated in FIG. 4D. It should be noted that the descriptions of the single radiation energy source 403 as shown in FIGS. 4A through 4D and FIG. 4F are merely provided for illustration, and not intended to limit the scope of the present disclosure. It is understood that the drying apparatus 400 may include more than one radiation energy source. For example, more than one radiation energy source of the drying apparatus 400 may be arranged in an array of one row or one column as illustrated in FIG. 4E. The first airflow guide member 4051 and the second airflow guide member 4052 may be positioned by one or more sides of the array (e.g., a row, a column) of more than one radiation energy source. Either the first airflow guide member 4051 or the second airflow guide member 4052 may have the shape of, e.g., a rectangle.

Returning to FIG. 4A, in some embodiments, the first airflow guide member 4051 and the housing 401 may be an integral piece. For example, the first airflow guide member 4051 may be an extension of the housing 401. The extension of the housing 401 may bend toward the target region or the airflow outlet 4042 to form the first airflow guide member 4051. In some embodiments, the first airflow guide member 4051 and the housing 401 may be separate pieces.

In some embodiments, the second airflow guide member 4052 may be mounted on the reflector 4032 of the radiation energy source 403 and/or the housing 401 by one or more supporting components, e.g., a supporting component 407, a supporting component 408. In some embodiments, two ends of the supporting component 407 may connect the housing 401 and the second airflow guide member 4052, respectively. In some embodiments, two ends of the supporting component 408 may connect the second airflow guide member 4052 and the radiation energy source 403 (e.g., the reflector 4032 of the radiation energy source 403), respectively. In some embodiments, a supporting component may include a bar, a rod, etc. (instead of a board or plate), that occupies little space or volume in the first airflow channel 404 so as to exert minimal impact on the airflow traveling in the first airflow channel 404. In some embodiments, one or both of the supporting components 407 and 408 may be employed to support the second airflow guide member 4052. In some embodiments, the lengths of the supporting components 407 and 408 may be adjusted automatically or manually. For example, the supporting components 407 and 408 may include telescopic rods. In some embodiments, the telescopic rods may be driven to stretch out and/or draw back by a motor. In some embodiments, the telescopic rods may be stretched out and/or drawn back manually. The exemplary mounting manners of the first airflow guide member 4051 and the second airflow guide member 4052 are provided for illustration purposes. In some embodiments, the first airflow guide member 4051 may be mounted in a similar manner as the second airflow guide member 4052. Merely by way of example, both the first airflow guide member 4051 and the second airflow guide member 4052 may be mounted on the reflector 4032 via at least one supporting component 408. As another example, both the first airflow guide member 4051 and the second airflow guide member 4052 may be mounted on the housing 401 via at least one supporting component 407. In some embodiments, the first airflow guide member 4051 and the second airflow guide member 4052 may be mounted in different manners. Merely by way of example, the first airflow guide member 4051 may be an extension of the housing 401, while the second airflow guide member 4052 may be mounted on the housing 401 via at least one supporting component 407. As another example, the first airflow guide member 4051 may be mounted on the reflector 4032 via at least one supporting component 408, while the second airflow guide member 4052 may be mounted on the housing 401 via at least one supporting component 407.

In some embodiments, the second airflow channel may include an airflow channel portion 4061 provided by the first airflow guide member 4051 and/or an airflow channel portion 4062 provided by the second airflow guide member 4052. In some embodiments, the airflow channel portion 4061 and/or the airflow channel portion 4062 may be continuous when the first airflow guide member 4051 and/or the second airflow guide member 4052 are an integral piece as illustrated in FIGS. 4C and 4F. In some embodiments, one or both of the airflow channel portion 4061 and the airflow channel portion 4062 may be discontinuous as exemplified in FIGS. 4B, 4D, and 4E.

Each of the airflow channel portion 4061 and the airflow channel portion 4062 may include an inflow section and an outflow section. At least a portion of the second portion of the airflow may enter either the airflow channel portion 4061 or the airflow channel portion 4062 through the inflow section; at least a portion of the second portion of the airflow may exit either the airflow channel portion 4061 or the airflow channel portion 4062 and guided toward the target region through the outflow section. In some embodiments, the outflow section of the airflow channel portion 4061 (or the airflow channel portion 4062) may be outside the first airflow channel 404. In some embodiments, the inflow section of the airflow channel portion 4061 (or the airflow channel portion 4062) may be outside the first airflow channel 404. For instance, the inflow section may be slightly (e.g., no more than 10 millimeters, or 8 millimeters, or 5 millimeters, or 3 millimeters, etc.) away from the airflow outlet 4042 of the first airflow channel 404. In some embodiments, the inflow section of the airflow channel portion 4061 (or the airflow channel portion 4062) may be within the first airflow channel 404.

In some embodiments, the airflow channel portion 4061 (including the inflow section and the outflow section) may be formed between a surface of the first airflow guide member 4051 and one or more surfaces of the radiation energy source 403. With reference to the airflow guide assembly 405 illustrated in FIG. 4A, the airflow channel portion 4061 may be formed between the surface of the airflow guide assembly 405 facing the radiation energy source 403 and the surface of the radiation energy source 403 defined by the optical element 4033.

In some embodiments, the airflow channel portion 4062 may be formed between a surface of the second airflow guide member 4052 and one or more surfaces of the radiation energy source 403. With reference to the airflow guide assembly 405 illustrated in FIG. 4A, the airflow channel portion 4062 may be formed between a surface of the second airflow guide member 4052 facing the radiation energy source 403 and the second surface of the radiation energy source 403 defined by a portion of the optical element 4033. As illustrated in FIG. 4A, at least a portion of the second airflow guide member 4052 may be positioned outside the first airflow channel 404.

In some embodiments, an angle (e.g., angle $\alpha_1$, angle $\alpha_2$) between a direction of the first airflow channel 404 and a direction of the second airflow channel (or referred to as an angle between the first airflow channel 404 and the second airflow channel for brevity) may range from 30 degrees to 90 degrees. The direction of the first airflow channel 404 may be along the axis of the first airflow channel 404 (i.e., $Z_0$ direction as shown in FIG. 4A). The direction of the second airflow channel (e.g., the airflow channel portion 4061, the airflow channel portion 4062) may be along the axis of the second airflow channel (e.g., $Z_1$ direction and $Z_2$ direction as shown in FIG. 4A).

In some embodiments, an airflow channel (e.g., the airflow channel portion 4061) may include multiple sections, e.g., the airflow channel portion 4061 including an inflow section and an outflow section. In such cases, the angle between the first airflow channel 404 and the second airflow channel (or a portion thereof, e.g., portion 4061, portion 4062 as illustrated in FIG. 4A) may be deemed to be the larger one of a first angle between the first airflow channel 404 and the inflow section of the second airflow channel and a second angle between the first airflow channel 404 and the outflow section of the second airflow channel. For instance, the angle between the first airflow channel 404 and the airflow channel portion 4061 as illustrated in FIG. 4A is deemed to be the larger one of a first angle between the first airflow channel 404 and the inflow section of the airflow channel portion 4061 and a second angle between the first airflow channel 404 and the outflow section of the airflow channel portion 4061. In some embodiments, the first angle between the first airflow channel 404 and the inflow section of the second airflow channel may be equal to the second angle between the first airflow channel 404 and the outflow section of the second airflow channel. See, e.g., the angles $\alpha_1$ and $\alpha_2$ illustrated in FIG. 4A. In some embodiments, the first angle between the first airflow channel 404 and the inflow section of the second airflow channel may be different from the second angle between the first airflow channel 404 and the outflow section of the second airflow channel. See, e.g., the first angle between the first airflow channel 504 and section I (inflow section) of the second airflow channel and the second angle between the first airflow channel 504 and section II (outflow section) of the second airflow channel illustrated in FIG. 5A. In some embodiments, the angle (e.g., angle $\alpha_1$, angle $\alpha_2$) may range from 45 degrees to 90 degrees, or from 60 degrees to 90 degrees, or from 70 degrees to 85 degrees, etc.

In some embodiments, the angle (e.g., angle $\alpha_1$, angle $\alpha_2$) between the first airflow channel 404 and the second airflow channel may be adjusted or determined based on factors including, e.g., a radiation intensity in the target region, an area of the target region, the location of the target region, the velocity of the airflow, a distance between the radiation energy source 403 and the wall of the first airflow channel 404, or the like, or any combination thereof. For example, the greater the radiation intensity in the target region, the greater (i.e., closer to 90 degrees) the angles $\alpha_1$ and/or $\alpha_2$ may be. As another example, the larger the area of the target region, the greater (i.e., closer to 90 degrees) the angles $\alpha_1$ and/or $\alpha_2$ may be. As still another example, the smaller the velocity of airflow, the greater the angles $\alpha_1$ and/or $\alpha_2$ may be. As a further example, the greater the distance between the radiation energy source 403 and the wall of the first airflow channel 404, the greater the angles $\alpha_1$ and/or $\alpha_2$ may be. As still a further example, the greater the distance between the optical element 4033 and the target region, the smaller the angles $\alpha_1$ and/or $\alpha_2$ may be. More descriptions for the airflow guide assembly 405 may be found elsewhere in the present disclosure (e.g., FIGS. 11-13 and the descriptions thereof).

It should be noted that the above description is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, the first airflow guide member 4051 may be the same as or similar to the first airflow guide member 1051 as described in FIG. 10.

Figure 5A:
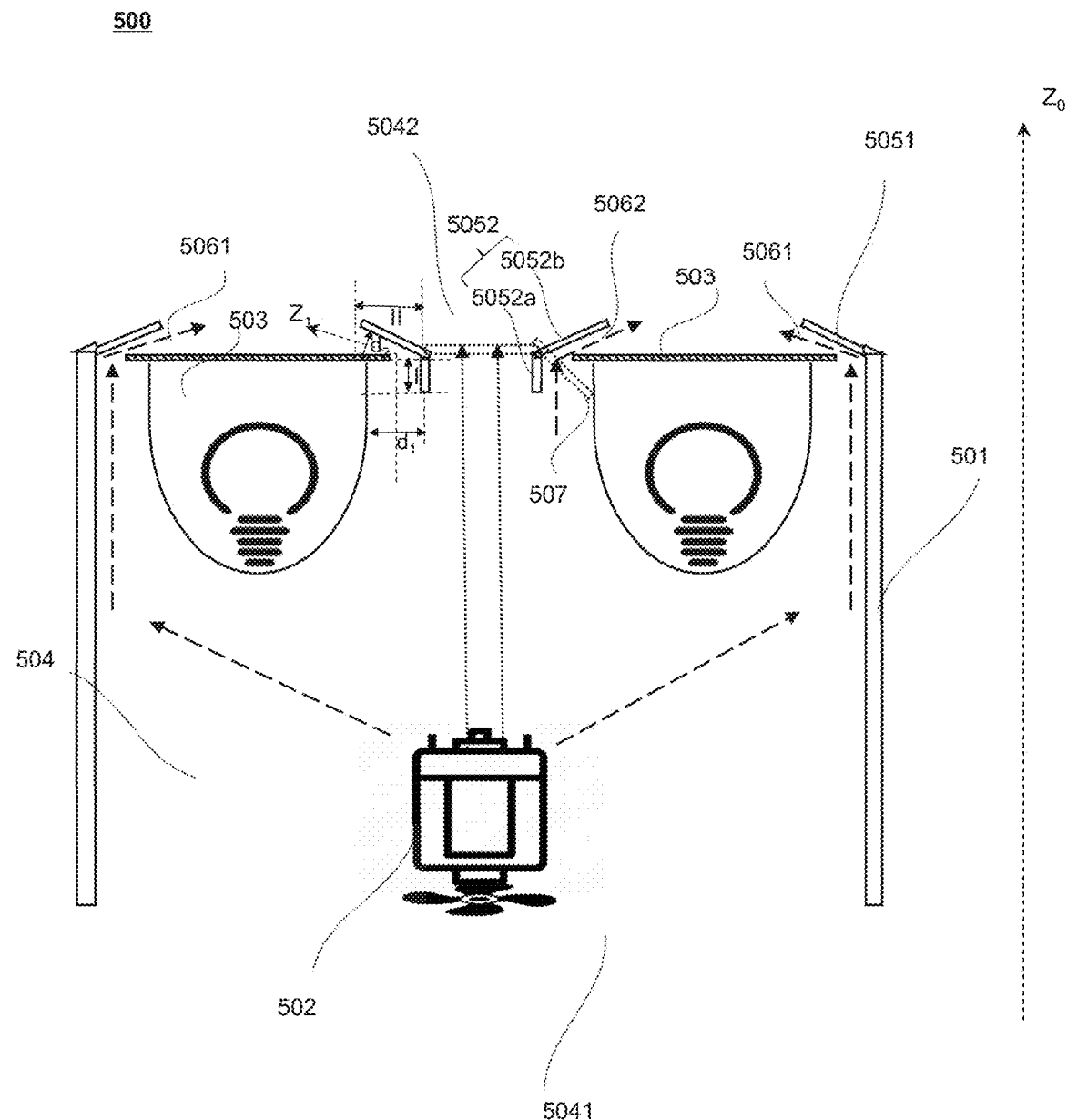
FIGS. 5A-5E provide views of an exemplary drying apparatus 500 according to some embodiments of the present disclosure.
Figure 5B:
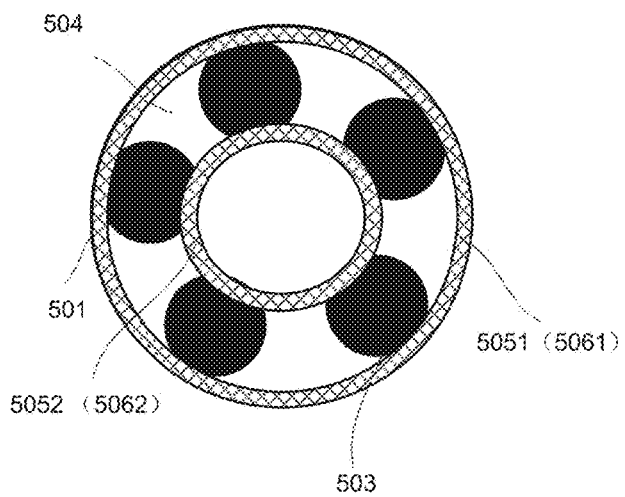
Figure 5C:
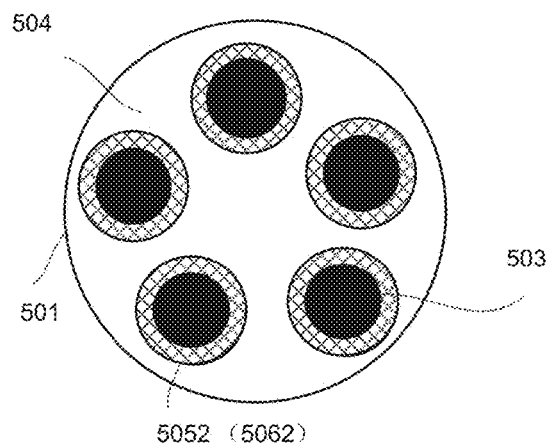
Figure 5D:
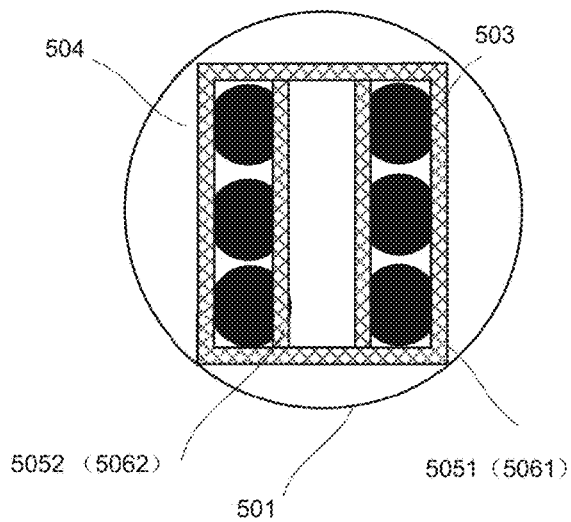
Figure 5E:
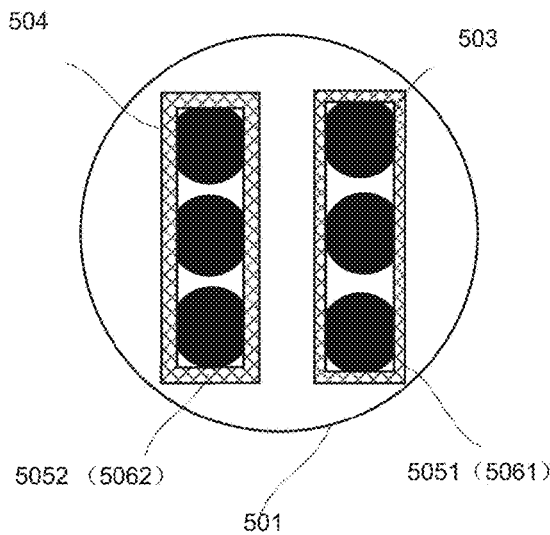

FIGS. 5A-5E provide views of an exemplary drying apparatus 500 according to some embodiments of the present disclosure. In some embodiments, the drying apparatus 500 may be an exemplary embodiment of the drying apparatus 100 described in FIG. 1. In some embodiments, the drying apparatus 500 may be an exemplary embodiment of the body 3011 of the drying apparatus 300 described in FIG. 3. As shown in FIG. 5A, the drying apparatus 500 may include a housing 501, an airflow generating element 502, one or more radiation energy sources 503, a first airflow channel 504, an airflow guide assembly, etc. Unless otherwise stated, the dashed arrows in FIG. 5A illustrate the airflow in an airflow channel (e.g., the first airflow channel 504, the second airflow channel).

The first airflow channel 504 may have an airflow inlet 5041 and an airflow outlet 5042. The radiation energy sources 503 may be configured to provide thermal radiation toward an object. The airflow generating element 502 may be configured to provide an airflow by effecting the airflow into the first airflow channel 504 through the airflow inlet 5041 and direct a first portion of the airflow in the first airflow channel toward the airflow outlet 5042. The airflow guide assembly may be configured to provide a second airflow channel through which a second portion of the airflow is diverted from the first airflow channel 504 and guided to a target region. More descriptions for the housing, the airflow generating element, the radiation energy source (s), and the first airflow channel may be found elsewhere in the present disclosure. See, e.g., FIGS. 1, 3, and 4A, and the descriptions thereof.

In the exemplary drying apparatus 500 shown in FIGS. 5A-5E, the radiation energy sources 503 may be arranged inside the first airflow channel 504 and close to the housing 501. For example, the radiation energy sources 503 may be arranged along a ring along an inner side of the housing 501 as illustrated in FIGS. 5B-5C. As another example, the radiation energy sources 503 may be arranged in an array as illustrated in FIGS. 5D-5E.

In some embodiments, the airflow guide assembly may include a first airflow guide member 5051 and/or a second airflow guide member 5052. In some embodiments, the first airflow guide member 5051 may be arranged along the whole periphery of the radiation energy sources 503 or the housing 501. The second airflow guide member 5052 may be arranged along the periphery of a region enclosed by the radiation energy sources 503 illustrated in FIGS. 5B and 5D. The first airflow guide member 5051 may be mounted on the housing 501 in a similar manner as to how the first airflow guide member 4051 is mounted on described in FIG. 4A, the descriptions of which are not repeated here. The second airflow guide member 5052 may be mounted on an exterior wall (e.g., a reflector) of at least one of the radiation energy sources 503 by one or more supporting components, e.g., a supporting component 507. The supporting component 507 may be the same as or similar to the supporting component 407 illustrated in FIG. 4A, the descriptions of which are not repeated here. In some embodiments, the first airflow guide member 5051 may be arranged along the periphery of a column of radiation energy sources in the array and the second airflow guide member 5052 may be arranged along the periphery of another column of radiation energy sources in the array illustrated in FIG. 5E.

In some embodiments, the airflow guide assembly may include multiple airflow guide members each of which is arranged along the periphery of one of the radiation energy sources 503 as illustrated in FIG. 5C. The count of the multiple airflow guide members may be the same as the count of the radiation energy sources 503.

As shown in FIG. 5A, the second airflow channel may include an airflow channel portion 5061 and/or an airflow channel portion 5062. The first airflow guide member 5051 may provide the airflow channel portion 5061 and the second airflow guide member 5052 may provide the airflow channel portion 5062. Each of the airflow channel portion 5061 and the airflow channel portion 5062 may be continuous as illustrated in FIG. 5B. In some embodiments, at least one of the airflow channel portion 5061 or the airflow channel portion 5062 may be discontinuous, the same as or similar to the airflow channel portion 4061 or the airflow channel portion 4062 illustrated in FIG. 4D, the descriptions of which are not repeated here.

The airflow channel portion 5061 may include an inflow section and an outflow section. At least a portion of the second portion of the airflow may enter the airflow channel portion 5061 through the inflow section; at least a portion of the second portion of the airflow may exit the airflow channel portion 5061 and guided toward the target region through the outflow section. In some embodiments, the outflow section of the airflow channel portion 5061 may be outside the first airflow channel 504. In some embodiments, the inflow section of the airflow channel portion 5061 may be outside the first airflow channel 504. For instance, the inflow section may be slightly (e.g., no more than 10 millimeters, or 8 millimeters, or 5 millimeters, or 3 millimeters, etc.) away from the airflow outlet of the first airflow channel 504. In some embodiments, the inflow section of the airflow channel portion 5061 may be inside the first airflow channel 504.

The second airflow guide member 5052 may include a first segment 5052a and a second segment 5052b. The first segment 5052a of the second airflow guide member 5052 may be inside the first airflow channel 504 and substantially parallel to the direction of the airflow in the first airflow channel 504. The second segment 5052b of the second airflow guide member 5052 may be outside the first airflow channel 504 and at an oblique angle with the housing 501. The airflow channel portion 5062 may include an inflow section (section I in FIG. 5A) and an outflow section (section II in FIG. 5A). The inflow section of the airflow channel portion 5062 may be formed between the surface of the first segment 5052a of the second airflow guide member 5052 facing the radiation energy sources 503 and the first surface of at least one of the radiation energy sources 503 defined by a portion of an exterior wall (e.g., the reflector) of at least one of the radiation energy sources 503. The outflow section of the airflow channel portion 5062 may be formed between the surface of the second segment 5052b of the second airflow guide member 5052 facing the radiation energy sources 503 and the second surface of at least one of the radiation energy sources 503 defined by a portion of an optical element of at least one of the radiation energy sources 503. The inflow section of the airflow channel portion 5062 may also be considered to be part of the first airflow channel 504. The inflow section of the airflow channel portion 5062 may be within the first airflow channel 504. The outflow section of the airflow channel portion 5062 may be outside the first airflow channel 504. Through the inflow section of the airflow channel portion 5062, a portion of the airflow in the first airflow channel 504 (or referred to as the second portion of the airflow) may be diverted from the rest portion of the airflow that remains in the first airflow channel 504 (or referred to the first portion of the airflow). The second portion of the airflow may be guided to the target region via the outflow section of the airflow channel portion 5062. The inflow section of the airflow channel portion 5062 may have cross-sections perpendicular to an axis of the airflow channel portion 5062 (i.e., the axis of the inflow section of the airflow channel portion 5062). The outflow section of the airflow channel portion 5062 may have cross-sections perpendicular to the axis of the airflow channel portion 5062 (i.e., the axis of the outflow section of the airflow channel portion 5062). The axis of the airflow channel portion 5062 (including the axes of the inflow section and outflow section of the airflow channel portion 5062) may be a geometric centerline of the airflow channel portion 5062 (e.g., an axial direction $Z_1$ as shown in FIG. 5A). In some embodiments, areas of at least a portion of the cross-sections of the inflow section of the airflow channel portion 5062 may vary along the axis of the airflow channel portion 5062. For brevity, the area of a cross-section may be referred to as the cross-sectional area. In some embodiments, at least a portion of the cross-sectional areas of the inflow section or the outflow section may be constant along the axis of the airflow channel portion 5062. See, e.g., the inflow section and the outflow section of the airflow guide assembly 805 illustrated in FIGS. 8A and 8B.

In some embodiments, cross-sectional areas of the inflow section of the airflow channel portion 5062 may relate to radial lengths ($d_1$ in FIG. 5A) of the cross-sections perpendicular to the axis of the inflow section (i.e., $Z_1$ as shown in FIG. 5A) of the airflow channel portion 5062 such that a change in the cross-sectional areas may be assessed by assessing the change in $d_1$. In some embodiments, the cross-sectional areas of cross-sections of the outflow section of the airflow channel portion 5062 may relate to radial lengths ($d_2$ in FIG. 5A) of the cross-sections perpendicular to the axis of the outflow section (i.e., $Z_1$ as shown in FIG. 5A) such that a change in the cross-sectional areas may be assessed by assessing the change in $d_2$.

In some embodiments, differences between the radial lengths $d_1$ of the inflow section of the airflow channel portion 5062 and the radial lengths $d_2$ of the outflow section of the airflow channel portion 5062 may be smaller than a difference threshold (i.e., a third threshold) such that a change in the areas (e.g., the cross-sectional areas) available for the air travelling through the inflow section and the outflow section of the second airflow channel is relatively small, and so does a change in the velocity of the air. The difference threshold may be 1 centimeter, 2 centimeters, 3 centimeters, etc. In some embodiments, the radial lengths and/or the axial lengths may be adjusted. For example, the radial lengths $d_1$ and/or radial lengths $d_2$ may be adjusted by adjusting the lengths of the one or more supporting components. More descriptions for the airflow guide assembly may be found elsewhere in the present disclosure (e.g., FIGS. 11-13 and the descriptions thereof).

It should be noted that the above description is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, one or more air filters may be provided at the airflow inlet 5041 to prevent dust or other undesired matters (e.g., hair) from entering the first airflow channel 504.

Figure 6:
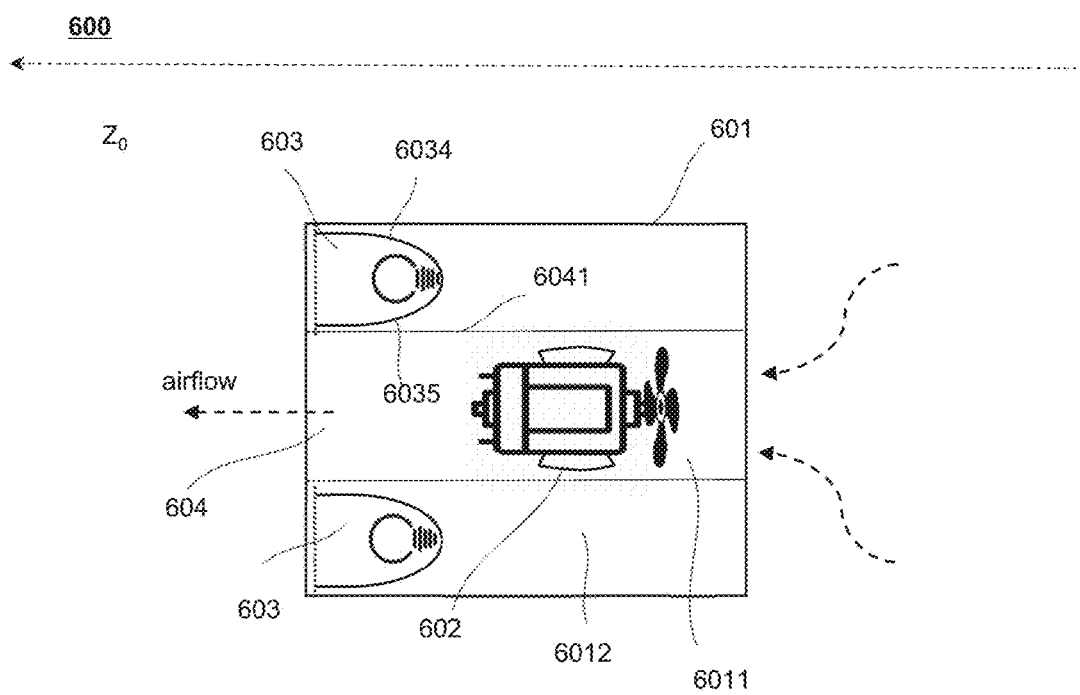
FIG. 6 is a schematic illustrating an exemplary drying apparatus 600 according to some embodiments of the present disclosure.
Figure 7B:
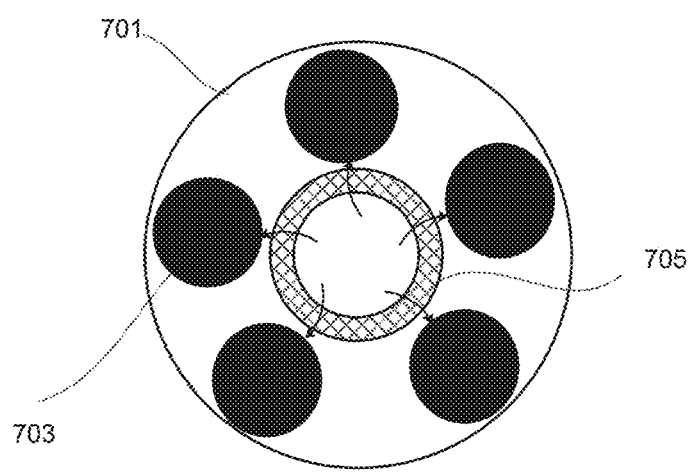

FIG. 6 is a schematic illustrating an exemplary drying apparatus 600 according to some embodiments of the present disclosure. In some embodiments, the drying apparatus 600 may be an exemplary embodiment of the drying apparatus 100 described in FIG. 1. As shown in FIG. 6, the drying apparatus 600 may include a housing 601, an airflow generating element 602, one or more radiation energy sources 603, an airflow guide assembly 605 (not shown), etc. Various electric, mechanical, and electromechanical components, such as the airflow generating element 602, the one or more one or more radiation energy sources 603, a control circuit (not shown), and a power adaptor (not shown), may be arranged in the housing 601. In some embodiments, the housing 601 may include a first airflow channel 604. The first airflow channel 604 may have an airflow inlet and an airflow outlet. The one or more one or more radiation energy sources 603 may be configured to provide thermal radiation toward an object. The airflow generating element 602 may be configured to provide an airflow by effecting the airflow into the first airflow channel 604 through the airflow inlet and direct a first portion of the airflow in the first airflow channel toward the airflow outlet. Unless otherwise stated, the dashed arrows in FIG. 6 illustrate the airflow in an airflow channel (e.g., the first airflow channel 604).

In some embodiments, the housing 601 may enclose the first airflow channel 604. The first airflow channel 604 may be defined by a wall 6041. The one or more radiation energy sources 603 may be positioned outside the first airflow channel 604. In other words, the one or more radiation energy sources 603 may be positioned outside an area of the first airflow channel 604 as viewed in a cross-sectional view (e.g., an axial cross-sectional view parallel to axial direction $Z_O$ as shown in FIG. 5A or a radial cross-sectional view perpendicular to axial direction $Z_O$) of the drying apparatus 600. At least a portion of each of the one or more radiation energy sources 603 may be separated from the first airflow channel 604 or the airflow in the first airflow channel 604 by the wall 6041 of the first airflow channel 604. More descriptions for the housing, the airflow generating element, the radiation energy source(s), and the first airflow channel may be found elsewhere in the present disclosure. See, e.g., FIGS. 1 and 3, and the descriptions thereof.

At least a portion of at least one of the one or more radiation energy sources 603 does not contact the airflow in the first airflow channel 604. It should be noted that airflow in the first airflow channel 604 does not pass through an exterior wall (e.g., a reflector) of one of the radiation energy sources 603. For example, the exterior wall (e.g., a reflector) of a radiation energy source 603 may be configured to be air impermeable so that airflow does not penetrate into the inside of the radiation energy source 603 by passing through the exterior wall. As a further example, no holes are present on the exterior wall (e.g., a reflector,) of the radiation energy source 603 to allow air to pass through. In some embodiments, the optical element may be configured with holes. In some embodiments, the optical element may be omitted. In some embodiments, the optical element may be air impermeable. In some embodiments, a radiation energy source 603 may be positioned completely outside the first airflow channel 604, thereby no portion of the radiation energy source 603 contacting the airflow in the first airflow channel 604. For example, the radiation energy source 603 may be positioned apart from the wall 6041 by a distance. As another example, the radiation energy source 603 may physically contact the wall 6041, but the wall 6041 may separate the radiation energy source 603 from the first airflow channel 604 or the airflow in the first airflow channel 604, such that no portion of the radiation energy source 603 contacts the first airflow channel 604. In some embodiments, a radiation energy source 603 positioned outside the first airflow channel may include a first portion 6034 and a second portion 6035, in which the first portion 6034 may be positioned not contacting the first airflow channel 604 or the airflow within the first airflow channel 604, while the second portion 6035 may be positioned to contact the first airflow channel or the airflow within the first airflow channel 604. The first portion 6034 of the radiation energy source 603 may be a portion of an exterior wall or a side wall (e.g., a protecting enclosure or a reflector) of the radiation energy source 603. The second portion 6035 may be a side wall of the one or more radiation energy sources 603 which is opposite to the first portion 6034 of the radiation energy source 603. As used herein, the term "contact" may mean physically contact (e.g., directing coupling, engaging, touching, or otherwise associated with) or thermally contact (e.g., transferring heat via a thermal coupling therebetween). The first portion of the radiation energy source not contacting the first airflow channel or the airflow may mean that the first portion does not substantially affect, exert influence on or change a parameter of the airflow in the first airflow channel. The second portion of the radiation energy source contacting the first airflow channel or the airflow may mean that the second portion substantially affects, exert influence on or change a parameter of the airflow in the first airflow channel. The parameter of the airflow may include a temperature, a volume, a velocity, a velocity distribution, a field area, a resistance, a pressure, a direction, a vortex, a divergence of the airflow, or the like, or a combination thereof. In an example, the second portion 6035 of the radiation energy source 603 may physically contact the wall 6041. In another example, the second portion 6035 of the radiation energy source 603 may be formed integrally with the wall 6041. In yet another example, the second portion 6035 of the radiation energy source 603 may form at least a portion of the wall 6041. In still another example, the second portion 6035 of the radiation energy source 603 may be thermally coupled to the wall 6041 while the second portion 6035 not physically contacts the first airflow channel 604. The thermal coupling may be affected by a thermal coupling member connecting the second portion 6035 and the first airflow channel 604. Heat may therefore transfer from the second portion 6035 of the radiation energy source 603 to maintain or decrease an operating temperature of the radiation energy source 603 within a predetermined range.

In some embodiments, the housing 601 may include a first cavity 6011 and a second cavity 6012. The first cavity 6011 may form the first airflow channel 604. The first cavity 6011 may be defined by the wall 6041 of the first airflow channel 604. The second cavity 6012 may be defined by the housing 601 and the wall 6041 of the first airflow channel 604. At least one of the one or more radiation energy sources 603 may be positioned in the second cavity 6012. That is, the at least one of the one or more radiation energy sources 603 may be positioned between the first airflow channel 604 (or the wall 6041) and the housing 601. In some embodiments, the first cavity 6011 and the second cavity 6022 may be not in fluid communication, such that the at the least one of the one or more radiation energy sources 603 positioned in the second cavity 6012 may include at least a portion not contacting the airflow in the first airflow channel 604. As shown in FIG. 6, the second cavity may encompass the first cavity. In some embodiments, the first cavity may encompass the second cavity as shown in FIGS. 16A and 16B. In some embodiments, the second cavity may be positioned in juxtaposition to the first cavity as shown in FIGS. 15A and 15B. That is, the radiation energy sources 603 may be positioned in juxtaposition to the first airflow channel 604.

In some embodiments, at least a portion of the one or more radiation energy sources 603 may be positioned along a periphery of the first airflow channel 604. For example, at least a portion of the one or more radiation energy sources 603 may be positioned along a periphery of the airflow outlet. As another example, the one or more radiation energy sources 603 may be arranged circumferentially along the periphery of the wall 6041. In some embodiments, the one or more radiation energy sources 603 may be arranged in an array. In some embodiments, the one or more radiation energy sources 603 may be arranged along any one of various shapes such as the shape of a circle, an arc, etc.

The airflow guide assembly (not shown in FIG. 6) may be configured to provide a second airflow channel through which a second portion of the airflow in the first airflow channel 604 is guided to a target region. The target region may abut at least one of the one or more radiation energy sources 603. For example, the target region may be located outside and close to an optical element of the at least one of the one or more radiation energy sources 603. As another example, a projection of the target region along the axis of the first airflow channel 604 may include a central region (e.g., a region where a radiation focus is located) of the at least one of the one or more radiation energy sources 603. The configuration of the airflow guide assembly may be the same as or similar to the configuration of the airflow guide assemblies in FIGS. 1, 7A-8B, and 11-13, the descriptions of which are not repeated here. More descriptions for the target region may be found elsewhere in the present disclosure (e.g., FIG. 1 and the descriptions thereof).

FIGS. 7A-7B provide views of an exemplary drying apparatus 700 according to some embodiments of the present disclosure. In some embodiments, the drying apparatus 700 may be an exemplary embodiment of the drying apparatus 100 described in FIG. 1. In some embodiments, the drying apparatus 700 may be an exemplary embodiment of the drying apparatus 600 described in FIG. 6. As shown in FIG. 7, the drying apparatus 700 may include a housing 701, an airflow generating element 702, one or more radiation energy sources 703, a first airflow channel 704, an airflow guide assembly 705, etc. The first airflow channel 704 may have an airflow inlet and an airflow outlet. The radiation energy sources 703 may be configured to provide thermal radiation toward an object. The airflow generating element 702 may be configured to provide an airflow by effecting the airflow into the first airflow channel 704 through the airflow inlet and direct a first portion of the airflow in the first airflow channel toward the airflow outlet. Unless otherwise stated, the dashed arrows in FIG. 7A illustrate the airflow in an airflow channel (e.g., the first airflow channel 704, the second airflow channel 706).

The radiation energy sources 703 may be positioned outside the first airflow channel 704. The radiation energy sources 703 may be separated from the first airflow channel 704 by, e.g., a wall 7041, thereby no portion of the radiation energy sources 703 contacting the airflow in the first airflow channel 704. The airflow guide assembly 705 may be configured to provide a second airflow channel 706 through which a second portion of the airflow in the first airflow channel 704 is guided to a target region. The target region may abut at least one of the radiation energy sources 703. More descriptions for the housing, the airflow generating element, the radiation energy source(s), and the first airflow channel may be found elsewhere in the present disclosure. See, e.g., FIG. 1 and FIG. 6, and the descriptions thereof.

In the exemplary drying apparatus 700 shown in FIGS. 7A and 7B, the airflow guide assembly 705 may be positioned at the airflow outlet. For example, the airflow guide assembly 705 may be positioned along the end of the wall 7041. The airflow guide assembly 705 may be continuous as illustrated in FIG. 7B. In some embodiments, the airflow guide assembly 705 may be discontinuous, the same as or similar to the first airflow guide member 4051 or the second airflow guide member 4052 illustrated in FIG. 4D, the descriptions of which are not repeated here.

The airflow guide assembly 705 may be mounted on the wall 7041 by one or more supporting components, e.g., a supporting component 707. For example, two ends of the supporting component 707 may physically connect the airflow guide assembly 705 and the wall 7041. As a further example, the wall 7041 may be provided with a hole. An end of the supporting component 707 may be inserted into and/or snuggly fitted in the hole, while another end of the supporting component 707 may be physically connected with the airflow guide assembly 705. The supporting component 707 may be the same as or similar to the supporting component 407 illustrated in FIG. 4A, the descriptions of which are not repeated here. In some embodiments, the second airflow channel 706 may be formed between a surface of at least one of the radiation energy sources 703 defined by a portion of an optical element and a surface of the airflow guide assembly 705 facing the radiation energy sources 703.

In some embodiments, a portion of the radiation energy sources 703 may form at least a portion of the wall 7041 of the first airflow channel 704. In this case, the airflow guide assembly 705 may be mounted on an exterior wall (e.g., a protecting wall or a reflector) of at least one of the radiation energy sources 703.

The second airflow channel 706 may include an inflow section and an outflow section. At least a portion of the second portion of the airflow may enter the second airflow channel 706 through the inflow section; at least a portion of the second portion of the airflow may exit the second airflow channel 706 and guided toward the target region through the outflow section. In some embodiments, the inflow section and the outflow section of the second airflow channel 706 may be both outside the first airflow channel 704. In some embodiments, the inflow section of the second airflow channel 706 may be within the first airflow channel 704 and the outflow section of the second airflow channel 706 may be outside the first airflow channel 704.

In some embodiments, the airflow guide assembly 705 may be the same as or similar to the second airflow guide member 5052 described in FIG. 5A. For example, the airflow guide assembly 705 may include a first segment and a second segment. The first segment of the airflow guide assembly 705 may be configured to divert the second portion of the airflow from the first portion of the airflow. The second segment of the airflow guide assembly 705 may be configured to guide the second portion of the airflow to the target region. In some embodiments, the first segment of the airflow guide assembly 705 may extend into the first airflow channel 704. The second segment of the airflow guide assembly 705 may extend toward the target region. In some embodiments, the inflow section of the second airflow channel 706 may be defined by the first segment of the airflow guide assembly 705 and the wall 7041 of the first airflow channel 704. The outflow section of the second airflow channel 706 may be defined by the second segment of the airflow guide assembly 705 and a surface (e.g., an optical element) of at least one of the radiation energy sources 703.

In some embodiments, at least one end of the wall 7041 may include a chamfer. The chamfer may include a 30° chamfer, a 45° chamfer, a 60° chamfer, an arc chamfer, or the like, or any combination thereof. In some embodiments, the chamfer may be used to reduce airflow noise, or a resistance of the second portion of the airflow being guided to the target region, etc. For example, an end of the wall 7041 facing the airflow outlet (i.e., an end of the wall 7041 facing the second airflow channel 406) may include a first chamfer (i.e., the chamfer 7042). The first chamfer may be used to reduce the resistance of the second portion of the airflow into the second airflow channel 706 and the airflow noise in the airflow outlet of the first airflow channel 704. As another example, an end of the wall of the first airflow channel 704 facing the airflow inlet may include a second chamfer. The second chamfer may be used to reduce the resistance of air into the first airflow channel 704, and the airflow noise in the airflow inlet of the first airflow channel 704. More descriptions for the airflow guide assembly 705 may be found elsewhere in the present disclosure (e.g., FIGS. 11-13 and the descriptions thereof).

In some embodiments, a blocking member 709 may be arranged in a path of the second portion of the airflow. For example, the blocking member 709 may be mounted on an optical element of at least one of the radiation energy sources 703. The blocking member 709 may be configured to change or adjust the path of the second portion of the airflow. In some embodiments, the second portion of the airflow may form a vortex in the target region in the presence of the blocking member 709. The presence of a vortex in the target region may enhance the movement of air and therefore the heat exchange through the air movement in the target region, thereby achieving a more even temperature distribution in the target region. In some embodiments, the second portion of the airflow may be guided to the region outside the first airflow channel 704 to mix with the first portion of the airflow in the presence of the blocking member 709. As illustrated in FIG. 7A, an end of the housing 701 where the airflow outlet is located may include a convex part. The convex part may serve as the blocking member 709 that changes the path of the second portion of the airflow. In some embodiments, the convex part and the housing 701 may be an integral piece. For example, the convex part may be an extension of the housing 701. In some embodiments, the convex part and the housing 701 may be separate pieces. In some embodiments, the configuration of the airflow guide assembly 705 may be the same as or similar to the second airflow guide member 5052 or the airflow guide assembly as described in FIGS. 11-13, the descriptions of which are not repeated here.

FIGS. 8A and 8B are schematics illustrating an exemplary drying apparatus 800 according to some embodiments of the present disclosure. In some embodiments, the drying apparatus 800 may be an exemplary embodiment of the drying apparatus 100 described in FIG. 1 or an exemplary embodiment of the drying apparatus 600 described in FIG. 6. As shown in FIGS. 8A and 8B, the drying apparatus 800 may include a housing 801, an airflow generating element 802, one or more radiation energy sources 803, a first airflow channel 804, an airflow guide assembly 805, etc. Unless otherwise stated, the dashed arrows in FIGS. 8A and 8B illustrate the airflow in an airflow channel (e.g., the first airflow channel 804, the second airflow channel).

The first airflow channel 804 may have an airflow inlet and an airflow outlet. The radiation energy sources 803 may be configured to provide thermal radiation toward an object. The airflow generating element 802 may be configured to provide an airflow by effecting the airflow into the first airflow channel 804 through the airflow inlet and direct a first portion of the airflow in the first airflow channel toward the airflow outlet. More descriptions for the housing, the airflow generating element, the radiation energy source(s), and the first airflow channel may be found elsewhere in the present disclosure. See, e.g., FIG. 1 and FIG. 6, and the descriptions thereof. For example, the radiation energy sources 803 may be positioned outside the first airflow channel 804. As another example, the first airflow channel 804 may be formed by a first cavity. The first cavity may be defined by a wall 8041 of the first airflow channel 804 that is different from the housing 801. The drying apparatus 800 may include a second cavity defined by the wall 8041 and the housing 801. The second cavity may encompass the first cavity. The radiation energy sources 803 may be in the second cavity.

The airflow guide assembly 805 may be configured to provide a second airflow channel through which a second portion of the airflow in the first airflow channel 804 is guided to a target region that abuts at least one of the one or more radiation energy sources 803. As shown in FIG. 8A, the airflow guide assembly 805 may include a tube connecting the first airflow channel 804 and the target region. The tube may serve as the second airflow channel. It should be noted that the descriptions of the single tube as shown in FIG. 8A are merely provided for illustration, and not intended to limit the scope of the present disclosure. It is understood that the drying apparatus 800 may include more than one tube. For example, more than one radiation energy source of the drying apparatus 800 may be arranged along a ring. Each of the more than one tube may connect the first airflow channel 804 and the target region abutting one of the more than one radiation energy source.

As shown in FIG. 8A, the wall 8041 may be configured with an opening. The second airflow channel may be formed by the tube that is arranged between the opening and the target region. In some embodiments, the tube may extend into the first airflow channel 804 through the opening to guide the second portion of the airflow from the first airflow channel 804 to the target region. The second airflow channel may include an inflow section and an outflow section. At least a portion of the second portion of the airflow may enter the second airflow channel through the inflow section; at least a portion of the second portion of the airflow may exit the second airflow channel and be guided toward the target region through the outflow section. The inflow section of the second airflow channel may be within the boundary of the first airflow channel 804. The outflow section of the second airflow channel may be outside the boundary of the first airflow channel 804. The boundary of the first airflow channel 804 may be defined by the wall 8041 and the airflow outlet of the first airflow channel 804.

In some embodiments, the wall 8041 of the first airflow channel 804 may have no opening as illustrated in FIG. 8B and the tube may include a first segment and a second segment. The first segment of the tube may be in the first airflow channel 804. The first segment of the tube may be configured to divert the second portion of the airflow from the first airflow channel 804. The second segment of the tube may be outside the first airflow channel 804 and extend toward the target region. The second segment of the tube may be configured to guide the second portion of the airflow to the target region. The first segment of the tube may provide the inflow section of the second airflow channel and the second segment of the tube may provide the outflow section of the second airflow channel. The first segment of the tube and the inflow section of the second airflow channel may be within the first airflow channel 804. The second segment of the tube and the outflow section of the second airflow channel may be outside the first airflow channel 804. In some embodiments, the first segment of the tube may be physically connected with or attached to the wall 8041. In some embodiments, the first segment of the tube may extend along a direction (e.g., an axial direction $Z_0$ shown in FIG. 8) parallel to the axis of the first airflow channel 804, while the second segment of the tube may extend toward the target region along a direction (e.g., a direction perpendicular to the axial direction $Z_0$ shown in FIG. 8) perpendicular to the axis of the first airflow channel 804. In some embodiments, the second segment of the tube may be at an oblique angle with the axis of the first airflow channel 804. The inflow section of the second airflow channel may have cross-sections perpendicular to an axis of the second airflow channel (e.g., an axial direction $Z_1$ as shown in FIG. 8A). The outflow section of the second airflow channel may have cross-sections perpendicular to the axis of the second airflow channel. The axis of the second airflow channel (including the axes of the inflow section and outflow section) may be a geometric centerline of the second airflow channel. In some embodiments, at least a portion of the cross-sectional areas of the inflow section or the outflow section may be constant along the axis of the second airflow channel. In some embodiments, areas of at least a portion of the cross-sections of the inflow section of the second airflow channel may vary along the axis of the second airflow channel. For brevity, the area of a cross-section may be referred to as the cross-sectional area.

Returning to FIG. 8A, in some embodiments, two ends of the tube may be configured with a first opening and a second opening, respectively. The first opening and the second opening of the tube may serve as an airflow inlet and an airflow outlet of the second airflow channel, respectively. The first opening of the tube may be in a plane that is at a first angle ($\alpha_3$ in FIG. 8A) with the direction parallel to the axis of the second airflow channel (or the tube) (e.g., the axial direction $Z_1$ shown in FIG. 8A). The first angle may be less than 60 degrees, or less than 30 degrees, or less than 20 degrees, etc. The smaller the first angle is, the larger the area of the first opening may be, which may increase the amount of airflow entering the tube through the first opening of the tube. The second opening of the tube may open toward the target region through which the second portion of the airflow in the first airflow channel 804 may flow to the target region. The second opening of the tube may be in a plane that is at a second angle ($\alpha_4$ in FIG. 8A) with the axis of the second airflow channel (or the tube). The second angle may less than 10 degrees, or less than 20 degrees, or less than 30 degrees, etc. For example, the second opening of the tube may be in the plane that is parallel to the axis of the first airflow channel 804.

In some embodiments, the configuration of the tube (e.g., a diameter, etc.) may be determined based on a radiation intensity of the target region, an area of the target region, the location of the target region, the velocity of the airflow, or the like, or any combination thereof. For example, the greater the radiation intensity of the target region, the greater the diameter of the tube may be. As another example, the larger the area of the target region, the greater the diameter of the tube may be. For still another example, the smaller the velocity of airflow, the greater the diameter of the tube may be. In some embodiments, when the tube has a first segment and a second segment, the configuration of the first segment of the tube may be the same as or different from the configuration of the second segment of the tube. For instance, the diameter of the first segment and the diameter of the second segment may be the same or different based on a desired velocity at which the second portion of airflow exits the second segment and/or enters into the target region.

In some embodiments, the drying apparatus 800 may include a blocking member 809. The blocking member 809 may be configured to change the path of the second portion of the airflow, so that the second portion of the airflow may form a vortex in the target region. In some embodiments, the blocking member 809 in the drying apparatus 800 may be the same as or similar to the blocking member 709, and the descriptions of which are not repeated here.

Figure 9A:
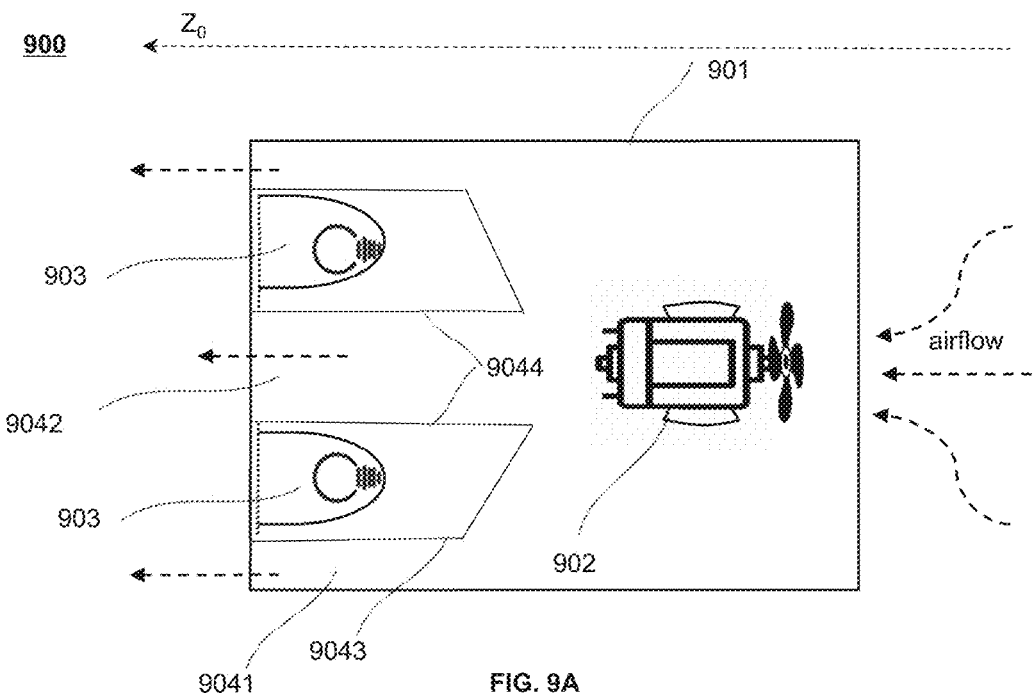
FIGS. 9A and 9B provide views of an exemplary drying apparatus 900 according to some embodiments of the present disclosure.
Figure 9B:
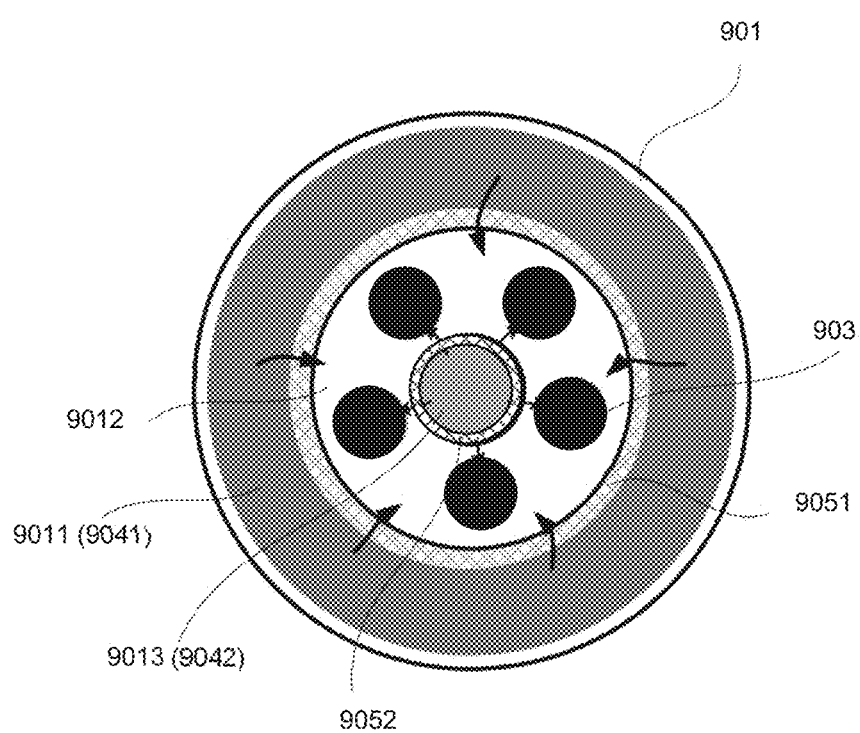

FIGS. 9A and 9B provide views of an exemplary drying apparatus 900 according to some embodiments of the present disclosure. In some embodiments, the drying apparatus 900 may be an exemplary embodiment of the drying apparatus 100 described in FIG. 1. As shown in FIG. 9A and FIG. 9B, the drying apparatus 900 may include a housing 901, an airflow generating element 902, one or more radiation energy sources 903, an airflow guide assembly (not shown in FIG. 9A), etc. Various electric, mechanical, and electro-mechanical components, such as the airflow generating element 902, the one or more radiation energy sources 903, a control circuit (not shown), a power adaptor (not shown), and/or a central processing unit, may be arranged in the housing 901. More descriptions for the housing, the airflow generating element, the radiation energy source(s), and the first airflow channel may be found elsewhere in the present disclosure. See, e.g., FIG. 1 and FIG. 6, and the descriptions thereof. Unless otherwise stated, the dashed arrows in FIG. 9A illustrate the airflow in an airflow channel (e.g., the first airflow channel 9041, the third airflow channel 9042).

The radiation energy sources 903 may be configured to provide thermal radiation toward an object. As shown in FIG. 9A, the housing 901 may provide a first airflow channel 9041 and a third airflow channel 9042. The first airflow channel 9041 and the third airflow channel 9042 may be in fluid communication. The airflow generating element 902 may be configured to provide an airflow by effecting the airflow into the first airflow channel 9041 through an airflow inlet and direct a first portion of the airflow in the first airflow channel 9041 toward an airflow outlet of the first airflow channel 9041. The airflow generating element 902 may also be configured to provide an airflow by effecting the airflow into the third airflow channel 9042 through the airflow inlet and direct a first portion of the airflow in the third airflow channel 9042 toward an airflow outlet of the third airflow channel 9042. The first airflow channel 9041 and the third airflow channel 9042 may share the same airflow generating element 902 and the same airflow inlet.

In some embodiments, the first airflow channel 9041 and the third airflow channel 9042 may be not in fluid communication. The airflow generating element 902 may include a first airflow generating component located in the first airflow channel 9041 and a second airflow generating component located in the third airflow channel 9042. The first airflow generating component may be configured to provide an airflow by effecting the airflow into the first airflow channel 9041 through an airflow inlet of the first airflow channel 904 and direct a first portion of the airflow in the first airflow channel 9041 toward an airflow outlet of the first airflow channel 9041. The second airflow generating component may be configured to provide an airflow by effecting the airflow into the third airflow channel 9042 through an airflow inlet of the third airflow channel 9042 and direct a first portion of the airflow in the third airflow channel 9042 toward an airflow outlet of the third airflow channel 9042. The first airflow channel 9041 and the third airflow channel 9042 may have different airflow inlets and different airflow outlets.

The radiation energy sources 903 may be positioned outside the first airflow channel 9041 and the third airflow channel 9042. In some embodiments, a radiation energy source 903 may be positioned completely outside the first airflow channel 9041 and the third airflow channel 9042, thereby no portion of the radiation energy source 903 contacting the airflow in the first airflow channel 9041 and the third airflow channel 9042. In some embodiments, a radiation energy source 903 positioned outside the first airflow channel 9041 and the third airflow channel 9042 may include a first portion and a second portion, in which the first portion may be positioned not contacting the first airflow channel 9041 or the airflow within the first airflow channel 9041, while the second portion may be positioned to contact the third airflow channel 9042 or the airflow within the third airflow channel 9042. The first portion of the radiation energy source 903 may be a portion of an exterior wall (e.g., a protecting enclosure or a reflector) of the radiation energy source 903. The second portion of the radiation energy source 903 may be a side wall of the radiation energy source 903 which is opposite to the first portion of the radiation energy source 903. In some embodiments, a radiation energy source 903 positioned outside the first airflow channel 9041 and the third airflow channel 9042 may include a first portion and a second portion, in which the first portion may be positioned contacting the first airflow channel 9041 or the airflow within the first airflow channel 9041 and the second portion may be positioned to contact the third airflow channel 9042 or the airflow within the third airflow channel 9042.

As shown in FIG. 9B, the housing 901 may include a first cavity 9011, a second cavity 9012, and a third cavity 9013. The first cavity 9011 may form the first airflow channel 9041. The radiation energy sources 903 may be positioned in the second cavity 9012. The third cavity 9013 may form the third airflow channel 9042. The first cavity 9011 may encompass the second cavity 9012, and the second cavity 9012 may encompass the third cavity 9013. The first cavity 9011 and the second cavity 9012 may be fluidly isolated (i.e., not in fluid communication) from each other. The second cavity 9012 and the third cavity 9013 may be fluidly isolated (i.e., not in fluid communication) from each other. In some embodiments, the first cavity 9011, the second cavity 9012, and the third cavity 9013 of the housing 901 may be arranged (substantially) coaxially.

The first cavity 9011 may be defined by a wall 9043 of the first airflow channel 9041 and the housing 901. The second cavity 9012 may be defined by the wall 9043 and a wall 9044 of the third airflow channel 9042. The third cavity 9013 may be defined by the wall 9044. In some embodiments, the wall 9043 and the housing 901 may also be referred to as an inner wall and outer wall of the first airflow channel 9041, respectively.

In some embodiments, the third cavity may be positioned in juxtaposition to the first cavity and the second cavity. More descriptions for the juxtaposition of the first cavity, the second cavity, and the third cavity may be found elsewhere in the present disclosure (e.g., FIGS. 17A and 17B, and the descriptions thereof).

In some embodiments, the drying apparatus 900 may include an airflow guide assembly (not shown in FIG. 9A). The airflow guide assembly may include a first airflow guide member 9051 positioned at the airflow outlet of the first airflow channel 9041 and a second airflow guide member 9052 positioned at the airflow outlet of the third airflow channel 9042. The first airflow guide member 9051 may be configured to provide a second airflow channel and a through which a second portion of airflow in the first airflow channel 9041 may be guided to a target region through the second airflow channel. The second airflow guide member 9052 may be configured to provide a fourth airflow channel through which a second portion of airflow in the third airflow channel 9042 may be guided to the target region through the fourth airflow channel. The first airflow guide member 9051 and the second airflow guide member 9052 may be the same as or similar to the first airflow guide member and the second airflow guide member as described elsewhere in the present disclosure. See, e.g., FIGS. 1, 10, and the descriptions thereof. In some embodiments, the target region may abut at least one of the radiation energy sources 903.

Figure 10:
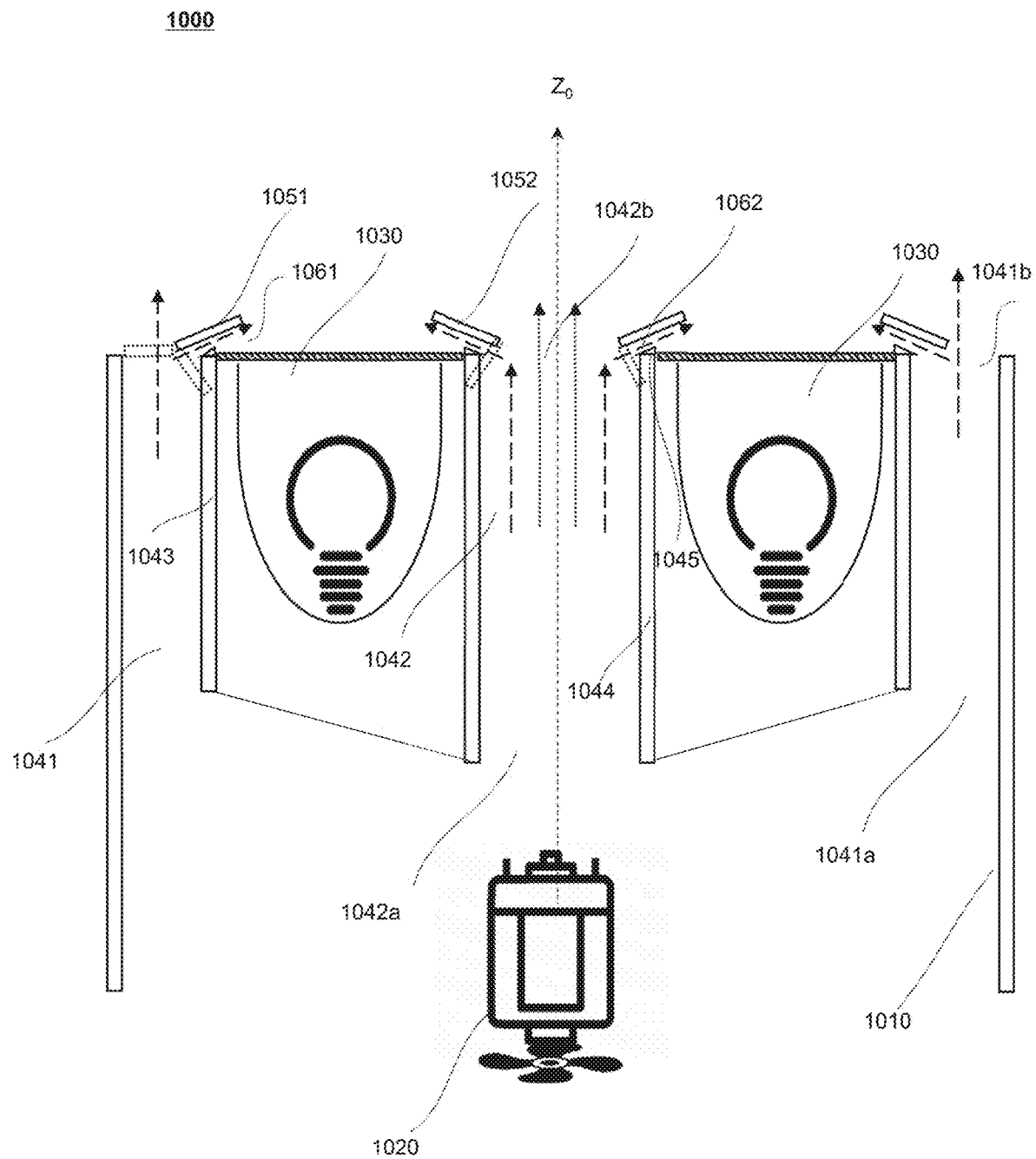
FIG. 10 is a schematic illustrating an exemplary drying apparatus 1000 according to some embodiments of the present disclosure.

FIG. 10 is a schematic illustrating an exemplary drying apparatus 1000 according to some embodiments of the present disclosure. In some embodiments, the drying apparatus 1000 may be an exemplary embodiment of the drying apparatus 100 described in FIG. 1 or an exemplary embodiment of the drying apparatus 900 described in FIG. 9A and FIG. 9B. As shown in FIG. 10, the drying apparatus 1000 may include a housing 1010, an airflow generating element 1020, one or more radiation energy sources 1030, an airflow guide assembly, etc. Unless otherwise stated, the dashed arrows in FIG. 10 illustrate the airflow in an airflow channel (e.g., the first airflow channel 1041, the third airflow channel 1042).

The housing 1010 may include a first airflow channel 1041 and a third airflow channel 1042. The first airflow channel 1041 may have an airflow inlet 1041a and an airflow outlet 1041b. The third airflow channel 1042 may have an airflow inlet 1042a and an airflow outlet 1042b. The radiation energy sources 1030 may be configured to provide thermal radiation toward an object. The airflow generating element 1020 may be configured to provide an airflow by effecting the airflow into the first airflow channel 1041 through the airflow inlet 1041a and direct a first portion of the airflow in the first airflow channel 1041 toward the airflow outlet 1041b. The airflow generating element 1020 may also be configured to provide an airflow by effecting the airflow into the third airflow channel 1042 through the airflow inlet 1042a and direct a first portion of the airflow in the third airflow channel 1042 toward the airflow outlet 1042b.

In some embodiments, the housing 1010, the airflow generating element 1020, the radiation energy sources 1030, the first airflow channel 1041, and the third airflow channel 1042 may be the same as or similar to the housing 901, the airflow generating element 902, the radiation energy sources 903, the first airflow channel 9041, and the third airflow channel 9042 described in FIG. 9, respectively, the descriptions of which are not repeated here. For example, an end of a wall 1043 of the first airflow channel 1041 facing the airflow outlet and/or an end of the wall 1044 of the third airflow channel 1042 facing the airflow outlet may include a chamfer (e.g., the chamfer 1045).

In some embodiments, the airflow guide assembly may be configured to provide a second airflow channel 1061 through which a second portion of the airflow in the first airflow channel 1041 is guided to a target region. In some embodiments, the airflow guide assembly may be configured to provide a fourth airflow channel 1062 through which a second portion of the airflow in the third airflow channel 1042 is guided to the target region. In some embodiments, the airflow guide assembly may be configured to provide the second airflow channel 1061 and the fourth airflow channel 1062, simultaneously. In some embodiments, the target region may abut at least one of the radiation energy sources 1030. More descriptions for the target region may be found elsewhere in the present disclosure (e.g., FIG. 1 and the descriptions thereof).

In the exemplary drying apparatus 1000 shown in FIG. 10, the airflow guide assembly may include a first airflow guide member 1051 and/or a second airflow guide member 1052. The first airflow guide member 1051 may be configured to form the second airflow channel 1061 and the second airflow guide member 1052 may be configured to form the fourth airflow channel 1062.

The first airflow guide member 1051 may be positioned at the airflow outlet 1041*b*. For example, the first airflow guide member 1051 may be positioned along a periphery of the radiation energy sources 1030. As another example, the first airflow guide member 1051 may be positioned along an inner side of the airflow outlet 1041*b* of the first airflow channel 1041. As still another example, the first airflow guide member 1051 may be positioned along an inner side of the first airflow channel 1041. The second airflow guide member 1052 may be positioned at the airflow outlet 1042*b*. For example, the second airflow guide member 1052 may be positioned along an end of the third airflow channel 1042. As another example, the second airflow guide member 1052 may be positioned along the airflow outlet 1042*b* of the third airflow channel 1042.

In some embodiments, the first airflow guide member 1051 may be mounted on a wall 1043 of the first airflow channel 1041 and/or the housing 1010 by one or more supporting components as illustrated in FIG. 10. The second airflow guide member 1052 may be mounted on a wall 1044 of the third airflow channel 1042. In some embodiments, the first airflow guide member 1051 may be mounted on in a similar manner as to how the second airflow guide member 4052 is mounted on described in FIG. 4A, and the descriptions thereof are not repeated here. In some embodiments, the second airflow guide member 1052 may be mounted on the wall 1044 of the third airflow channel 1042 in a similar manner as to how the airflow guide assembly 705 is mounted on or connected with the wall 7041 of the first airflow channel 704 described in FIG. 7A, and the descriptions thereof are not repeated here.

In some embodiments, the first airflow guide member 1051 and the second airflow guide member 1052 may be similar to the airflow guide assembly 705 as described in FIGS. 7A-7B or the second airflow guide member 5052 as described in FIGS. 5A-5E. For example, the first airflow guide member 1051 (or the second airflow guide member 1052) may include a first segment and a second segment. The first segment of the first airflow guide member 1051 may extend toward the first airflow channel 1041 and be configured to divert the second portion of the airflow from the first portion of the airflow in the first airflow channel 1041. The second segment of the first airflow guide member 1051 may be located outside the first airflow channel 1041 and be configured to guide the second portion of the airflow to the target region.

In some embodiments, the first airflow guide member 1051 may be similar to the first airflow guide member 5051 as described in FIGS. 5A, 5B, 5D, and 5E. For example, the first airflow guide member 1051 may be an extension of the housing 1010. As another example, the first airflow guide member 1051 may physically connect the housing 1010. More descriptions for the airflow guide assembly may be found elsewhere in the present disclosure (e.g., FIGS. 5A-5E, 7A-7B, 11-13, and the descriptions thereof).

FIG. 11 is a schematic illustrating an exemplary airflow guide assembly 1100 according to some embodiments of the present disclosure. FIG. 12 is a schematic illustrating an axial view of a rim 1130 of the airflow guide assembly 1100 according to some embodiments of the present disclosure. FIG. 13 is a schematic illustrating a relationship between a rim of the airflow guide assembly 1100 and an airflow outlet of a drying apparatus according to some embodiments of the present disclosure. In some embodiments, the airflow guide assembly 1100 may be an exemplary embodiment of an airflow guide assembly of at least one of the drying apparatuses described in FIGS. 1-7B, 9A-10, and 16A-16B.

As shown in FIG. 11, the airflow guide assembly 1100 may include an auxiliary part 1110, one or more connecting parts 1120, and a rim 1130. Two ends of each of the connecting parts 1120 may be physically connected with the auxiliary part 1110 and the rim 1130, respectively. The rim 1130 may encompass the auxiliary part 1110.

In some embodiments, the auxiliary part 1110 may be configured to facilitate the assembly of the airflow guide assembly 1100 onto a drying apparatus (e.g., the drying apparatus 100, 300, 400, 500, 600, 700, 900, 1000, 1600, etc.). For example, the auxiliary part 1110 may be configured with an installation part 1111 (e.g., a threaded hole). A mating element (e.g., a screw) of the installation part 1111 may connect the airflow guide assembly 1100 to a component (e.g., a portion of an airflow generating element, an airflow channel wall, or a housing) of a drying apparatus. As another example, the auxiliary part 1110 may be omitted from the airflow guide assembly 1100, and multiple supporting components (e.g., the supporting component 407, the supporting component 408 illustrated in FIG. 4A, the supporting component 507 illustrated in FIG. 5, the supporting component 707 illustrated FIG. 7A) may connect the auxiliary part 1110 with a component (e.g., an exterior wall of a radiation energy source, an airflow channel wall, or a housing) of a drying apparatus. More descriptions for the assembly of the airflow guide assembly may be found elsewhere in the present disclosure. See, e.g., FIG. 4A, FIG. 5A, FIG. 7A, and FIG. 10, and the descriptions thereof.

The connecting parts 1120 may be configured to connect the rim 1130 and the auxiliary part 1110. In some embodiments, the connecting parts 1120 may divide a first airflow channel as described elsewhere in the present disclosure when the airflow guide assembly 1100 is mounted to a drying apparatus (e.g., the drying apparatus 100, 300, 400, 600, 700, 800, 900, 1000, 1600, etc.). For instance, a connecting part 1120 may include a thin plate around which the airflow passes. In some embodiments, the airflow in the first airflow channel may exit the airflow outlet of the first airflow channel more smoothly under the guidance of the connecting parts 1120.

In some embodiments, the connecting parts 1120 may be configured to connect the airflow guide assembly 1100 with a drying apparatus (e.g., the drying apparatus 100, 300, 400, 500, 600, 700, 800, 900, 1000, 1600, etc.). For example, each of at least a portion of the connecting parts 1120 may extend along the radial direction of the airflow guide assembly 1100 until passing through the rim 1130. At least a portion of the connecting parts 1120 (e.g., the portion of a connection part 1120 that extends beyond the rim 1130) may be physically connected or fixed to a wall of the first airflow channel (e.g., a first airflow channel 1340 as shown in FIG. 13) or an exterior wall of a radiation energy source via welding, bonding, etc., or one or more connectors, such as rivets, screws, etc. In some embodiments, the airflow guide assembly 1100 may lack the connecting parts 1120. In some embodiments, the connecting parts 1120 may be at an oblique angle with (not perpendicular to) the rim 1130 and/or the auxiliary part 1110. In some embodiments, the lengths of the connecting parts 1120 may be adjusted automatically or manually. For example, the connecting parts 1120 may include telescopic rods. In some embodiments, the telescopic rods may be driven to stretch out and/or draw back by a motor. In some embodiments, the telescopic rods may be stretched out and/or drawn back manually.

The rim 1130 may be configured to provide a second airflow channel (e.g., a second airflow channel 1360 as shown in FIG. 13) through which a portion of airflow in a first airflow channel (e.g., the first airflow channel 1340) of a drying apparatus (e.g., the drying apparatus 100, 300, 400, 600, 700, 900, 1000, 1600, etc.) is guided to a target region. In some embodiments, the rim 1130 may be a solid structure or a hollow structure.

In some embodiments, the rim 1130 may include an inner wall 1131 and an outer wall 1132. As shown in FIG. 13, the airflow guide assembly 1100 may be arranged at an airflow outlet 1311 of the first airflow channel 1340. The inner wall 1131 may be a surface of the rim 1130 facing the first airflow channel 1340. The outer wall 1132 may be a surface of the rim 1130 that opposes the inner wall 1131. The inner wall 1131 may be within an area of the first airflow channel 1340 in a cross-sectional view (e.g., a radial cross-sectional view (or a radial view for brevity)) of the first airflow channel 1340 or the airflow guide assembly 1100. The outer wall 1132 may be outside an area of the first airflow channel 1340 in the cross-sectional view (e.g., a radial cross-sectional view (or a radial view for brevity)) of the first airflow channel 1340 or the airflow guide assembly 1100. In some embodiments, the rim 1130 may be of a ring structure. The radius of the inner wall 1131 may be smaller than a radius of the airflow outlet, and the radius of the outer wall 1132 may be larger than the radius of the airflow outlet 1311. See, e.g., FIG. 13. In some embodiments, a shape of a radial cross-section of at least one of the outer wall 1132 or the inner wall 1131 may conform to a shape of the airflow outlet 1311. The radial cross-section (or the radial cross-sectional view) may be perpendicular to the axial direction $Z_0$ as shown in FIG. 13.

In some embodiments, the second airflow channel 1360 may be formed between an end of the wall of the first airflow channel 1340 and a surface of the rim 1130 that connects the outer wall 1132 and inner wall 1131. In some embodiments, a shape of a portion of the surface of the rim 1130 facing the second airflow channel 1360 (e.g., a surface defined by segment 2 in FIG. 12) may conform to a shape of an end of a wall 1341 of the first airflow channel 1340. For example, the portion of the surface of the rim 1130 facing the second airflow channel 1360 (e.g., a surface defined by segment 2 in FIG. 12) may have the same curvature as the end of the wall 1341. As another example, the end of the wall 1341 may have a chamfer 1342, and the portion of the surface of the rim 1130 facing the second airflow channel 1360 (e.g., segment 2 in FIG. 12) may have an oblique angle same as the oblique angle of the chamfer 1342 with the axis of the first airflow channel 1340.

The rim 1130, viewed along the $Z_0$ direction as shown in FIG. 13 (or referred to as a radial view of the rim 1130), may have the shape of a ring, a triangle, a square, a rectangle, a trapezoid, or an irregular shape, etc. The rim 1130, viewed along a direction perpendicular to the $Z_0$ direction as shown in FIG. 13 (or referred to as an axial view of the rim 1130), may substantially have the shape of a triangle, a square, a rectangle, or an irregular shape, etc. See FIG. 12.

In some embodiments, the profile of the rim 1130 in the axial view may include a parabolic portion and/or polynomial portion. In some instances, the profile of the rim 1130 in the axial view may include a polynomial portion having multiple segments.

In some embodiments, the airflow guide assembly 1100 may include a first segment (e.g., the first segment 5052*a* of the airflow guide assembly 1100 illustrated in FIG. 5A) configured to divert the second portion of the airflow from the first portion of the airflow and a second segment (e.g., the second segment 5052*b* of the airflow guide assembly 1100 illustrated in FIG. 5A) configured to guide the second portion of the airflow to the target region. In some embodiments, the first segment of the airflow guide assembly 1100 may extend into the first airflow channel 1340, while the second segment of the airflow guide assembly 1100 may extend toward the target region. In some embodiments, an end surface of the first segment of the airflow guide assembly 1100 facing the first airflow channel 1340 may have a curvature less than a threshold (also referred to as a second threshold). For example, the end surface of the first segment may have an arc-shaped structure, a water drop-shaped structure, etc.

In some embodiments, as shown in FIG. 12, the profile of the axial view of the rim 1130 may include segments 1-8. The surface of the rim 1130 facing the second airflow channel 1360 (or referred to as a channel surface for brevity) may be defined by multiple segments including, e.g., segments 1-3. The surface of the rim 1130 that opposes the channel surface may be defined by segments including, e.g., segments 5-7. Segment 8 may define the inner wall 1131 of the rim 1130. Segment 4 may define the outer wall 1132 of the rim 1130. Each of segments 1-8 may include a straight line or a curve. It should be noted that segments 1-8 of the rim 1130 as shown in FIG. 12 are merely provided for illustration, and not intended to limit the scope of the present disclosure. It is understood that any two consecutive segments among the segments 1-8 may be considered as one single segment. For instance, segments 1-3 may be deemed to be one single segment. As another example, segments 5-7 may be deemed to be one single segment. In some embodiments, such a single segment may include a straight line of a single slope or multiple straight lines of different slopes. In some embodiments, such a single segment may include a curve defined by a function or multiple curves defined by different functions. In some embodiments, such a single segment may include at least a curve and at least a straight line. In some embodiments, at least one segment exemplified in FIG. 12 may be omitted. For instance, segment 4 may be omitted, and segment 3 and segment 5 may be connected.

Segment 1 (the segment from the bottom end of the axial view of the rim 1130 to dotted line L1 as illustrated in FIG. 12) may define an inflow section of the second airflow channel 1360 (e.g., section I in FIG. 5A). In some embodiments, the end surface of the rim 1130 defined by segment 1 may have a curvature less than a curvature threshold (i.e., the second threshold). For example, the profile of the end surface defined by segment 1 may have the shape of an arc, a water drop, etc., or a portion thereof, thereby reducing airflow noise and/or a resistance to an airflow in the first airflow channel 1340. In some embodiments, the end surface of the rim 1130 defined by segment 1 may extend into the first airflow channel 1340.

A surface of the rim 1130 defined by segments 2 and 3 may be configured to guide the second portion of the airflow to the target region. In some embodiments, segment 2 (the segment between dotted line L1 and dotted line L2 as illustrated in FIG. 12) and segment 3 (the segment between dotted line L2 and dotted line L3 as illustrated in FIG. 12) may define an outflow section (e.g., section II in FIG. 5A) of the second airflow channel 1360. A shape of a surface of the rim 1130 defined by segment 2 may conform to a shape of the end surface of the wall of the first airflow channel 1340.

In some embodiments, each of segments 1, 2, and 3 may be a straight-line segment or a curve segment. Merely by way of example, segment 1 may be a straight-line segment, segment 2 may be a curve segment, and segment 3 may be a straight-line segment. As another example, segment 2 may be a straight-line segment and segment 3 may be a straight-line segment having a slope smaller than that of segment 2. Segment 1 may be a straight-line segment having a slope larger than that of segment 2. As still another example, segment 1 may be a curve segment, segment 2 may be a straight-line segment, and segment 3 may be a curve segment. In some embodiments, segments 1-3 may change smoothly, such that the second portion of the airflow exiting the second airflow channel 1360 may be guided to the target region smoothly with low resistance.

In some embodiments, segment 4 may define the outer wall 1132 of the rim 1130. In some embodiments, segment 4 may be a straight-line segment. In some embodiments, segment 4 may be a curve segment (e.g., a circular arc segment), and the outer wall 1132 defined by segment 4 may be configured to guide the second portion of the airflow to a region outside the first airflow channel 1340 to mix with the first portion of the airflow.

Segments 5-7 may define a surface of the rim 1130 that is opposite to the surface defined by segments 1-3. In some embodiments, segments 5-7 and segments 1-3 may be axisymmetric. In some embodiments, each of segments 5-7 may be a straight-line segment or a curve segment (e.g., a circular arc segment). For example, segments 5-7 may be a straight-line segment, a curve segment, and a circular arc segment, respectively.

In some embodiments, the surface of the rim 1130 defined by the segments 5-7 may guide the second portion of the airflow to a region outside the first airflow channel 1340 to mix with the first portion of the airflow that has exited the first airflow channel 1340. In some embodiments, segment 5 may be a straight-line segment to prevent a vortex formed abut the surface of the rim 1130 defined by segments 5-7. In some embodiments, segment 6 and segment 7 may each be a curve segment to guide the airflow leaving the surface defined by segments 5-7.

Segment 8 may define the inner wall 1131. In some embodiments, segment 8 may a straight-line segment or a curve segment (e.g., a circular arc segment).

As illustrated in FIG. 12, the second airflow channel 1360 may include the inflow section defined by segment 1 and the outflow section defined by segments 2-3. The inflow section of the second airflow channel 1360 may be located inside the airflow outlet of the first airflow channel 1340. The outflow section of the second airflow channel 1360 may be located outside the airflow outlet of the first airflow channel 1340. The inflow section of the second airflow channel 1360 may have cross-sections perpendicular to an axis of the second airflow channel 1360 (i.e., the axis of the inflow section of the second airflow channel 1360). The outflow section of the second airflow channel 1360 may have cross-sections perpendicular to the axis of the second airflow channel 1360 (i.e., the axis of the outflow section of the second airflow channel 1360). The axis of the second airflow channel 1360 (including the axes of the inflow section and outflow section of the second airflow channel 1360) may be a geometric centerline of the second airflow channel 1360 (e.g., an axial direction $Z_1$ as shown in FIG. 5A). In some embodiments, areas of at least a portion of the cross-sections of the inflow section of the second airflow channel 1360 may vary along the axis of the second airflow channel 1360. For brevity, the area of a cross-section may be referred to as the cross-sectional area. In some embodiments, at least a portion of the cross-sectional areas of the inflow section or the outflow section may be constant along the axis of the second airflow channel 1360. See, e.g., the inflow section and the outflow section of the airflow guide assembly 805 illustrated in FIGS. 8A and 8B.

The cross-sectional areas of the inflow section of the second airflow channel 1360 may relate to radial lengths ($d_1$ in FIGS. 12 and 13) of the cross-sections perpendicular to the axis of the inflow section (i.e., $Z_1$ as shown in FIG. 12) of the second airflow channel 1360 such that a change in the cross-sectional areas may be assessed by assessing the change in $d_1$. In some embodiments, the cross-sectional areas of cross-sections of the outflow section of the second airflow channel 1360 may relate to radial lengths ($d_2$ in FIGS. 12 and 13) of the cross-sections perpendicular to the axis of the outflow section (i.e., $Z_1$ as shown in FIG. 12) such that a change in the cross-sectional areas may be assessed by assessing the change in $d_2$. As shown in FIG. 12 and FIG. 13, a radial length $d_1$ of a cross-section of the inflow section of the second airflow channel 1360 may be along a direction perpendicular to the axis of the second airflow channel 1360 (e.g., $Z_1$ in FIG. 12). A radial length $d_2$ of a cross-section of the outflow section of the second airflow channel 1360 may be along a direction perpendicular to the axis of the second airflow channel 1360. In some embodiments, a difference between the radial length $d_1$ and the radial length $d_2$ may be smaller than a difference threshold so that a change in the area available (e.g., cross-sectional areas) for the air travelling through the inflow section and the outflow section of the second airflow channel 1360 is relatively small, and so does a change in the velocity of the air. In some embodiments, the radial length $d_1$ may vary along the direction parallel to the axis of the second airflow channel 1360 to reduce the resistance of the airflow and guide the second portion of the airflow to the target region. For example, the radial length $d_1$ may gradually decrease along the direction (e.g., axial direction $Z_1$ shown in FIG. 13) parallel to the axis of the second airflow channel 1360. In some embodiments, the radial length $d_2$ may vary along the direction parallel to the axis of the second airflow channel 1360 to reduce the resistance of the airflow and guide the second portion of the airflow to the target region. For example, the radial length $d_2$ may gradually increase along the direction parallel to the axis of the second airflow channel 1360. As used herein, the difference between the radial length $d_1$ and the radial length $d_2$ may be a difference between a maximum radial length of the inflow section and a maximum radial length of the outflow section of the second airflow channel, or between an average radial length of the inflow section of the second airflow channel 1360 and an average radial length of the outflow section of the second airflow channel 1360, etc. In some embodiments, the radial length $d_1$ and/or the radial length $d_2$ may be adjusted by adjusting the lengths of the connecting parts 1120.

FIGS. 15A and 15B provide views of an exemplary drying apparatus 1500 according to some embodiments of the present disclosure. As shown in FIGS. 15A and 15B, the drying apparatus 1500 may include a housing 1501, an airflow generating element 1502, one or more radiation energy sources 1503, an airflow guide assembly 1505 (not shown in FIG. 15A), etc. Various electric, mechanical, and electromechanical components, such as an airflow generating element 1502, one or more radiation energy sources 1503, a control circuit (not shown), and a power adaptor (not shown), may be arranged in the housing 1501. Unless otherwise stated, the dashed arrows in FIG. 15A illustrate the airflow in an airflow channel (e.g., the first airflow channel 1504).

In some embodiments, the housing 1501 may include a first airflow channel 1504. The first airflow channel 1504 may have an airflow inlet and an airflow outlet. The radiation energy sources 1503 may be configured to provide thermal radiation toward an object. The airflow generating element 1502 may be configured to provide an airflow by effecting the airflow into the first airflow channel 1504 through the airflow inlet and direct a first portion of the airflow in the first airflow channel 1504 toward the airflow outlet.

The one or more radiation energy sources 1503 may be positioned outside the first airflow channel 1504. The radiation energy sources 1503 may be separated from the first airflow channel 1504 by, e.g., a wall 1541 of the first airflow channel 1504, thereby no portion of the radiation energy sources 1503 contacting the airflow in the first airflow channel 1504.

The housing 1501 may include a first cavity 1511 and a second cavity 1512. The second cavity 1512 may be positioned in juxtaposition to the first cavity 1511. The first cavity 1511 may provide the first airflow channel 1504. The radiation energy sources 1503 may be arranged in the second cavity 1512. The first cavity 1511 may be defined by a first portion of the housing 1501 and the wall 1541. The second cavity 1512 may be defined by the wall 1541 and the second portion of the housing 1501. The first cavity 1511 and the second cavity 1512 may be fluidly isolated (i.e., not in fluid communication) from each other. The wall 1541 may also be referred to as an inner wall of the first airflow channel 1504. The first portion of the housing 1501 may also be referred to as an outer wall of the first airflow channel 1504. More descriptions for the housing, the airflow generating element, the radiation energy sources, and the first airflow channel may be found elsewhere in the present disclosure. See, e.g., FIGS. 1 and 6 and the descriptions thereof.

The airflow guide assembly 1505 as shown in FIG. 15B may be configured to provide a second airflow channel through which a second portion of the airflow in the first airflow channel 1504 is guided to a target region. The airflow guide assembly 1505 may be positioned at the airflow outlet. For example, the airflow guide assembly 1505 may be positioned along an end of the inner wall (i.e., the wall 1541) of the first airflow channel 1504. A shape of a radial cross-section of the airflow guide assembly 1505 may conform to a shape of at least a portion of a radial cross-section of the wall 1541. As shown in FIG. 15B, the shape of the radial cross-section of the wall 1541 may be a straight-line shape, and the shape of the radial cross-section of the airflow guide assembly 1505 may be a straight-line shape. In some embodiments, the configuration of the airflow guide assembly 1505 may be the same as or similar to the configuration of the airflow guide assemblies in FIGS. 1, 4A, 4E, 5A, 7A, 8A-8B, and 11-13. For example, the airflow guide assembly 1505 may include a first segment and a second segment. The first segment of the airflow guide assembly 1505 may extend to the first airflow channel 1504 and be configured to divert the second portion of the airflow from the first portion of the airflow. The second segment of the airflow guide assembly 1505 may extend to the target region and be configured to guide the second portion of the airflow to the target region. More descriptions for the airflow guide assembly may be found elsewhere in the present disclosure. As another example, the airflow guide assembly 1505 may include one or more tubes. See, e.g., FIGS. 1, 4A, 4E, 5A, 7A, 8A-8B, and 11-13, and the descriptions thereof.

FIGS. 16A and 16B provide views of an exemplary drying apparatus 1600 according to some embodiments of the present disclosure. As shown in FIGS. 16A and 16B, the drying apparatus 1600 may include a housing 1601, an airflow generating element 1602, one or more radiation energy sources 1603, an airflow guide assembly 1605 (not shown in FIG. 16A), etc. Various electric, mechanical, and electromechanical components, such as an airflow generating element 1602, one or more radiation energy sources 1603, a control circuit (not shown), and a power adaptor (not shown), may be arranged in the housing 1601. Unless otherwise stated, the dashed arrows in FIG. 16A illustrate the airflow in an airflow channel (e.g., the first airflow channel 1604).

In some embodiments, the housing 1601 may include a first airflow channel 1604. The first airflow channel 1604 may have an airflow inlet and an airflow outlet. The radiation energy sources 1603 may be configured to provide thermal radiation toward an object. The airflow generating element 1602 may be configured to provide an airflow by effecting the airflow into the first airflow channel 1604 through the airflow inlet and direct a first portion of the airflow in the first airflow channel toward the airflow outlet.

The one or more radiation energy sources 1603 may be positioned outside the first airflow channel 1604. The radiation energy sources 1603 may be separated from the first airflow channel 1604 by, e.g., a wall 1641 of the first airflow channel 1604, thereby no portion of the radiation energy sources 1603 contacting the airflow in the first airflow channel 1604. The housing 1601 may include a first cavity 1611 and a second cavity 1612. The first cavity 1611 may encompass the second cavity 1612. The first cavity 1611 and the second cavity 1612 may be fluidly isolated (i.e., not in fluid communication) with each other. The first cavity 1611 may form the first airflow channel 1604. The radiation energy sources 1603 may be arranged in the second cavity 1612. The first cavity 1611 may be defined by the housing 1601 and the wall 1641 and the housing 1601. The second cavity 1612 may be defined by the wall 1641. The wall 1641 may also be referred to as an inner wall of the first airflow channel 1604 and a portion of the housing 1601 may also be referred to as an outer wall of the first airflow channel 1604. More descriptions for the housing, the airflow generating element, the radiation energy sources, and the first airflow channel may be found elsewhere in the present disclosure. See, e.g., FIGS. 1 and 6 and the descriptions thereof.

The airflow guide assembly 1605 shown in FIG. 16A may be configured to provide a second airflow channel through which a second portion of the airflow in the first airflow channel 1604 is guided to a target region. The airflow guide assembly 1605 may be positioned at the airflow outlet. For example, the airflow guide assembly 1605 may be positioned along an end of the inner wall (i.e., the wall 1641) of the first airflow channel 1604. In some embodiments, the airflow guide assembly 1605 may be positioned along an end of the housing 1601, the same as or similar to the first airflow guide member 5051, the descriptions of which are not repeated here. The configuration of the airflow guide assembly 1605 may be the same as or similar to the configuration of the airflow guide assemblies in FIGS. 1, 7A-7B, 8A-8B, and 11-13, the descriptions of which are not repeated here.

Figure 17A:
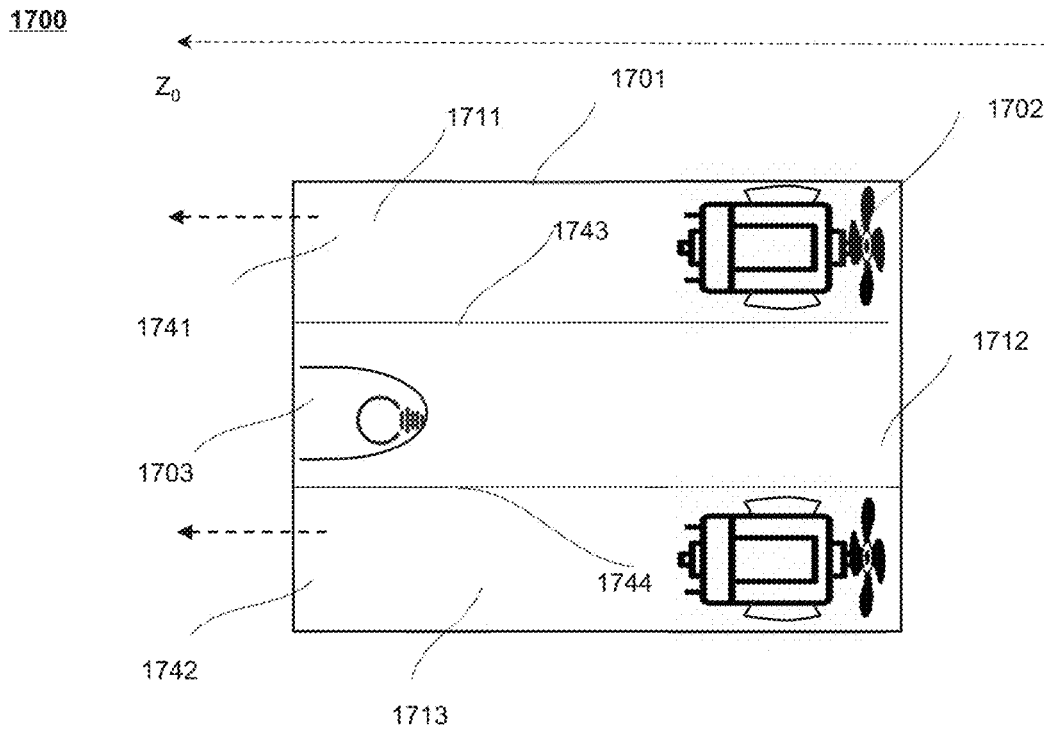
FIGS. 17A through 17D provide views of an exemplary drying apparatus 1700 according to some embodiments of the present disclosure.
Figure 17B:
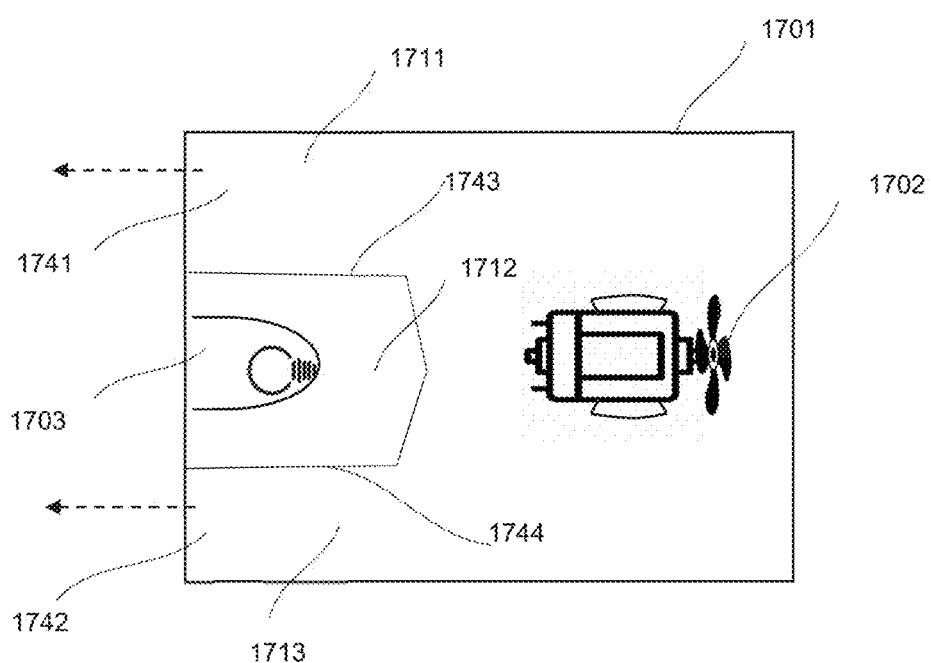

FIGS. 17A through 17D provide views of an exemplary drying apparatus 1700 according to some embodiments of the present disclosure. In some embodiments, the drying apparatus 1700 may be an exemplary embodiment of the drying apparatus 100 described in FIG. 1. As shown in FIG. 17A, the drying apparatus 1700 may include a housing 1701, two airflow generating elements 1702, one or more radiation energy sources 1703, an airflow guide assembly, etc. Unless otherwise stated, the dashed arrows in FIGS. 17A and 17B illustrate the airflow in an airflow channel (e.g., the first airflow channel 1741, the third airflow channel 1742).

The housing 1701 may include a first airflow channel 1741 and a third airflow channel 1742. The one or more radiation energy sources 1703 may be positioned between a space between the first airflow channel 1741 and the third airflow channel 1742. The one or more radiation energy sources 1703 may be positioned outside the first airflow channel 1741 and the third airflow channel 1742. The radiation energy sources 1703 may be separated from the first airflow channel 1741 by, e.g., a wall 1743 of the first airflow channel 1741, and the third airflow channel 1742 by, e.g., a wall 1744 of the third airflow channel 1742, thereby no portion of the radiation energy sources 1703 contacting the airflow in the first airflow channel 1741 and the third airflow channel 1742. As illustrated in FIG. 17A, the third airflow channel 1742 and the first airflow channel 1741 may be fluidly isolated (i.e., not in fluid communication) from each other. The two airflow generating elements 1702 may include a first airflow generating component located in the first airflow channel 1741 and a second airflow generating component located in the third airflow channel 1742.

In some embodiments, the third airflow channel 1742 and the first airflow channel 1741 may be in fluid communication as illustrated in FIG. 17B. The third airflow channel 1742 and the first airflow channel 1741 may be an integral channel. The third airflow channel 1742 and the first airflow channel 1741 may share a same airflow generating element.

Figure 17C:
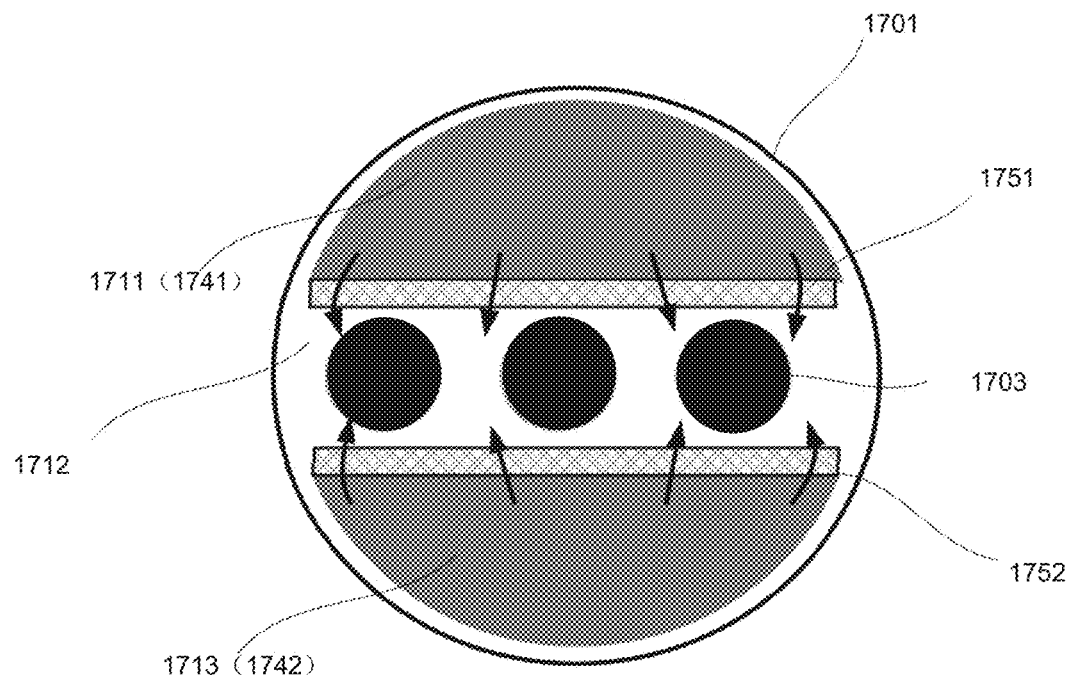
Figure 17D:
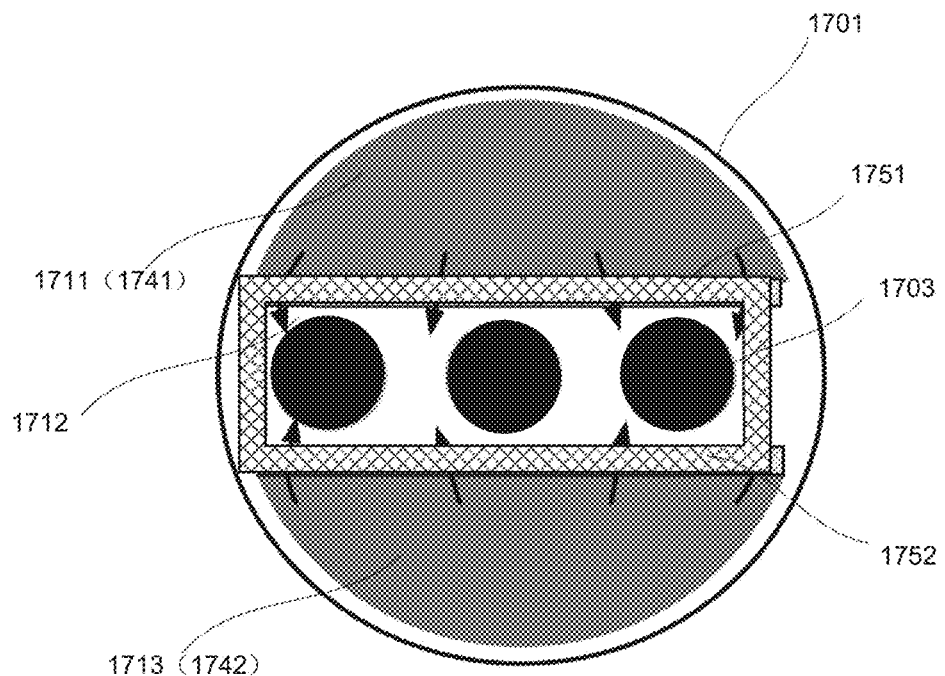

Returning to FIG. 17A, with reference to FIGS. 17C and 17D, the housing 1701 may include a first cavity 1711, a second cavity 1712, and a third cavity 1713. The second cavity 1712 may be positioned between the third cavity 1713 and the first cavity 1711. The first cavity 1711 may be defined by a first portion of the housing 1701 and the wall 1743 of the first airflow channel 1741. The third cavity 1713 may be defined by the wall 1744 of the third airflow channel 1742 and a second portion of the housing 1701. The second cavity 1712 may be defined by the wall 1743 of the first airflow channel 1741 and the wall 1744 of the third airflow channel 1742. The first cavity 1711 and the third cavity 1713 may be in fluid communication (as illustrated in FIG. 17B) or not (as illustrated in FIG. 17A). More descriptions for the housing, the airflow generating element, the radiation energy sources, and the first airflow channel may be found elsewhere in the present disclosure. See, e.g., FIGS. 1 and 9A-9B and the descriptions thereof.

The airflow guide assembly (not shown in FIG. 17A) may be configured to provide a second airflow channel through which a second portion of the airflow in the first airflow channel 1741 and/or the third airflow channel 1742 is guided to a target region.

In some embodiments, with reference to FIG. 17C, the airflow guide assembly may include a first airflow guide member 1751 positioned at the airflow outlet of the first airflow channel 1741 and a second airflow guide member 1752 positioned at the airflow outlet of the third airflow channel 1742. The first airflow guide member 1751 may be configured to provide a second airflow channel through which a second portion of airflow may be diverted from the first airflow channel 1741 and guided to a target region. The second airflow guide member 1752 may be configured to provide a fourth airflow channel through which a second portion of airflow may be diverted from the third airflow channel 1742 and guided to the target region. The first airflow guide member 1751 may be positioned along an end of the wall 1743 of the first airflow channel 1741. The first airflow guide member 1751, viewed along the $Z_0$ direction as shown in FIG. 17A, may have the shape of a rectangle. The second airflow guide member 1752 may be positioned along an end of the wall 1744 of the third airflow channel 1742. The second airflow guide member 1752, viewed along the $Z_0$ direction as shown in FIG. 17A, may have the shape of a rectangle. In some embodiments, the first airflow guide member 1751 may be positioned parallel to the second airflow guide member 1752. As illustrated in FIG. 17C, the first airflow guide member 1751 and the second airflow guide member 1752 may be separate pieces. In some embodiments, the first airflow guide member 1751 and the second airflow guide member 1752 may be an integral piece as illustrated in FIG. 17D. In some embodiments, the first airflow guide member 1751 and the second airflow guide member 1752 may be positioned along an end of the housing 1701, the same as or similar to the first airflow guide member 4051 illustrated in FIGS. 4B and 4F, the first airflow guide member 5051 illustrated in FIGS. 5A and 5B, the descriptions of which are not repeated here.

The configuration of the airflow guide assembly may be the same as or similar to the configuration of the airflow guide assemblies in FIGS. 1, 7A-7B, 8A-8B, and 11-13, the descriptions of which are not repeated here.

According to another aspect of the present disclosure, a method for drying an object may be provided. The method may include providing a first airflow channel that has an airflow inlet and an airflow outlet. The method may include providing thermal radiation toward the object through one or more radiation energy sources. The method may also include providing an airflow by effecting the airflow into the first airflow channel through the airflow inlet through an airflow generating element. The method may also include directing a first portion of the airflow in the first airflow channel toward the airflow outlet through the airflow generating element. The method may further include guiding a second portion of the airflow in the first airflow channel to a target region through a second airflow channel provided by an airflow guide assembly. The target region may abut at least one of the one or more radiation energy sources.

Figure 18:
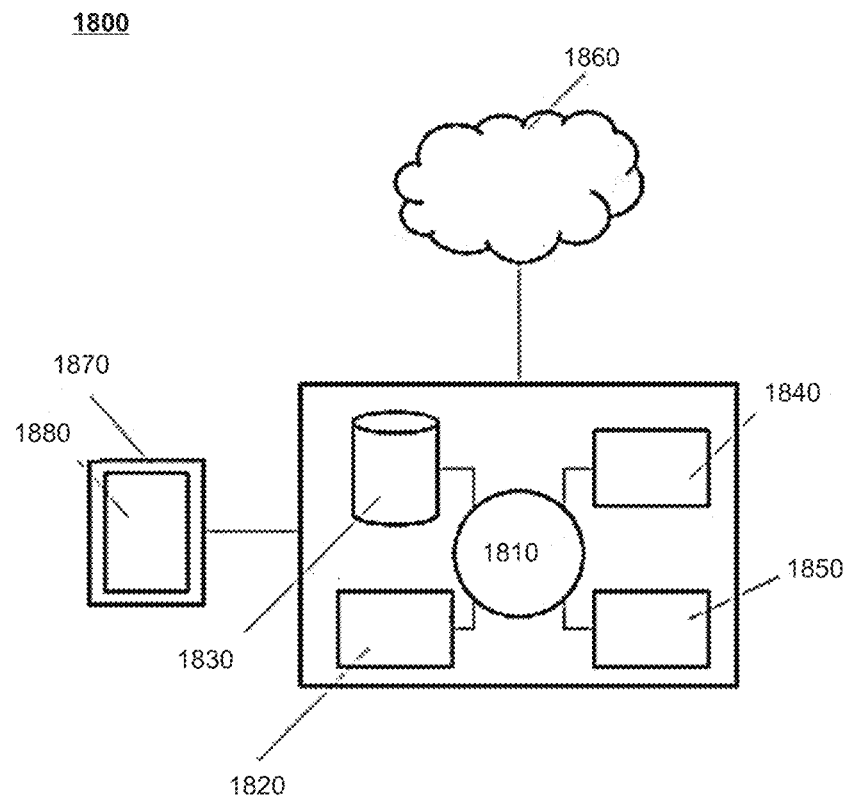
FIG. 18 is a schematic illustrating an exemplary device control system 1800 according to some embodiments of the present disclosure.

FIG. 18 is a schematic illustrating an exemplary device control system 1800 according to some embodiments of the present disclosure. The device control system 1800 may be programmed to implement methods and devices of the disclosure.

The device control system 1800 may include a central processing unit (CPU, also "processor" and "computer processor" herein) 1810, which may be a single-core or multi-core processor, or a plurality of processors for parallel processing. The device control system 1800 may also include memory or memory location 1820 (e.g., random-access memory, read-only memory, flash memory), an electronic storage unit 1830 (e.g., a hard disk), a communication interface 1840 (e.g., a network adapter) for communicating with one or more other systems, and peripheral devices 1850, such as a cache, other memory, data storage and/or electronic display adapters. The memory 1820, storage unit 1830, interface 1840, and peripheral devices 1850 may be in communication with the CPU 1810 through a communication bus (solid lines), such as a motherboard. The storage unit 1830 may be a data storage unit (or data repository) for storing data. The device control system 1800 may be operatively coupled to a computer network ("network") 1860 with the aid of the communication interface 1840. The network 1860 may be the Internet, an internet and/or extranet, or an intranet and/or extranet that is in communication with the Internet.

The network 1860 in some cases may be a telecommunication and/or data network. The network 1860 may include one or more computer servers, which can enable distributed computing, such as cloud computing. For example, one or more computer servers may enable cloud computing over the network 1860 ("the cloud") to perform various aspects of analysis, calculation, and generation of the present disclosure, for example, capturing a configuration of one or more experimental environments; performing usage analyses of products (e.g., applications); and providing outputs of statistics of projects. Such cloud computing may be provided by cloud computing platforms, for example, Amazon Web Services (AWS), Microsoft Azure, Google Cloud Platform, and IBM cloud. The network 1860, in some cases with the aid of the device control system 1800, may implement a peer-to-peer network, which may enable devices coupled to the device control system 1800 to behave as a client or a server.

The CPU 1810 may execute a sequence of machine-readable instructions, which can be embodied in a program or software. The instructions may be stored in a memory location, such as the memory 1820. The instructions may be directed to the CPU 1810, which can subsequently program or otherwise configure the CPU 1810 to implement methods of the present disclosure. Exemplary operations performed by the CPU 1810 may include fetching, decoding, executing, and writeback.

The CPU 1810 may be part of a circuit, such as an integrated circuit. One or more other components of the system may be included in the circuit. In some cases, the circuit may be an application specific integrated circuit (ASIC).

The storage unit 1830 may store files, such as drivers, libraries and saved programs. The storage unit 1830 may store user preference data, e.g., user preferences and user programs. The device control system 1800 in some cases may include one or more additional data storage units that are external to the device control system 1800, such as located on a remote server that is in communication with the device control system 1800 through an intranet or the Internet.

The device control system 1800 may communicate with one or more remote device control systems through the network 1860. For instance, the device control system 1800 may communicate with a remote device control system of a user (e.g., a user of an experimental environment). Exemplary remote device control systems 1800 may include personal computers (e.g., portable PC), slate or tablet PC's (e.g., Apple® iPad, Samsung® Galaxy Tab), telephones, Smartphones (e.g., Apple® iPhone, Android-enabled device, Blackberry®), or personal digital assistants. The user may access the device control system 1800 via the network 1860.

Methods, as described in the present disclosure, may be implemented by way of machine (e.g., computer processor) executable code stored on an electronic storage location of the device control system, for example, on the memory 1820 or electronic storage unit 1830. The machine executable or machine readable code may be provided in the form of software. During use, the code may be executed by the processor 1810. In some cases, the code may be retrieved from the storage unit 1830 and stored on the memory 1820 for ready access by the processor 1810. In some situations, the electronic storage unit 1830 may be precluded, and machine-executable instructions may be stored on the memory 1820.

The code may be pre-compiled and configured for use with a machine having a processor adapted to execute the code, or may be compiled during runtime. The code may be supplied in a programming language that can be selected to enable the code to execute in a pre-compiled or as-compiled fashion.

Aspects of the systems and methods provided herein, such as the device control system 1800, may be embodied in programming. Various aspects of the technology may be thought of as "products" or "articles of manufacture" typically in the form of machine (or processor) executable code and/or associated data that is carried on or embodied in a type of machine readable medium. Machine-executable code may be stored on an electronic storage unit, such as memory (e.g., read-only memory, random-access memory, flash memory) or a hard disk. "Storage" type media may include any or all of the tangible memory of the computers, processors or the like, or associated modules thereof, such as various semiconductor memories, tape drives, disk drives, and the like, which may provide non-transitory storage at any time for the software programming. All or portions of the software may at times be communicated through the Internet or various other telecommunication networks. Such communications, for example, may enable loading of the software from one computer or processor into another, from a management server or host computer into the computer platform of an application server. Thus, another type of media that may bear the software elements includes optical, electrical, and electromagnetic waves, such as used across physical interfaces between local devices, through wired and optical landline networks, and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium, or a physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as the main memory of such a computer platform. Tangible transmission media include coaxial cables, copper wire, fiber optics, and the wires that comprise a bus within a device control system 1800. Carrier-wave transmission media may take the form of electric or electromagnetic signals, or acoustic or light waves such as those generated during radio frequency (RF) and infrared (IR) data communications. Common forms of computer-readable media, therefore, include for example a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The device control system 1800 may include or be in communication with an electronic display 1870 that comprises a user interface (UI) 1880 for providing, for example, the various components (e.g., lab, launch pad, control center, knowledge center, etc.) of the model management system. Exemplary UIs may include, without limitation, a graphical user interface (GUI) and web-based user interface. The electronic display may be a display of a user equipment such as a smartphone.

The device control system 1800 may include a terminal device (e.g., the drying apparatus as described elsewhere in the present disclosure). The device control system 1800 (e.g., the central processing unit 1810) may control an operation of the terminal device based on measurement data (e.g., sensor data) acquired by sensors of the terminal device as described elsewhere in the present disclosure.

In some embodiments, the device control system 1800 (e.g., the central processing unit 1810) may control an operation of the terminal device (e.g., the drying apparatus as described elsewhere in the present disclosure) based on a request inputted by a user via the user interface (UI) 1880. For example, the user may input a request for starting the terminal device by a voice command. The device control system 1800 (e.g., the central processing unit 1810) may analyze the voice command of the user to determine the request included in the voice command and start the terminal device (e.g., the drying apparatus as described elsewhere in the present disclosure). In some embodiments, the user input may include a specified value for each of at least a parameter associated with the operation of the terminal device. The device control system 1800 (e.g., the central processing unit 1810) may regulate the operation based on the inputted parameter associated with the operation of the terminal device (e.g., the drying apparatus as described elsewhere in the present disclosure).

Methods and devices of the present disclosure may be implemented by way of one or more algorithms. An algorithm may be implemented by way of software upon execution by the central processing unit 1810. The algorithm may, for example, generate instructions to operate one or more components of a sample transport system.

It should be understood from the foregoing that, while particular implementations have been illustrated and described, various modifications can be made thereto and are contemplated herein. It is also not intended that the invention be limited by the specific examples provided within the specification. While the invention has been described with reference to the disclosure, the descriptions and illustrations of the preferable embodiments herein are not meant to be construed in a limiting sense. Aspects of the preferable embodiments can be combined in other embodiments. For instance, the one or more radiation energy sources having a first portion that is positioned not contacting the airflow channel, the reflector of the one or more radiation energy sources having a cut-away shape, the radiation energy source in which the radiation emitter being positioned and oriented such that a distal end of the radiation emitter does not point to the opening of the reflector, the radiation emitter having one or more radiation reflecting elements, and the high-speed motor, can be arbitrarily combine in other embodiments that are not particularly described in the disclosure. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An apparatus for drying an object, the apparatus comprising:
   a first airflow channel that has an airflow inlet and an airflow outlet;
   one or more radiation energy sources configured to provide thermal radiation toward the object;
   an airflow generating element configured to provide an airflow by effecting the airflow into the first airflow channel through the airflow inlet and direct a first portion of the airflow in the first airflow channel toward the airflow outlet; and
   an airflow guide assembly configured to provide a second airflow channel through which a second portion of the airflow in the first airflow channel is guided to a target region, wherein
   the target region abuts at least one of the one or more radiation energy sources, the airflow outlet is configured to discharge the first portion of the airflow from the apparatus to outside the apparatus, and the target region is located outside the airflow outlet.

2. The apparatus of claim 1, wherein a ratio of a velocity of airflow to a radiation intensity of thermal radiation in at least a portion of the target region is below a threshold in an absence of the second portion of the airflow being guided to the target region.

3. The apparatus of claim 1, wherein the airflow guide assembly is arranged at the airflow outlet.

4. The apparatus of claim 3, wherein the second airflow channel is formed between a portion of a wall of the first airflow channel and a surface of the airflow guide assembly.

5. The apparatus of claim 3, wherein the airflow guide assembly includes an inner wall and an outer wall, the inner wall is within an area of the first airflow channel in a radial cross-sectional view, and the outer wall is outside the area of the first airflow channel in the radial cross-sectional view, the radial cross-sectional view being perpendicular to an axis of the first airflow channel.

6. The apparatus of claim 5, wherein the airflow guide assembly includes a ring structure, a radius of the inner wall being smaller than a radius of the airflow outlet, and a radius of the outer wall being larger than the radius of the airflow outlet.

7. The apparatus of claim 5, wherein the second airflow channel is formed between a portion of a wall of the first airflow channel and a surface of the airflow guide assembly that connects the outer wall and inner wall of the airflow guide assembly.

8. The apparatus of claim 3, wherein the second airflow channel is formed between a surface of the airflow guide assembly and one or more surfaces of the at least one of the one or more radiation energy sources.

9. The apparatus of claim 8, wherein an inflow section of the second airflow channel is formed between the surface of the airflow guide assembly and a first surface of the at least one of the one or more radiation energy sources, and an outflow section of the second airflow channel is formed between the surface of the airflow guide assembly and a second surface of the at least one of the one or more radiation energy sources.

10. The apparatus of claim 1, wherein
the airflow guide assembly includes a tube connecting the first airflow channel and the target region,
a wall of the first airflow channel is configured with an opening, and
the second airflow channel is formed by the tube that is arranged between the opening and the target region.

11. The apparatus of claim 1, wherein
the apparatus includes a third airflow channel, and
the one or more radiation energy sources are distributed in a space between the first airflow channel and the third airflow channel.

12. The apparatus of claim 11, wherein
the airflow guide assembly includes a first airflow guide member and a second airflow guide member,
the first airflow guide member is configured to form the second airflow channel through which the second portion of the airflow in the first airflow channel is guided to the target region, and
the second airflow guide member is configured to form a fourth airflow channel through which a portion of airflow in the third airflow channel is guided to the target region.

13. The apparatus of claim 1, wherein an end of the housing where the airflow outlet is located includes a convex part that changes a path of the second portion of the airflow.

14. A method for drying an object, the method comprising:
providing a first airflow channel that has an airflow inlet and an airflow outlet;
providing, through one or more radiation energy sources, thermal radiation toward the object;
providing, through an airflow generating element, an airflow by effecting the airflow into the first airflow channel through the airflow inlet;
directing, through the airflow generating element, a first portion of the airflow in the first airflow channel toward the airflow outlet; and
guiding, through a second airflow channel provided by an airflow guide assembly,
a second portion of the airflow in the first airflow channel to a target region, wherein
the target region abuts at least one of the one or more radiation energy sources,
the airflow outlet is configured to discharge the first portion of the airflow from the apparatus to outside the apparatus, and the target region is located outside the airflow outlet.

15. An airflow guide device used in an apparatus for drying an object that includes a first airflow channel, one or more radiation energy sources configured to provide thermal radiation toward the object, and an airflow generating element configured to provide an airflow by effecting the airflow into the first airflow channel and direct a first portion of the airflow in the first airflow channel outside the first airflow channel, the airflow guide device comprising:
an airflow guide assembly configured to provide a second airflow channel through which a second portion of the airflow in the first airflow channel is diverted from the first portion of the airflow and guided to a target region, the target region abutting at least one of the one or more radiation energy sources, wherein, the airflow outlet is configured to discharge the first portion of the airflow from the apparatus to outside the apparatus, and the target region is located outside the airflow outlet.

16. The apparatus of claim 5, wherein a shape of a radial cross-section of at least one of the outer wall or the inner wall of the airflow guide assembly conforms to a shape of the airflow outlet.

17. The apparatus of claim 1, wherein the one or more radiation energy sources are positioned along a periphery of the first airflow channel.

18. The apparatus of claim 1, wherein the target region is positioned along a periphery of the airflow outlet.

19. The apparatus of claim 1, further including a housing that encloses the first airflow channel, wherein the housing includes a first cavity and a second cavity, the first cavity forms the first airflow channel, and the one or more radiation energy sources are located in the second cavity, wherein
the first cavity is defined by a wall of the first airflow channel,
the second cavity is defined by the housing and the wall of the first airflow channel, and
the second cavity encompasses the first cavity.

20. The apparatus of claim 1, further including a housing that encloses the first airflow channel, wherein the housing includes a first cavity and a second cavity, the first cavity forms the first airflow channel, and the one or more radiation energy sources are located in the second cavity, wherein
the first cavity is defined by a wall of the first airflow channel and the housing,
the second cavity is defined by the wall of the first airflow channel, and
the first cavity encompasses the second cavity.

* * * * *